(12) United States Patent
Kroll et al.

(10) Patent No.: US 8,416,276 B2
(45) Date of Patent: Apr. 9, 2013

(54) MOBILE TELEPHONY SYSTEM COMPRISING HOLOGRAPHIC DISPLAY

(75) Inventors: Bo Kroll, London (GB); Ralf Haussler, Dresden (DE); Armin Schwerdtner, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 0 days.

(21) Appl. No.: 12/447,125

(22) PCT Filed: Oct. 26, 2007

(86) PCT No.: PCT/EP2007/061528
§ 371 (c)(1),
(2), (4) Date: Nov. 24, 2009

(87) PCT Pub. No.: WO2008/049916
PCT Pub. Date: May 2, 2008

(65) Prior Publication Data
US 2010/0097439 A1    Apr. 22, 2010

(30) Foreign Application Priority Data

| Oct. 26, 2006 | (GB) | 0621360.7 |
| Dec. 22, 2006 | (GB) | 0625838.8 |
| Mar. 21, 2007 | (GB) | 0705398.6 |
| Mar. 21, 2007 | (GB) | 0705399.4 |
| Mar. 21, 2007 | (GB) | 0705401.8 |
| Mar. 21, 2007 | (GB) | 0705402.6 |
| Mar. 21, 2007 | (GB) | 0705403.4 |
| Mar. 21, 2007 | (GB) | 0705404.2 |
| Mar. 21, 2007 | (GB) | 0705405.9 |
| Mar. 21, 2007 | (GB) | 0705406.7 |
| Mar. 21, 2007 | (GB) | 0705407.5 |
| Mar. 21, 2007 | (GB) | 0705408.3 |
| Mar. 21, 2007 | (GB) | 0705409.1 |
| Mar. 21, 2007 | (GB) | 0705410.9 |
| Mar. 21, 2007 | (GB) | 0705411.7 |
| Mar. 21, 2007 | (GB) | 0705412.5 |

(51) Int. Cl.
*H04N 7/14* (2006.01)

(52) U.S. Cl.
USPC .............. 348/14.02; 348/14.01; 348/14.08; 348/40

(58) Field of Classification Search .... 348/14.01–14.16; 359/22, 244; 715/753, 754, 755, 751
See application file for complete search history.

(56) References Cited

U.S. PATENT DOCUMENTS

2003/0222973 A1* 12/2003 Hiroi et al. ................. 348/14.01
2004/0004616 A1   1/2004 Konya et al.
(Continued)

FOREIGN PATENT DOCUMENTS

| JP | 10-075432 | 3/1998 |
| JP | 2002-051278 | 2/2002 |

(Continued)

OTHER PUBLICATIONS

Lewis Banks et al. ("73.4: Real time diffractive video projector employing Ferroelectric LCOS SLM" SID 2006, 2006 SID International Symposium for Information Display, Lo vol. XXVII, May 24, 2005, pp. 2018-2021, XP007012898, ISSN: 0006-966X, hereinafter Lewis Banks).*

(Continued)

*Primary Examiner* — Melur Ramakrishnaiah
(74) *Attorney, Agent, or Firm* — Saul Ewing LLP

(57) ABSTRACT

A mobile telephony system comprising a calling party mobile telephone with an imaging system and a display. The imaging system is operable to capture an image of the calling party. The calling party mobile telephone sends an image of the calling party to a called party mobile telephone over a wireless link, and the called party mobile telephone locally generates a holographic reconstruction of the calling party using a holographic display that is encoded with a hologram. An advantage is that a mobile telephone call may be held in which one party views a holographic reconstruction of the other party.

20 Claims, 27 Drawing Sheets

U.S. PATENT DOCUMENTS

| | | | |
|---|---|---|---|
| 2004/0196524 A1* | 10/2004 | Hughes et al. | 359/244 |
| 2005/0030608 A1 | 2/2005 | Kwasnick et al. | |
| 2005/0147895 A1* | 7/2005 | Chang et al. | 430/5 |
| 2005/0175257 A1* | 8/2005 | Kuroki | 382/278 |
| 2006/0050340 A1 | 3/2006 | Schwerdtner | |
| 2006/0098085 A1* | 5/2006 | Nichols et al. | 348/14.07 |
| 2006/0139711 A1 | 6/2006 | Leister et al. | |
| 2006/0158729 A1 | 7/2006 | Vissenberg et al. | |
| 2006/0187297 A1 | 8/2006 | Onural | |
| 2006/0250671 A1* | 11/2006 | Schwerdtner et al. | 359/9 |

FOREIGN PATENT DOCUMENTS

| | | |
|---|---|---|
| JP | 2002-176632 | 6/2002 |
| JP | 2002-534703 A | 10/2002 |
| JP | 2003-501688 A | 1/2003 |
| JP | 2003-501689 A | 1/2003 |
| JP | 2003-051872 | 2/2003 |
| JP | 2004-040445 | 2/2004 |
| JP | 2004-133305 | 4/2004 |
| JP | 2005-520184 A | 7/2005 |
| JP | 2006-121158 | 5/2006 |
| JP | 2006-184447 | 7/2006 |
| WO | 00/40018 | 7/2000 |
| WO | 00/75698 A1 | 12/2000 |
| WO | 00/75699 A1 | 12/2000 |
| WO | 03/054797 A2 | 7/2003 |
| WO | WO 2005059660 A2 * | 6/2005 |
| WO | 2006/064334 A1 | 6/2006 |

OTHER PUBLICATIONS

Banks et al., "Real-time diffractive video projector employing ferroelectric LCOS SLM," SID 06 Digest, pp. 2018-2021 (2006).

International Search Report, dated Feb. 20, 2008, issued in priority International Application No. PCT/EP2007/061528.

* cited by examiner

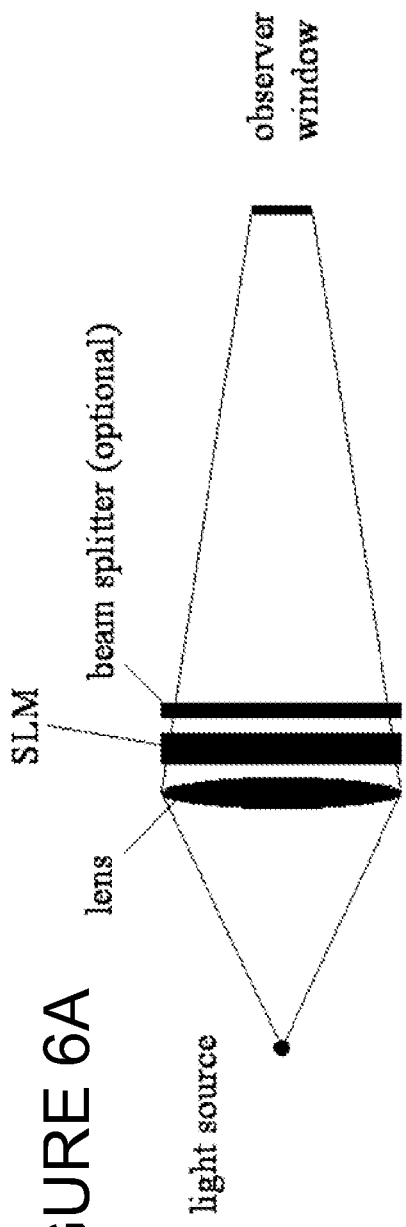
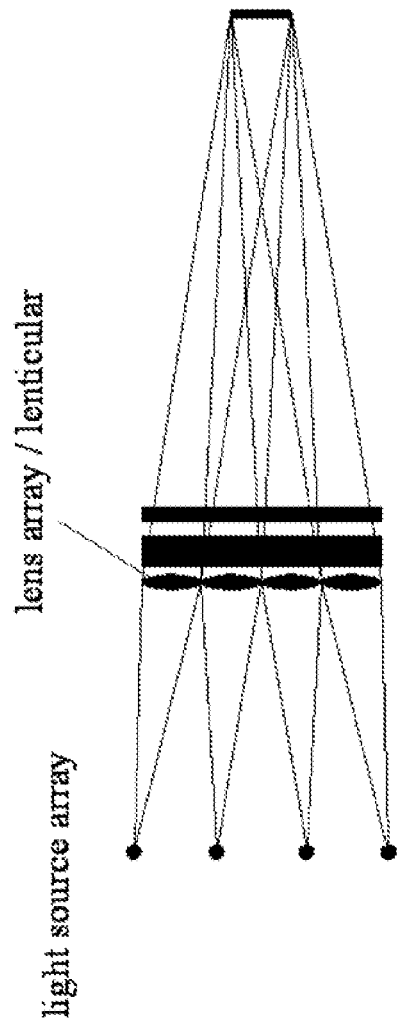
FIGURE 6A
FIGURE 6B

MOBILE TELEPHONY SYSTEM COMPRISING HOLOGRAPHIC DISPLAY

CROSS REFERENCE TO RELATED APPLICATIONS

This application claims the priority of PCT/EP2007/061528, filed on Oct. 26, 2007, which claims priority to Great Britain (GB) Application No. 0621360.7, filed Oct. 26, 2006; GB Application No. 0625838.8, filed Dec. 22, 2006; GB Application No. 0705412.5, filed Mar. 21, 2007; GB Application No. 0705410.9, filed Mar. 21, 2007; GB Application No. 0705408.3, filed Mar. 21, 2007; GB Application No. 0705407.5, filed Mar. 21, 2007; GB Application No. 0705403.4, filed Mar. 21, 2007; GB Application No. 0705401.8, filed Mar. 21, 2007; GB Application No. 0705399.4, filed Mar. 21, 2007; GB Application No. 0705398.6, filed Mar. 21, 2007; GB Application No. 0705409.1, filed Mar. 21, 2007; GB Application No. 0705411.7, filed Mar. 21, 2007; GB Application No. 0705406.7, filed Mar. 21, 2007; GB 0705402.6, filed Mar. 21, 2007; GB Application No. 0705405.9, filed Mar. 21, 2007; and GB Application No. 0705404.2, filed Mar. 21, 2007, the entire contents of which are hereby incorporated in total by reference.

The present application is related to the following applications also filed contemporaneously herewith: Ser. No. 12/447,100 entitled COMPACT HOLOGRAPHIC DISPLAY DEVICE; Ser. No. 12/447,111 entitled COMPACT HOLOGRAPHIC DISPLAY DEVICE; Ser. No. 12/447,116 entitled COMPACT HOLOGRAPHIC DISPLAY DEVICE; Ser. No. 12/447,133 entitled 3D CONTENT GENERATION SYSTEM; Ser. No. 12/447,144 entitled HOLOGRAPHIC DISPLAY DEVICE; and Ser. No. 12/447,149 entitled HOLOGRAPHIC DISPLAY DEVICE COMPRISING MAGNETO-OPTICAL SPATIAL LIGHT MODULATOR. The above are incorporated by reference herein.

BACKGROUND OF THE INVENTION

1. Field of the Invention

The invention relates to a mobile telephony system which provides three dimensional images, especially to a mobile telephony system which includes a called party mobile telephone which locally generates a holographic reconstruction of the calling party using a holographic display that is encoded with a hologram.

2. Technical Background

Computer-generated video holograms (CGHs) are encoded in one or more spatial light modulators (SLMs); the SLMs may include electrically or optically controllable cells. The cells modulate the amplitude and/or phase of light by encoding hologram values corresponding to a video-hologram. The CGH may be calculated e.g. by coherent ray tracing, by simulating the interference between light reflected by the scene and a reference wave, or by Fourier or Fresnel transforms. An ideal SLM would be capable of representing arbitrary complex-valued numbers, i.e. of separately controlling the amplitude and the phase of an incoming light wave. However, a typical SLM controls only one property, either amplitude or phase, with the undesirable side effect of also affecting the other property. There are different ways to modulate the light in amplitude or phase, e.g. electrically addressed liquid crystal SLM, optically addressed liquid crystal SLM, magneto-optical SLM, micro mirror devices or acousto-optic modulators. The modulation of the light may be spatially continuous or composed of individually addressable cells, one-dimensionally or two-dimensionally arranged, binary, multi-level or continuous.

In the present document, the term "encoding" denotes the way in which regions of a spatial light modulator are supplied with control values to encode a hologram so that a 3D-scene can be reconstructed from the SLM. By "SLM encoding a hologram" it is meant that a hologram is encoded on the SLM.

In contrast to purely auto-stereoscopic displays, with video holograms an observer sees an optical reconstruction of a light wave front of a three-dimensional scene. The 3D-scene is reconstructed in a space that stretches between the eyes of an observer and the spatial light modulator (SLM), or possibly even behind the SLM. The SLM can also be encoded with video holograms such that the observer sees objects of a reconstructed three-dimensional scene in front of the SLM and other objects on or behind the SLM.

The cells of the spatial light modulator are preferably transmissive cells which are passed through by light, the rays of which are capable of generating interference at least at a defined position and over a spatial coherence length of a few millimeters. This allows holographic reconstruction with an adequate resolution in at least one dimension. This kind of light will be referred to as 'sufficiently coherent light'.

In order to ensure sufficient temporal coherence, the spectrum of the light emitted by the light source must be limited to an adequately narrow wavelength range, i.e. it must be near-monochromatic. The spectral bandwidth of high-brightness LEDs is sufficiently narrow to ensure temporal coherence for holographic reconstruction. The diffraction angle at the SLM is proportional to the wavelength, which means that only a monochromatic source will lead to a sharp reconstruction of object points. A broadened spectrum will lead to broadened object points and smeared object reconstructions. The spectrum of a laser source can be regarded as monochromatic. The spectral line width of a LED is sufficiently narrow to facilitate good reconstructions.

Spatial coherence relates to the lateral extent of the light source. Conventional light sources, like LEDs or Cold Cathode Fluorescent Lamps (CCFLs), can also meet these requirements if they radiate light through an adequately narrow aperture. Light from a laser source can be regarded as emanating from a point source within diffraction limits and, depending on the modal purity, leads to a sharp reconstruction of the object, i.e. each object point is reconstructed as a point within diffraction limits.

Light from a spatially incoherent source is laterally extended and causes a smearing of the reconstructed object. The amount of smearing is given by the broadened size of an object point reconstructed at a given position. In order to use a spatially incoherent source for hologram reconstruction, a trade-off has to be found between brightness and limiting the lateral extent of the source with an aperture. The smaller the light source, the better is its spatial coherence.

A line light source can be considered to be a point light source if seen from a right angle to its longitudinal extension. Light waves can thus propagate coherently in that direction, but incoherently in all other directions.

In general, a hologram reconstructs a scene holographically by coherent superposition of waves in the horizontal and the vertical directions. Such a video hologram is called a full-parallax hologram. The reconstructed object can be viewed with motion parallax in the horizontal and the vertical directions, like a real object. However, a large viewing angle requires high resolution in both the horizontal and the vertical direction of the SLM.

Often, the requirements on the SLM are lessened by restriction to a horizontal-parallax-only (HPO) hologram.

The holographic reconstruction takes place only in the horizontal direction, whereas there is no holographic reconstruction in the vertical direction. This results in a reconstructed object with horizontal motion parallax. The perspective view does not change upon vertical motion. A HPO hologram requires less resolution of the SLM in the vertical direction than a full-parallax hologram. A vertical-parallax-only (VPO) hologram is also possible but uncommon. The holographic reconstruction occurs only in the vertical direction and results in a reconstructed object with vertical motion parallax. There is no motion parallax in the horizontal direction. The different perspective views for the left eye and right eye have to be created separately.

3. Discussion of Related Art

Typically, devices for generating three dimensional images have lacked compactness—i.e. they require complex and bulky optical systems that preclude their use in portable devices, or in handheld devices, such as mobile telephones. U.S. Pat. No. 4,208,086 for example describes a device for generating large three dimensional images, where the device is of the order of a meter in length. WO 2004/044659 (US2006/0055994), which is incorporated herein by reference, describes a device for reconstructing video three dimensional images with a depth in excess of ten centimeters. Such prior art devices are therefore too deep for mobile phones or other portable or handheld, small display devices.

WO 2004/044659 (US2006/0055994) filed by the applicant describes a device for reconstructing three-dimensional scenes by way of diffraction of sufficiently coherent light; the device includes a point light source or line light source, a lens for focusing the light and a spatial light modulator. In contrast to conventional holographic displays, the SLM in transmission mode reconstructs a 3D-scene in at least one 'virtual observer window' (see Appendix I and II for a discussion of this term and the related technology). Each virtual observer window is situated near the observer's eyes and is restricted in size so that the virtual observer windows are situated in a single diffraction order, so that each eye sees the complete reconstruction of the three-dimensional scene in a frustum-shaped reconstruction space, which stretches between the SLM surface and the virtual observer window. To allow a holographic reconstruction free of disturbance, the virtual observer window size must not exceed the periodicity interval of one diffraction order of the reconstruction. However, it must be at least large enough to enable a viewer to see the entire reconstruction of the 3D-scene through the window(s). The other eye can see through the same virtual observer window, or is assigned a second virtual observer window, which is accordingly created by a second light source. Here, a visibility region, which would typically be rather large, is limited to the locally positioned virtual observer windows. The known solution reconstructs in a diminutive fashion the large area resulting from a high resolution of a conventional SLM surface, reducing it to the size of the virtual observer windows. This leads to the effect that the diffraction angles, which are small due to geometrical reasons, and the resolution of current generation SLMs are sufficient to achieve a high-quality real-time holographic reconstruction using reasonable, consumer level computing equipment.

However, the known method of generating a three dimensional image exhibits the disadvantage that a large, voluminous, heavy and thus expensive lens is required for focusing due to the large SLM surface area. Consequently, the device wilt have a large depth and weight. Another disadvantage is represented by the fact that the reconstruction quality is reduced significantly due to aberrations at the margins (i.e. the edges) when using such large lenses. An improvement in which a light source including a lenticular array is used is disclosed in US 2006/250671, which is incorporated herein by reference, although the disclosure is for the case of large area video holograms.

A mobile phone which generates a three dimensional image is disclosed in US2004/0223049. However, the three dimensional image disclosed therein is generated using autostereoscopy. One problem with autostereoscopically generated three dimensional images is that typically the viewer perceives the image to be inside the display, whereas the viewer's eyes tend to focus on the surface of the display. This disparity between where the viewer's eyes focus and the perceived position of the three dimensional image leads to viewer discomfort after some time in many cases. This problem does not occur, or is significantly reduced, in the case of three dimensional images generated by holography.

SUMMARY OF THE INVENTION

In a first aspect, a mobile telephony system is provided comprising a calling party mobile telephone with an imaging system and a display, the imaging system operable to capture an image of the calling party, in which the calling party mobile telephone sends an image of the calling party to a called party mobile telephone over a wireless link, and the called party mobile telephone locally generates a holographic reconstruction of the calling party using a holographic display that is encoded with a hologram.

The holographic display may include one OLED array writing onto one OASLM forming adjacent layers. The holographic display may include two OLED array and OALSM pairs, each pair consisting of one OLED array writing onto one OASLM forming adjacent layers.

The holographic display may include one EASLM. The holographic display may include two EASLMs.

The mobile telephony system may be such that video holograms are reconstructed. The mobile telephony system may be such that a remote server or intermediary adds a depth map and sends the image of the calling party, plus depth map, to the called party mobile telephone. The called party mobile telephone may include a synchroniser that compensates for the latency introduced by the remote server. The remote server may be programmed with data defining a 3D physical map of the face of the calling party.

The called party mobile telephone may include a freeze frame function that generates a static holographic reconstruction.

The called party mobile telephone may include a zoom function that enables a user to enlarge a portion of the holographic reconstruction.

The called party mobile telephone and/or the calling party mobile telephone may include stereo cameras.

The called party mobile telephone and/or calling party mobile telephone may include a single camera and software that generates a depth map using the data from the single camera.

The called party mobile telephone and/or calling party mobile telephone may display on-screen indications to guide the user to optimally position or orient the camera for optimal image capture and/or holographic reconstruction.

The called party mobile telephone and/or calling party mobile telephone may be a display device which generates a holographic reconstruction which is visible correctly when the user is at a predefined distance from the display.

The called party mobile telephone and/or calling party mobile telephone may be a display device which can be switched from holographic reconstruction mode to conventional 2D display mode.

The called party mobile telephone and/or calling party mobile telephone may be a hand-held portable device.

The called party mobile telephone and/or calling party mobile telephone may be a PDA.

The called party mobile telephone and/or calling party mobile telephone may be a game playing device.

The mobile telephony system may be such that the holographic display generates a holographic reconstruction for a single user to view.

The holographic display may generates a 2D image that is in focus on a screen independent of the distance of the screen from the device in the optical far field without the need for any projection lenses.

The mobile telephony system may be such that SLMs of the holographic display are positioned within 30 mm of a light source and housed within a portable casing.

The mobile telephony system may be such that a beam steering element is present in the holographic display for tracking VOWs, the beam steering element consisting of liquid crystal domains inside an isotropic host material, where the interfaces between the domains and the matrix are prism-shaped, or the shape of sections of a sphere, or the shape of sections of a cylinder, and the orientation of the liquid crystals are controlled using externally applied electric fields so as to vary the local refractive or diffractive properties of the beam steering element.

The called party mobile telephone and/or calling party mobile telephone may be a device in which an OASLM encodes a hologram and a holographic reconstruction is generated by the device when an array of read beams illuminates the OASLM and the OASLM is suitably controlled by an OLED array.

The called party mobile telephone and/or calling party mobile telephone may be a device in which an OLED array writes onto a pair of OASLMs, the OLED array and OASLMs forming adjacent layers, the pair of OASLMs encoding a hologram and a holographic reconstruction being generated by the device when an array of read beams illuminates the pair of OASLMs and the pair of OASLMs is suitably controlled by the OLED array.

The called party mobile telephone and/or calling party mobile telephone may be a device comprising a first OLED array writing onto a first OASLM, the first OLED array and the first OASLM forming adjacent layers, and a second OLED array writing onto a second OASLM, the second OLED array and the second OASLM forming adjacent layers, the first and second OASLMs encoding a hologram and a holographic reconstruction being generated by the device when an array of read beams illuminates the first and second OASLMs and the first and second OASLMs are suitably controlled by the first and second OLED arrays.

The called party mobile telephone and/or calling party mobile telephone may be a device in which the first and second pairs of OLED/OASLM combinations modulate amplitudes and phases of the array of read beams in a controlled manner.

The called party mobile telephone and/or calling party mobile telephone may be a device in which one OLED array and OASLM pair modulates a first combination of amplitude and phase of the array of read beams, and a further OLED array and OASLM pair modulates a second, different combination of amplitude and phase of the array of read beams.

The called party mobile telephone and/or calling party mobile telephone may be a display device generating a holographic reconstruction for a single user to view, the display comprising a first OLED array writing onto a first OASLM forming adjacent layers; together with a second OLED array writing onto a second OASLM forming adjacent layers.

The called party mobile telephone and/or calling party mobile telephone may be a display device which has a display mode in which it generates a 2D image that is in focus on a screen independent of the distance of the screen from the device without the need for any projection lenses, the display comprising a first OLED writing onto a first OASLM forming adjacent layers; together with a second OLED writing onto a second OASLM forming adjacent layers.

The called party mobile telephone and/or calling party mobile telephone may have a display mode in which it is an autostereoscopic display device comprising an OLED array writing onto an amplitude modulating OASLM forming adjacent layers, and the device including beam splitters that enable an observer's eyes to see a stereoscopic image when an array of read beams illuminates the OASLM and the OASLM is suitably controlled by the OLED array.

In a further aspect, a method may be used which includes the step of using the mobile telephony system as described herein.

In a further aspect, a method is provided of providing telecommunications services in which a network operator provides the calling party and/or called party mobile telephones, the wireless link and the remote server and where the calling party mobile telephone is provided with an imaging system and a display, the imaging system operable to capture an image of the calling party, in which the calling party mobile telephone sends an image of the calling party to a called party mobile telephone over the wireless link, and the called party mobile telephone locally generates a holographic reconstruction of the calling party using a holographic display that is encoded with a hologram.

The method of providing telecommunications services may be such that the called party mobile telephone display includes at least one OLED array writing onto at least one OASLM forming adjacent layers.

In a further aspect, a method is provided of making a video call from a calling party mobile telephone with an imaging system and a display, the imaging system operable to capture an image of a calling party, in which the calling party mobile telephone sends an image of the calling party to a called party mobile telephone, which locally generates a holographic reconstruction of the calling party using a holographic display that is encoded with a hologram.

The method of making a video call from a calling party mobile telephone may be such that the called party mobile telephone display includes an OLED array writing onto an OASLM forming adjacent layers.

The method of making a video call from a calling party mobile telephone may be such that a remote server or intermediary adds a depth map and sends the image of the calling party, plus depth map, to the called party mobile telephone.

The method of making a video call from a calling party mobile telephone may be such that the called party mobile telephone includes a synchroniser that compensates for the latency introduced by the remote server.

The method of making a video call from a calling party mobile telephone may be such that the remote server is programmed with data defining a 3D physical map of the face of the calling party.

The method of making a video call from a calling party mobile telephone may be such that the called party mobile telephone includes a freeze frame function that generates a static holographic reconstruction.

The method of making a video call from a calling party mobile telephone may be such that the called party mobile telephone includes a zoom function that enables a user to enlarge a portion of the holographic reconstruction.

The method of making a video call from a calling party mobile telephone may be such that the called party mobile telephone and/or the calling party mobile telephone include stereo cameras.

The method of making a video call from a calling party mobile telephone may be such that the called party mobile telephone and/or calling party mobile telephone include a single camera and software that generates a depth map using the data from the single camera.

The method of making a video call from a calling party mobile telephone may be such that the called party mobile telephone and/or calling party mobile telephone display on-screen indications to guide the user to optimally position or orient the camera for optimal image capture and/or holographic reconstruction.

By "SLM encoding a hologram" it is meant that a hologram is encoded on the SLM.

BRIEF DESCRIPTION OF THE DRAWINGS

FIG. 6A is a diagram of a holographic display.

FIG. 6B is a diagram of a holographic display which lends itself to achieving compactness.

DETAILED DESCRIPTION

Figure 1:
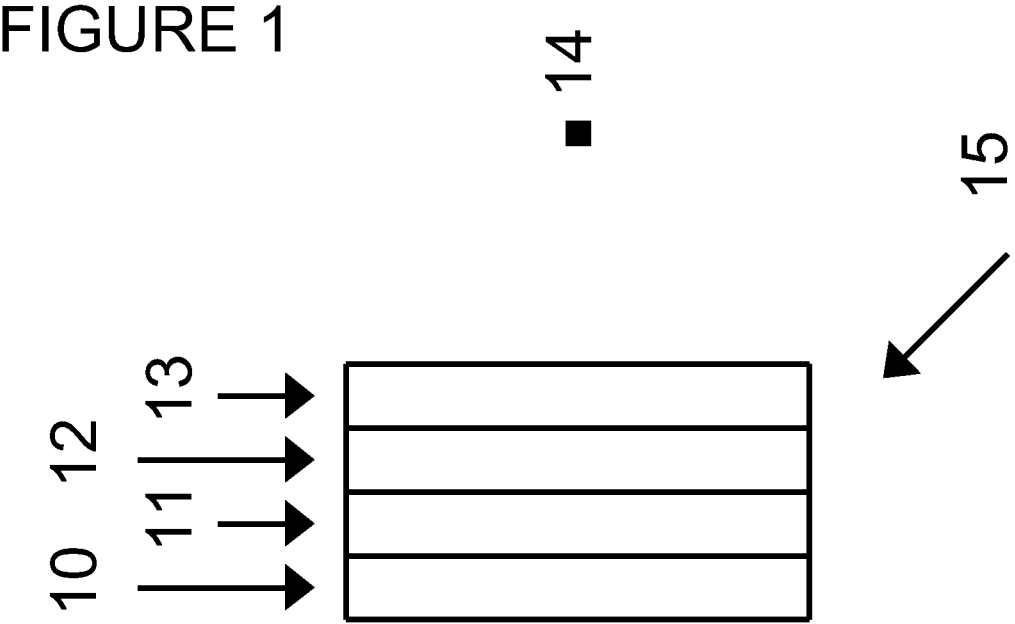
FIG. 1 is a diagram of a holographic display device including a single OASLM and a single OLED array.

Various implementations will now be described.

A. Compact Combination of an Infra Red OLED Display and OASLM

This implementation provides a compact combination of an OASLM and an infra red light emitting display which can write a pattern on the OASLM, the combination being capable of generating a three dimensional image under suitable illumination conditions.

An OASLM comprises a photosensor layer and a liquid crystal (LC) layer which is located between conducting electrodes. When a voltage is applied to the electrodes, a light pattern incident on the photosensor layer is transferred to the LC layer where it is used to modulate a read beam. In prior art, the incident light pattern is provided by a write beam that is modulated by an electrically addressed spatial light modulator (EASLM). The EASLM is illuminated by a light source and imaged onto the OASLM. Usually, the write beam is incoherent to avoid speckle patterns whereas the read beam is coherent to enable the generation of a diffraction pattern.

An advantage of an OASLM with respect to an EASLM is that an OASLM may have a continuous, non-pixellated or non-patterned structure, whereas a EASLM has a pixellated structure. Pixels have sharp edges in the spatial distribution of light they produce: such sharp edges correspond to high spatial frequencies. High spatial frequencies lead to broad angle diffraction features in the optical far field. Therefore an EASLM will produce undesirable optical diffraction artefacts in the optical far field, which have to be removed using known techniques such as spatial filtering. Spatial filtering requires an additional step in the optical processing procedure, which makes devices thicker and leads to wasted light. An advantage of OASLM-based devices is that they permit continuous pattern production in the OASLM. A continuous pattern will tend to have less abrupt variations in the optical intensity in any given direction transverse to the beam propagation direction. The less abrupt variations therefore possess a lower concentration of high spatial frequencies than in the case of pixel edges generated by an EASLM device. The reduced concentration of high spatial frequencies in the case of an OASLM-containing device may make optical processing easier and more efficient than in the case of an EASLM-containing device. In addition, an OASLM device may be a bistable device, in contrast to an EASLM. Therefore an OASLM may have lower power requirements than an EASLM device, which may increase the battery lifetime in a portable device, or in a handheld device.

In this implementation, a compact device with no requirement for imaging optics is described. The OASLM is written with an infra red OLED display. The OLED display is directly attached to the OASLM, thus forming a compact device without imaging optics. OLEDs may be tiled so as to make up an OLED array. The OASLM may be made up from multiple smaller tiled OASLMs.

The compact combination of the OLED display and the OASLM may be transparent. Transparent OLED-displays are known such as those described in the "OLED MATERIALS" section below. In one example, the compact combination of the OLED display and the OASLM is illuminated from the opposite side to the side on which the three dimensional image is formed, with visible light transmitted through the OLED and the OASLM towards the observer. Preferably, the OLED display emits infrared light (IR) that writes the IR-sensitive photosensor layer of the OASLM. Because the human eye is not sensitive to IR light, the observer will not see any light which originates from the IR write beam.

In another example, the compact combination of the OLED display and the OASLM may be such that the write beam and the read beam are incident on opposite sides of the OASLM. In another example, the compact combination of the OLED display and the OASLM may be such that a reflective layer is present on the side of the OASLM which is the side opposite to the OLED display such that the three dimensional image is viewable from the same side of the OASLM as the side on which the OLED display is present, where the illumination source is also present on the same side of the OASLM as the OLED display: this is an example of a reflective display.

An implementation includes an array of infra red OLEDs, the infra red emitting OLEDs permitting control of the spatial distribution of the amplitude or phase, or some combination of the amplitude and phase, of the visible light transmitted by an OASLM, such that a hologram is generated in the OASLM. An OASLM may comprise of a pair of spaced transparent plates on which two electrically conducting films are coated, as described in U.S. Pat. No. 4,941,735, which is incorporated herein by reference. A continuous or discontinuous photosensitive film may be coated on one of the conductive films. A bistable ferroelectric liquid crystal, or some other type of liquid crystal, may be confined between the other conductive film and the photosensitive film. An activating voltage may be applied to the conductive films. In an OASLM, an optical write beam may program or activate the polarization of an optical read beam, on a pixel-by-pixel basis. The write beam may program the OASLM by activating individually photosensitive areas of the OASLM. Areas of the OASLM that are programmed accordingly may rotate the polarization of the read beam through being activated by the write beam.

In FIG. 1, an example of an implementation is disclosed. 10 is an illumination apparatus for providing illumination of a plane area, where the illumination has sufficient coherence so as to be able to lead to the generation of a three dimensional image. An example of an illumination apparatus is disclosed in US 2006/250671 for the case of large area video holograms, one example of which is reproduced in FIG. 4. Such an apparatus as 10 may take the form of an array of white light sources, such as cold cathode fluorescent lamps or white-light light emitting diodes which emit light which is incident on a focusing system which may be compact, such as a lenticular array or a microlens array. Alternatively, light sources for 10 may comprise of red, green and blue lasers or red, green and blue light emitting diodes which emit light of sufficient coherence. However, non-laser sources with sufficient spatial coherence (eg. light emitting diodes, OLEDs, cold cathode fluorescent lamps) are preferred to laser sources. Laser sources have disadvantages such as causing laser speckle in the holographic reconstructions, being relatively expensive, and having possible safety problems with regard to possibly damaging the eyes of holographic display viewers or of those who work in assembling the holographic display devices.

Elements 10-13 may be about a few centimeters in thickness, or less, in total. Element 11 may comprise of an array of colour filters, such that pixels of coloured light, such as red, green and blue light, are emitted towards element 12, although the colour filters may not be required if coloured sources of light are used. Element 12 is an array of infra red emitting OLEDs on a transparent substrate. The array of infra red emitting OLEDs is such that each infra red emitting OLED emits light parallel to and coincident with the light from a unique corresponding colour pixel, in the direction of element 13. Element 13 is an OASLM. With regard to the OASLM, the array of infra red emitting OLEDs supplies the write beams; the coloured beams transmitted by element 11 are the read beams. A viewer located at point 14 some distance from the device which includes the compact hologram generator 15 may view a three dimensional image when viewing in the direction of 15. Elements 10, 11, 12 and 13 are disposed so as to be in physical, e.g. actual mechanical, contact, each forming a layer of a structure so that the whole is a single, unitary object. Physical contact may be direct. Or it may be indirect, if there is a thin, intervening layer, coating of film between adjacent layers. Physical contact may be limited to small regions that ensure correct mutual alignment or registration, or may extend to larger areas, or the entire surface of a layer. Physical contact may be achieved by layers being bonded together such as through the use of an optically transmitting adhesive, so as to form a compact hologram generator 15, or by any other suitable process (see also section below titled Outline Manufacturing Process).

Element 10 may include one or two prismatic optical films for increasing display brightness: such films are disclosed eg. in U.S. Pat. No. 5,056,892 and in U.S. Pat. No. 5,919,551, though others are known. Element 10 may include a polarizing optical element, or a set of polarizing optical elements. One example is a linear polarizer sheet. A further example is a reflective polarizer which transmits one linear polarization state and reflects the orthogonal linear polarization state—such a sheet is described in U.S. Pat. No. 5,828,488, for example, though others are known. A further example is a reflective polarizer which transmits one circular polarization state and reflects the orthogonal circular polarization state—such a sheet is described in U.S. Pat. No. 6,181,395, for example, though others are known. Element 10 may include a focusing system which may be compact such as a lenticular array or a microlens array. Element 10 may include other optical elements which are known in the field of backlight technology.

Figure 4:
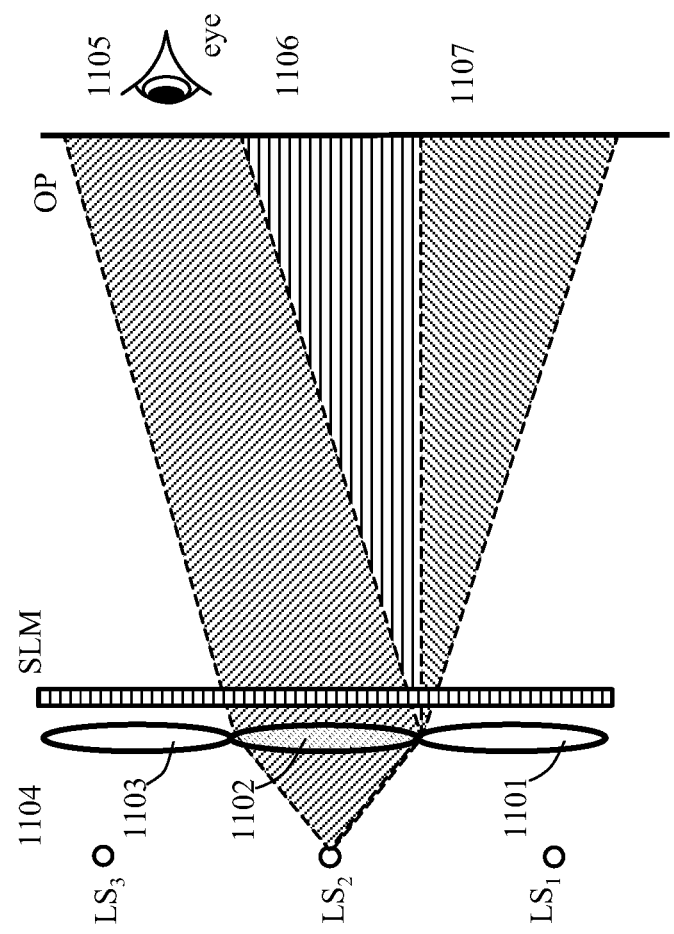
FIG. 4 is a diagram of a holographic display according to the prior art.

FIG. 4 is a prior art side view showing three focusing elements 1101, 1102, 1103 of a vertical focusing system 1104 in the form of cylindrical lenses horizontally arranged in an array, taken from WO 2006/119920, which is incorporated herein by reference. The nearly collimated beams of a horizontal line light source $LS_2$ passing through the focusing element 1102 of an illumination unit and running to an observer plane OP are exemplified. According to FIG. 4, a multitude of line light sources $LS_1$, $LS_2$, $LS_3$ are arranged one above another. Each light source emits light which is sufficiently spatially coherent in the vertical direction and which is spatially incoherent in the horizontal direction. This light passes through the transmissive cells of the light modulator SLM. The light is only diffracted in the vertical direction by cells of the light modulator SLM, which are encoded with a hologram. The focusing element 1102 images a light source $LS_2$ in the observer plane OP in several diffraction orders, of which only one is useful. The beams emitted by the light source $LS_2$ are exemplified to pass only through the focusing element 1102 of focusing system 1104. In FIG. 4 the three beams show the first diffraction order 1105, the zeroth order 1106 and the minus first order 1107. In contrast to a single point light source, a line light source allows the production of a significantly higher luminous intensity. Using several holographic regions with already increased efficiency and with the assignment of one line light source for each portion of a 3D-scene to be reconstructed, improves the effective luminous intensity. Another advantage is that, instead of a laser, a multitude of conventional light sources, which are positioned e.g. behind a slot diaphragm, which may also be part of a shutter, generate sufficiently coherent light.

B. Compact Combination of Two Pairs of OLED and OASLM Combinations

In a further implementation, a combination of two pairs of a compact combination of an OLED array and an OASLM can be used to modulate the amplitude and the phase of light in sequence and in a compact way. Thus, a complex number, which consists of an amplitude and a phase, can be encoded in the transmitted light, on a pixel by pixel basis.

This implementation comprises a first compact combination pair of an IR-OLED array and a OASLM and a second compact combination pair of an IR-OLED array and a OASLM.

The first pair modulates the amplitude of transmitted light and the second pair modulates the phase of the transmitted light. Alternatively, the first pair modulates the phase of transmitted light and the second pair modulates the amplitude of the transmitted light. Each compact combination pair of an IR-OLED array and a OASLM may be as described in section A above. The two compact combination pairs of an IR-OLED array and a OASLM are separated by an IR-filter that is transparent for visible light and is absorbing for IR.

In a first step the first IR-OLED array writes the pattern for amplitude modulation in the first OASLM. In a second step the second IR-OLED array writes the pattern for phase modulation in the second OASLM. The IR-Filter prevents the leakage of IR from the first compact combination pair of an IR-OLED array and an OASLM to the second compact combination pair of an IR-OLED array and an OASLM. The IR-Filter also prevents the leakage of IR from the second compact combination pair of an IR-OLED array and an OASLM to the first compact combination pair of an IR-OLED array and an OASLM. However, the IR filter transmits the visible light from the first compact combination pair of an IR-OLED array and an OASLM for use as the read beam in the second compact combination pair of an IR-OLED array and an OASLM. The light transmitted by the second OASLM has been modulated in its amplitude and in its phase as a result of which an observer may observe a three dimensional image when viewing the light emitted by the device in which the two compact combination pairs are housed.

It will be appreciated by those skilled in the art that the modulation of phase and amplitude facilitates the representation of complex numbers. Furthermore, OLED-displays and OASLMs may both have high resolution. Therefore, this implementation may be used to generate holograms such that a three dimensional image may be viewed by a viewer.

Figure 2:
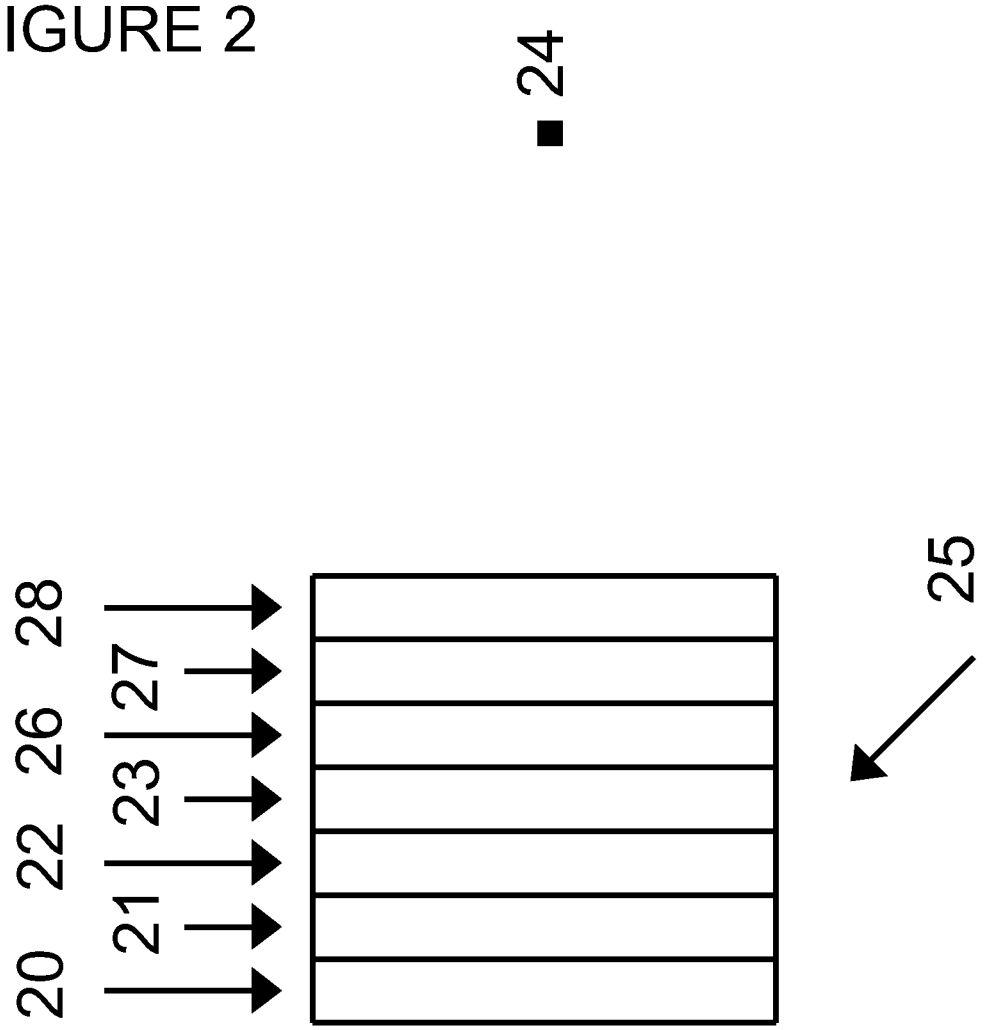
FIG. 2 is a diagram of a holographic display device including a pair of components, where each component contains a single OASLM and a single OLED array.

In FIG. 2, an example of an implementation is disclosed. 20 is an illumination apparatus for providing illumination of a plane area, where the illumination has sufficient coherence so as to be able to lead to the generation of a three dimensional image. An example is disclosed in US 2006/250671 for the case of large area video holograms. Such an apparatus as 20 may take the form of an array of a white light sources, such as cold cathode fluorescent lamps or white light light emitting diodes which emit light which is incident on a focusing system which may be compact such as a lenticular array or a microlens array. Alternatively, light sources for 20 may comprise of red, green and blue lasers or red, green and blue light emitting diodes which emit light of sufficient coherence. However, non-laser sources with sufficient spatial coherence (eg. light emitting diodes, OLEDs, cold cathode fluorescent lamps) are preferred to laser sources. Laser sources have disadvantages such as causing laser speckle in the holographic reconstructions, being relatively expensive, and having possible safety problems with regard to possibly damaging the eyes of holographic display viewers or of those who work in assembling the holographic display devices.

Elements 20-23, 26-28 may be about a few centimeters in thickness, or less, in total. Element 21 may comprise of an array of colour filters, such that pixels of colour light, such as red, green and blue light, are emitted towards element 22, although the colour filters may not be required if coloured sources of light are used. Element 22 is an array of infra red emitting OLEDs on a transparent substrate. The array of infra red emitting OLEDs is such that each infra red emitting OLED emits light parallel to and coincident with the light from a unique corresponding colour pixel, in the direction of element 23. Element 23 is an OASLM. With regard to the OASLM, the array of infra red emitting OLEDs supplies the write beams; the coloured beams transmitted by element 21 are the read beams. Element 26 is an infra red filter which blocks IR light but transmits visible light, such that IR light from element 22 does not influence element 27. Element 27 is an OASLM. Element 28 is an array of infra red emitting OLEDs on a transparent substrate. The array of infra red emitting OLEDs is such that each infra red emitting OLED emits light parallel to and coincident with the light from a unique corresponding colour pixel, in the direction of element 27. With regard to the OASLM 27, the array of infra red emitting OLEDs 28 supplies the write beams; the coloured beams transmitted by element 26 are the read beams. With regard to the transmitted light, element 23 modulates the amplitude and element 27 modulates the phase. Alternatively, element 27 modulates the amplitude and element 23 modulates the phase. Because the light from the array infra red emitting OLEDs on a transparent substrate 28 is emitted in the direction of element 26, element 26 may absorb IR light, which prevents light from element 28 from addressing OASLM 23. Such a configuration, in which the two OLED arrays 22 and 28 emit light in substantially opposite directions, ensures that the two OASLMs 23 and 27 may be placed in close proximity. The close proximity of OASLMs 23 and 27 enables a reduction in the problems of optical losses and pixel cross-talk arising from optical beam divergence: when OASLMs 23 and 27 are in closer proximity, a better approximation to non-overlapping propagation of the beams of coloured light through the OASLMs may be achieved. The order of elements 27 and 28 may be reversed in FIG. 2, but this is not thought be the optimal configuration for achieving the goals of high transmission of and low cross-talk between the beams of coloured light through the OASLMs 23 and 27.

Element 20 may include one or two prismatic optical films for increasing display brightness: such films are disclosed eg. in U.S. Pat. No. 5,056,892 and in U.S. Pat. No. 5,919,551, though others are known. Element 20 may include a polarizing optical element, or a set of polarizing optical elements. One example is a linear polarizer sheet. A further example is a reflective polarizer which transmits one linear polarization state and reflects the orthogonal linear polarization state—such a sheet is described in U.S. Pat. No. 5,828,488, for example, though others are known. A further example is a reflective polarizer which transmits one circular polarization state and reflects the orthogonal circular polarization state—such a sheet is described in U.S. Pat. No. 6,181,395, for example, though others are known. Element 20 may include a focusing system which may be compact such as a lenticular array or a microlens array. Element 20 may include other optical elements which are known in the field of backlight technology.

A viewer located at point 24 some distance from the device which includes the compact hologram generator 25 may view a three dimensional image when viewing in the direction of 25. Elements 20, 21, 22, 23, 26, 27 and 28 are arranged so that adjacent elements are in physical, e.g. fixed mechanical, contact, each forming a layer of a structure so that the whole is a single, unitary object. Physical contact may be direct. Or it may be indirect, if there is a thin, intervening layer, coating of film between adjacent layers. Physical contact may be limited to small regions that ensure correct mutual alignment or registration, or may extend to larger areas, or the entire surface of a layer. Physical contact may be achieved by layers being bonded together such as through the use of an optically transmitting adhesive, so as to form a compact hologram generator 25, or by any other suitable process (see also section below titled Outline Manufacturing Process).

In FIG. 2, in the ideal case the arrays of OLEDs 22 and 28 emit light that is well-collimated. However, OLEDs may emit light that is not well collimated, such as light in a Lambertian (i.e. totally diffuse) distribution. Where the OLED light emission is not well-collimated, the OLEDs may be situated as close as possible to their corresponding OASLM. In this case, it is thought that the intensity incident on the OASLM surface will vary approximately as the square of the cosine of the angle of incidence. Light incident at 45° or 60° will result in respective intensities of only a half or a quarter of normally incident light. Thus provided that the OLEDs are sufficiently spaced apart, and sufficiently small with respect to the visible light pixel size, and sufficiently close to the OASLM, geometric effects will lead to significant variations in the potential difference generated spatially across the OASLM, even in the limiting case that the OLED light emission distribution is Lambertian. The incident infra red light intensity may not fall to zero in between the points on the OASLM where OLED light is normally incident, which may lead to a reduction in the contrast which can be achieved in the device. But this contrast reduction may be acceptable if it simplifies device construction.

Figure 8:
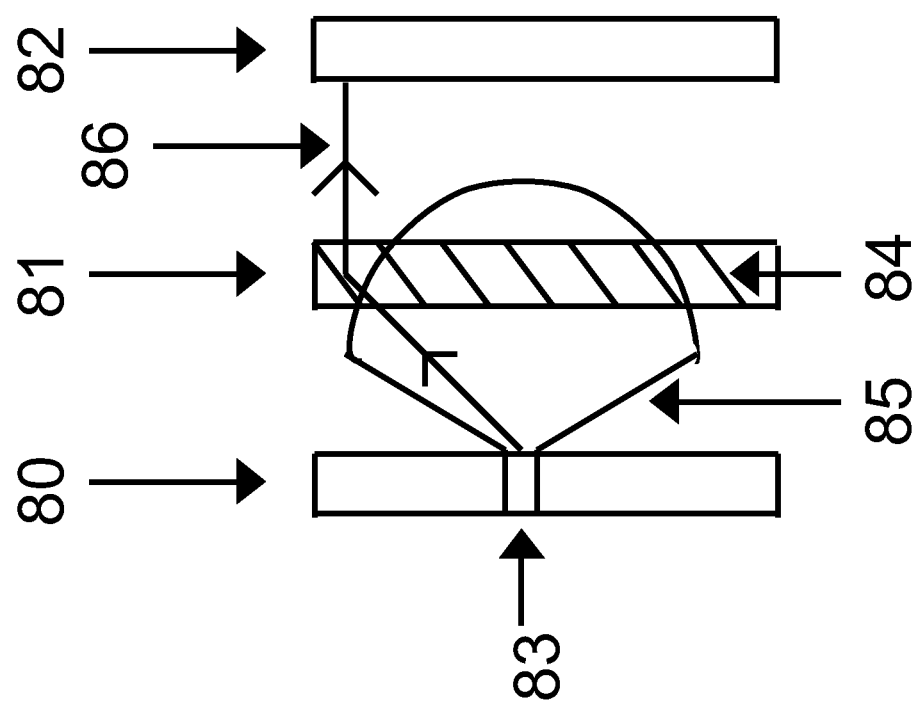
FIG. 8 is a diagram of a component of a holographic display which incorporates a Bragg filtering holographic optical element to improve the collimation of light emitted by an OLED array.

In FIG. 2, in the ideal case the arrays of OLEDs 22 and 28 emit light that is well-collimated. However, OLEDs may emit light that is not well collimated, such as light in a Lambertian (i.e. totally diffuse) distribution. Where the OLED light emission is not well-collimated, the OLEDs' geometric light distribution may be modified through the use of a Bragg filter holographic optical element, such as described in U.S. Pat. No. 5,153,670 which is incorporated herein by reference. The Bragg filter holographic optical element results in light that is collimated, or better collimated, than in the absence of this element. An example of the functioning of the Bragg filter holographic optical element is shown in FIG. 8. In FIG. 8, 80 is an OLED array, 81 is a holographic optical element Bragg filter which contains Bragg planes such as Bragg plane 84, and 82 is an OASLM. A single OLED 83 in OLED array 80 emits infra red light in a distribution indicated schematically as 85. A light ray 86 is indicated which is emitted by OLED array 80, undergoes scattering in holographic optical element 81, and is subsequently incident on OASLM 82 at approximately normal incidence. In this manner, improved collimation of the infra red light that is incident on OASLM 82 may be achieved.

Figure 5:
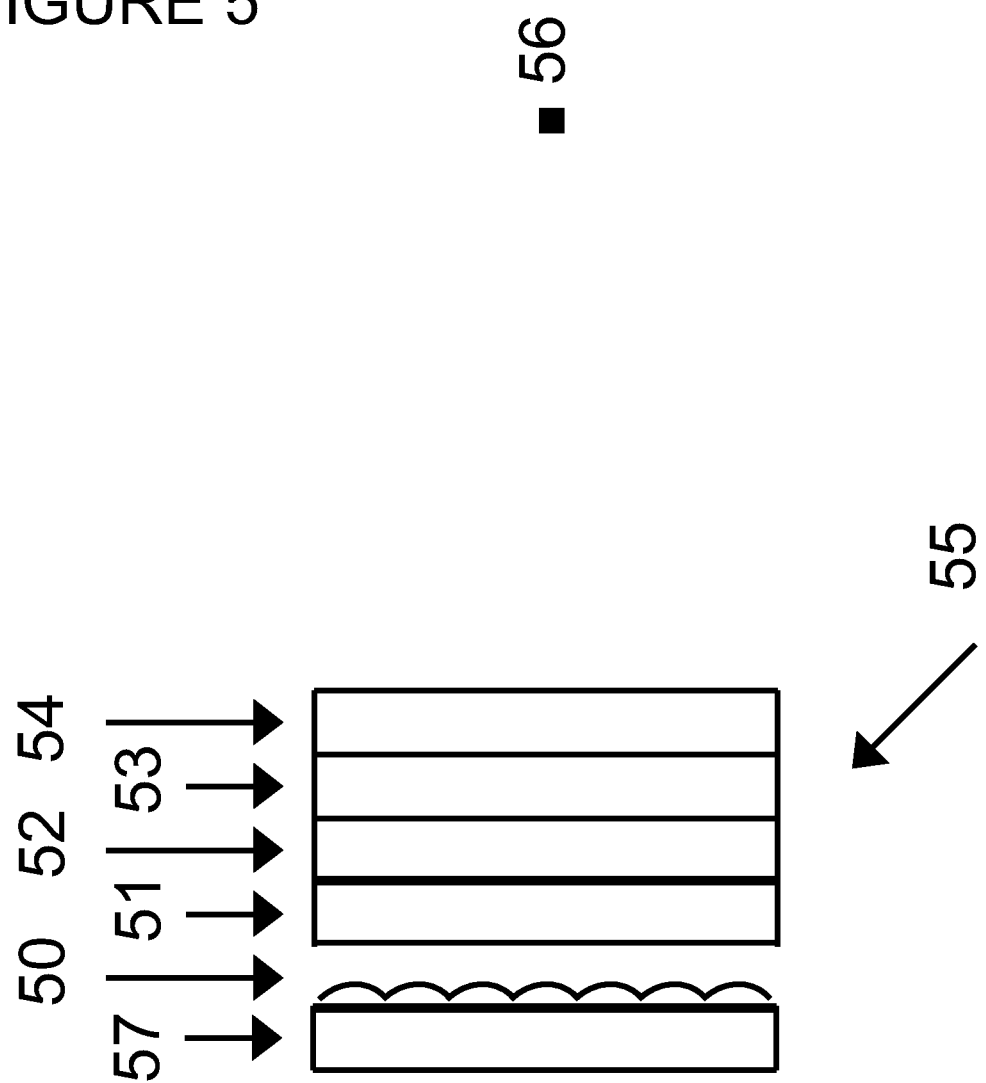
FIG. 5 is a diagram of a holographic display in which a single array of OLEDs controls the two OASLMs.

A further implementation is disclosed in FIG. 5. 57 is an illumination apparatus for providing illumination of a plane area, where the illumination has sufficient coherence so as to be able to lead to the generation of a three dimensional image. An example is disclosed in US 2006/250671 for the case of large area video holograms. Such an apparatus may take the form of an array of a white light sources, such as cold cathode fluorescent lamps or white light light emitting diodes which emit light which is incident on a focusing system which may be compact such as a lenticular array or a microlens array 50. Alternatively, light sources for 57 may comprise of red, green and blue lasers or red, green and blue light emitting diodes which emit light of sufficient coherence. However, non-laser sources with sufficient spatial coherence (eg. light emitting diodes, OLEDs, cold cathode fluorescent lamps) are preferred to laser sources. Laser sources have disadvantages such as causing laser speckle in the holographic reconstructions, being relatively expensive, and having possible safety problems with regard to possibly damaging the eyes of holographic display viewers or of those who work in assembling the holographic display devices.

Element 57 may include one or two prismatic optical films for increasing display brightness: such films are disclosed eg. in U.S. Pat. No. 5,056,892 and in U.S. Pat. No. 5,919,551, though others are known. Element 57 may include a polarizing optical element, or a set of polarizing optical elements. One example is a linear polarizer sheet. A further example is a reflective polarizer which transmits one linear polarization state and reflects the orthogonal linear polarization state—such a sheet is described in U.S. Pat. No. 5,828,488, for example, though others are known. A further example is a reflective polarizer which transmits one circular polarization state and reflects the orthogonal circular polarization state—such a sheet is described in U.S. Pat. No. 6,181,395, for example, though others are known. Element 57 may include other optical elements which are known in the field of backlight technology.

Elements 57, 50-54 may be about a few centimeters in thickness, or less, in total. Element 51 may comprise of an array of colour filters, such that pixels of colour light, such as red, green and blue light, are emitted towards element 52, although the colour filters may not be required if coloured sources of light are used. Element 52 is an array of infra red emitting OLEDs on a transparent substrate. The array of infra red emitting OLEDs is such that for each colour pixel, a unique pair comprising of two types of infra red emitting OLED emit light parallel to and coincident with the light from their corresponding colour pixel, in the direction of element 53. The first type of infra red emitting OLED emits infra red light of a first wavelength. The second type of infra red emitting OLED emits infra red light of a second wavelength, which is different to the first wavelength. Element 53 is an OASLM. Element 54 is a further OASLM. With regard to the OASLMs, the array of infra red emitting OLEDs supplies the write beams; the coloured beams transmitted by element 51 are the read beams. OASLM 53 is controlled by the first wavelength of the two infra red wavelengths emitted by the OLED array 52. OASLM 53 is insensitive to the second wavelength of the two infra red wavelengths emitted by the OLED array 52, and transmits the second wavelength of the two infra red wavelengths emitted by the OLED array 52. OASLM 54 is controlled by the second wavelength of the two infra red wavelengths emitted by the OLED array 52. OASLM 54 is insensitive to the first wavelength of the two infra red wavelengths emitted by the OLED array 52, or light of the first infra red wavelength is prevented from reaching OASLM 54 through its absorption and/or reflection by OASLM 53, followed by its absorption elsewhere, so that insensitivity of OASLM 54 to the first infra red wavelength is not necessarily a requirement of the compact hologram generator 55. Alternatively it may be possible to use a single type of OLED which emits two different wavelengths, where the relative intensity of the two different wavelengths depends on a parameter such as the voltage across the OLED. Emission of the two different wavelengths could be controlled by temporal multiplexing.

With regard to the transmitted light, element 53 modulates the amplitude and element 54 modulates the phase. Alternatively, element 54 modulates the amplitude and element 53 modulates the phase. Such a configuration, in which the OLED array 52 emits light of two different wavelengths, ensures that the two OASLMs 53 and 54 may be placed in close proximity. The close proximity of OASLMs 53 and 54 enables a reduction in the problems of optical losses and pixel cross-talk arising from optical beam divergence: when OASLMs 53 and 54 are in closer proximity, a better approximation to non-overlapping propagation of the beams of coloured light through the OASLMs may be achieved.

A viewer located at point 56 some distance from the device which includes the compact hologram generator 55 may view a three dimensional image when viewing in the direction of 55. Elements 57, 50, 51, 52, 53, and 54 are arranged so that adjacent elements are in physical, e.g. fixed mechanical, contact, each forming a layer of a structure so that the whole is a single, unitary object. Physical contact may be direct. Or it may be indirect, if there is a thin, intervening layer, coating of film between adjacent layers. Physical contact may be limited to small regions that ensure correct mutual alignment or registration, or may extend to larger areas, or the entire surface of a layer. Physical contact may be achieved by layers being bonded together such as through the use of an optically transmitting adhesive, so as to form a compact hologram generator 55, or by any other suitable process (see also section below titled Outline Manufacturing Process).

Where an OASLM performs amplitude modulation, in a typical configuration the incident read optical beams will be linearly polarized by passing the beams through a linear polarizer sheet. Amplitude modulation is controlled by the rotation of the liquid crystal in an applied electric field, where the electric field is generated by the photosensitive layer, which influences the polarization state of the light. In such a device, the light which exits the OASLM is passed through a further linear polarizer sheet, which enables intensity reduction as a result of any change in the polarization state of the light as it passes through the OASLM.

Where an OASLM performs phase modulation, in a typical configuration the incident read optical beams will be linearly polarized by passing the beams through a linear polarizer sheet, unless they are already in a defined linear polarization state. Phase modulation is controlled by application of an applied electric field, where the electric field is generated by the photosensitive layer, which influences the phase state of the light. In one example of phase modulation implemented using a nematic phase liquid crystal, the optic axis direction is fixed in space but the birefringence is a function of the applied voltage. In one example of phase modulation implemented using a ferroelectric liquid crystal, the birefringence is fixed, but the direction of the optic axis is controlled by the applied voltage. In phase modulation implemented using either method, the output beam has a phase difference with respect to the input beam that is a function of the applied voltage. An example of a liquid crystal cell which can perform phase modulation is a Freedericksz cell arrangement in which antiparallel aligned domains of a nematic liquid crystal with a positive dielectric anisotropy are used, as described in U.S. Pat. No. 5,973,817 which is incorporated herein by reference.

C. Compact Combination of an EASLM and a Compact Light Source

This implementation provides a compact combination of an EASLM and a compact light source of sufficient coherence, the combination being capable of generating a three dimensional image under suitable illumination conditions.

In this implementation, a compact combination of an EASLM and a compact light source, with no requirement for imaging optics, is described. This implementation provides a compact combination of a light source or sources, a focusing means, an electrically addressed spatial light modulator (EASLM) and an optional beam splitter element, the combination being capable of generating a three dimensional image under suitable illumination conditions.

Figure 11:
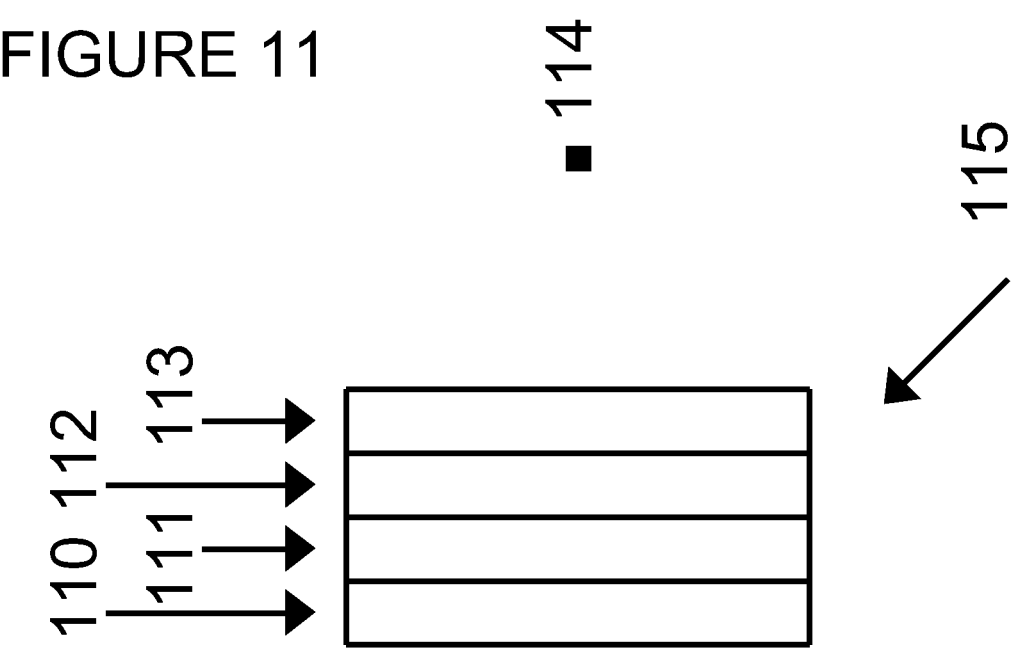
FIG. 11 is a diagram of a holographic display device including a single EASLM.

In FIG. 11, an example of an implementation is disclosed. 110 is an illumination apparatus for providing illumination of a plane area, where the illumination has sufficient coherence so as to be able to lead to the generation of a three dimensional image. An example of an illumination apparatus is disclosed in US 2006/250671 for the case of large area video holograms, one example of which is reproduced in FIG. 4. Such an apparatus as 110 may take the form of an array of white light sources, such as cold cathode fluorescent lamps or white light light emitting diodes which emit light which is incident on a focusing system which may be compact, such as a lenticular array or a microlens array. Alternatively, light sources for 110 may comprise of red, green and blue lasers or red, green and blue light emitting diodes which emit light of sufficient coherence. The red, green and blue light emitting diodes may be organic light emitting diodes (OLEDs). However, non-laser sources with sufficient spatial coherence (eg. light emitting diodes, OLEDs, cold cathode fluorescent lamps) are preferred to laser sources. Laser sources have disadvantages such as causing laser speckle in the holographic reconstructions, being relatively expensive, and having possible safety problems with regard to possibly damaging the eyes of holographic display viewers or of those who work in assembling the holographic display devices.

Element 110 may be about a few centimeters in thickness, or less. In a preferred embodiment, elements 110-113 in total are less than 3 cm in thickness, so as to provide a compact source of light of sufficient coherence. Element 111 may comprise of an array of colour filters, such that pixels of coloured light, such as red, green and blue light, are emitted towards element 112, although the colour filters may not be required if coloured sources of light are used. Element 112 is an EASLM. Element 113 is an optional beamsplitter element. A viewer located at point 114 some distance from the device which includes the compact hologram generator 115 may view a three dimensional image when viewing in the direction of 115.

Element 110 may include one or two prismatic optical films for increasing display brightness: such films are disclosed eg. in U.S. Pat. No. 5,056,892 and in U.S. Pat. No. 5,919,551, though others are known. Element 110 may include a polarizing optical element, or a set of polarizing optical elements. One example is a linear polarizer sheet. A further example is a reflective polarizer which transmits one linear polarization state and reflects the orthogonal linear polarization state—such a sheet is described in U.S. Pat. No. 5,828,488, for example, though others are known. A further example is a reflective polarizer which transmits one circular polarization state and reflects the orthogonal circular polarization state—such a sheet is described in U.S. Pat. No. 6,181,395, for example, though others are known. Element 110 may include other optical elements which are known in the field of backlight technology.

An EASLM is a SLM in which each cell in an array of cells may be addressed electrically. Each cell acts on the light incident on it some way, such as to modulate the amplitude of the light it transmits, or to modulate the phase of the light it transmits, or to modulate some combination of the amplitude and phase of the light it transmits. An example of an EASLM is given in U.S. Pat. No. 5,973,817, which is incorporated herein by reference, the example being a phase modulating EASLM. A liquid crystal EASLM is an example of a EASLM. A magneto optical EASLM is a further example of an EASLM.

Elements 110, 111, 112 and 113 are disposed so as to be in physical, e.g. actual mechanical, contact, each forming a layer of a structure so that the whole is a single, unitary object.

Physical contact may be direct. Or it may be indirect, if there is a thin, intervening layer, coating of film between adjacent layers. Physical contact may be limited to small regions that ensure correct mutual alignment or registration, or may extend to larger areas, or the entire surface of a layer. Physical contact may be achieved by layers being bonded together such as through the use of an optically transmitting adhesive, so as to form a compact hologram generator 115, or by any other suitable process (see also section below titled Outline Manufacturing Process).

FIG. 4 is a prior art side view showing three focusing elements 1101, 1102, 1103 of a vertical focusing system 1104 in the form of cylindrical lenses horizontally arranged in an array. The nearly collimated beams of a horizontal line light source $LS_2$ passing through the focusing element 1102 of an illumination unit and running to an observer plane OP are exemplified. According to FIG. 4, a multitude of line light sources $LS_1$, $LS_2$, $LS_3$ are arranged one above another. Each light source emits light which is sufficiently coherent in the vertical direction and which is incoherent in the horizontal direction. This light passes through the transmissive cells of the light modulator SLM. The light is only diffracted in the vertical direction by cells of the light modulator SLM, which are encoded with a hologram. The focusing element 1102 images a light source $LS_2$ in the observer plane OP in several diffraction orders, of which only one is useful. The beams emitted by the light source $LS_2$ are exemplified to pass only through the focusing element 1102 of focusing system 1104. In FIG. 4 the three beams show the first diffraction order 1105, the zeroth order 1106 and the minus first order 1107. In contrast to a single point light source, a line light source allows the production of a significantly higher luminous intensity. Using several holographic regions with already increased efficiency and with the assignment of one line light source for each portion of a 3D-scene to be reconstructed, improves the effective luminous intensity. Another advantage is that, instead of a laser, a multitude of conventional light sources, which are positioned e.g. behind a slot diaphragm, which may also be part of a shutter, generate sufficiently coherent light.

In general, a holographic display is used to reconstruct a wavefront in a virtual observer window. The wavefront is one that a real object would generate, if it were present. An observer sees the reconstructed object when his eyes are positioned at an virtual observer window, which may be one of several possible virtual observer windows (VOWs). As shown in FIG. 6A, the holographic display comprises the following components: a light source, a lens, a SLM, and an optional beam splitter.

In order to facilitate the creation of a compact combination of a SLM and a compact light source which may display holographic images, the single light source and the single lens of FIG. 6A may be replaced by a light source array and a lens array or a lenticular array, respectively, as shown in FIG. 6B. In FIG. 6B, the light sources illuminate the SLM and the lenses image the light sources into the observer plane. The SLM is encoded with a hologram and modulates the incoming wavefront such that the desired wavefront may be reconstructed in the VOW. An optional beam splitter element may be used to generate several VOWs, e.g. one VOW for the left eye and one VOW for the right eye.

If a light source array and a lens array or a lenticular array are used, the light sources in the array have to be positioned such that the light bundles through all the lenses of the lens array or lenticular array coincide in the VOW.

The apparatus of FIG. 6B lends itself to a compact design that can be used for a compact holographic display. Such a holographic display may be useful for mobile applications, e.g. in a mobile phone or a PDA. Typically, such a holographic display would have a screen diagonal of the order of one inch or several inches. A holographic sub-display could have a screen diagonal as small as one cm. The appropriate components are described in detail below.

1) Light Source/Light Source Array

In a simple case, a fixed single light source can be used. If an observer moves, the observer may be tracked, and the display may be adjusted so as to create an image which is viewable at the new position of the observer. Here, there is either no tracking of the VOW or tracking is performed using a beam steering element after the SLM.

A configurable light source array may be achieved by a liquid crystal display (LCD) that is illuminated by a backlight. Only the appropriate pixels are switched to the transmission state in order to create an array of point or line light sources. The apertures of these light sources have to be sufficiently small to guarantee sufficient spatial coherence for holographic reconstruction of an object. An array of point light sources may be used in combination with a lens array that comprises a 2D arrangement of lenses. An array of line light sources is preferably used in combination with a lenticular array that comprises a parallel arrangement of cylindrical lenses.

Preferably, an OLED display is used as a light source array. As a self-emitting device, it is more compact and more energy-efficient than a LCD where most of the light generated is absorbed by elements such as colour filters or in pixels that are not in a fully transmissive state. However, LCDs may have an overall cost advantage over OLED displays, even when one allows for the situation in which OLED displays provide light in a more energy efficient way than LCD displays. When an OLED display is used as a light source array only those pixels are switched on that are necessary for generating the VOW at the eye positions. The OLED display may have a 2D arrangement of pixels or a 1D arrangement of line light sources. The emitting area of each point light source or the width of each line light source has to be sufficiently small to guarantee sufficient spatial coherence for holographic reconstruction of an object. Again, an array of point light sources is preferably used in combination with a lens array that comprises a 2D arrangement of lenses. An array of line light sources is preferably used in combination with a lenticular array that comprises a parallel arrangement of cylindrical lenses.

2) Focusing Means: Single Lens, Lens Array or Lenticular Array

The focusing means images the light source or the light sources to the observer plane. As the SLM is in close proximity to the focusing means, the Fourier transform of the information encoded in the SLM is in the observer plane. The focusing means comprises one or several focusing elements. The positions of SLM and of the focusing means may be swapped.

For a compact combination of an EASLM and a compact light source of sufficient coherence, it is essential to have a thin focusing means: a conventional refractive lens with a convex surface would be too thick. Instead, a diffractive or a holographic lens may be used. This diffractive or holographic lens may have the function of a single lens, of a lens array or of a lenticular array. Such materials are available as surface relief holographic products supplied by Physical Optics Corporation, Torrance, Calif., USA. Alternatively, a lens array may be used. A lens array comprises a 2D arrangement of lenses, where each lens is assigned to one light source of the light source array. In another alternative, a lenticular array may be used. A lenticular array comprises a 1D arrangement of cylindrical lenses, where each lens has a corresponding light source in the light source array. As mentioned above, if a light source array and a lens array or a lenticular array are used, the light sources in the array have to be positioned such that the light bundles through all the lenses of the lens array or the lenticular array coincide in the VOW.

The light through the lenses of the lens array or the lenticular array is incoherent for one lens with respect to any other lens. Therefore the hologram that is encoded on the SLM is composed of sub-holograms, where each sub-hologram corresponds to one lens. The aperture of each lens has to be sufficiently large to guarantee sufficient resolution of the reconstructed object. One may use lenses with an aperture that is approximately as large as the typical size of an encoded area in the hologram, as has been described in US2006/0055994 for example. This means that each lens should have an aperture of the order of one or several millimeters.

3) SLM

The hologram is encoded on the SLM. Usually, the encoding for a hologram consists of a 2D array of complex numbers. Hence, ideally the SLM would be able to modulate the amplitude and the phase of the local light beams passing through each pixel of the SLM. However, a typical SLM is capable of modulating either amplitude or phase and not amplitude and phase independently.

An amplitude-modulating SLM may be used in combination with detour-phase encoding, e.g. Burckhardt encoding. Its drawbacks are that three pixels are needed to encode one complex number and the reconstructed object has a low brightness.

A phase-modulating SLM results in a reconstruction with higher brightness. As an example, a so-called 2-phase encoding may be used that needs two pixels to encode one complex number.

Although EASLMs have the property of sharply-defined edges, which lead to unwanted higher diffraction orders in their diffraction patterns, the use of soft apertures can reduce or eliminate this problem. Soft apertures are apertures without a sharp transmission cut off. An example of a soft aperture transmission function is one with a Gaussian profile. Gaussian profiles are known to be advantageous in diffractive systems. The reason is that there is a mathematical result that the Fourier transform of a Gaussian function is itself a Gaussian function. Hence the beam intensity profile function is unchanged by diffraction, except for a lateral scaling parameter, in contrast to the case for transmission through an aperture with a sharp cut-off in its transmission profile. Sheet arrays of Gaussian transmission profiles may be provided. When these are provided in alignment with the EASLM apertures, a system is provided in which higher diffraction orders will be absent, or will be significantly reduced, compared with systems with a sharp cut off in the beam transmission profiles. The Gaussian filter or soft aperture filter suppresses diffraction artefacts from high spatial frequencies. The Gaussian filter or soft aperture filter minimises crosstalk between virtual observer windows for the left and right eyes.

4) Beam Splitter Element

The VOW is limited to one periodicity interval of the Fourier transform of the information encoded in the SLM. With the currently available SLMs of maximum resolution, the size of the VOW is of the order of 10 mm. In some circumstances, this may be too small for application in a holographic display without tracking. One solution to this problem is spatial multiplexing of VOWs: more than one VOWs are generated. In the case of spatial multiplexing the VOWs are generated simultaneously from different locations on the SLM. This may be achieved by beam splitters. As an example, one group of pixels on the SLM is encoded with the information of VOW1, another group with the information of VOW2. A beam splitter separates the light from these two groups such that VOW1 and VOW2 are juxtaposed in the observer plane. A larger VOW may be generated by seamless tiling of VOW1 and VOW2. Multiplexing may also be used for generation of VOWs for the left and the right eye. In that case, seamless juxtaposition is not required and there may be a gap between one or several VOWs for the left eye and one or several VOWs for the right eye. Care has to be taken that higher diffraction orders of one VOW do not overlap in the other VOWs.

A simple example of a beam splitter element is a parallax barrier consisting of black stripes with transparent regions in between, as described in US2004/223049 which is incorporated herein by reference. A further example is a lenticular sheet, as described in US2004/223049. Further examples of beam splitter elements are lens arrays and prism masks. In a compact holographic display, one would typically expect a beam splitter element to be present, as the typical virtual observer window size of 10 mm would only be large enough for one eye, which is unsatisfactory as the typical viewer has two eyes which are approximately 10 cm apart. However, as an alternative to spatial multiplexing, temporal multiplexing may be used. In the absence of spatial multiplexing, a beam splitter element does not have to be used.

Spatial multiplexing may also be used for the generation of color holographic reconstructions. For spatial color multiplexing there are separate groups of pixels for each of the color components red, green and blue. These groups are spatially separated on the SLM and are simultaneously illuminated with red, green and blue light. Each group is encoded with a hologram calculated for the respective color component of the object. Each group reconstructs its color component of the holographic object reconstruction.

5) Temporal Multiplexing

In the case of temporal multiplexing the VOWs are generated sequentially from the same location on the SLM. This may be achieved by alternating positions of the light sources and synchronously re-encoding the SLM. The alternating positions of the light sources have to be such that there is seamless juxtaposition of the VOWs in the observer plane. If the temporal multiplexing is sufficiently fast, i.e. >25 Hz for the complete cycle, the eye will see a continuous enlarged VOW.

Multiplexing may also be used for generation of VOWs for the left and the right eye. In that case, seamless juxtaposition is not required and there may be a gap between one or several VOWs for the left eye and one or several VOWs for the right eye. This multiplexing may be spatial or temporal.

Spatial and temporal multiplexing may also be combined. As an example, three VOWs are spatially multiplexed to generate an enlarged VOW for one eye. This enlarged VOW is temporally multiplexed to generate an enlarged VOW for the left eye and an enlarged VOW for the right eye.

Care has to be taken that higher diffraction orders of one VOW do not overlap in the other VOWs.

Multiplexing for the enlargement of VOWs is preferably used with re-encoding of the SLM as it provides an enlarged VOW with continuous variation of parallax upon observer motion. As a simplification, multiplexing without re-encoding would provide repeated content in different parts of the enlarged VOW.

Temporal multiplexing may also be used for the generation of color holographic reconstructions. For temporal multiplexing the holograms for the three color components are sequentially encoded on the SLM. The three light sources are switched synchronously with the re-encoding on the SLM. The eye sees a continuous color reconstruction if the complete cycle is repeated sufficiently fast, i.e. with >25 Hz.

6) Dealing with Unwanted Higher Diffraction Orders

If a larger VOW is generated by the tiling of smaller VOWs, higher diffraction orders of one VOW may lead to a disturbing crosstalk in other VOWs unless steps are taken to avoid this problem. As an example, if each VOW is located in the zeroth diffraction order of the Fourier transform of the information encoded in the SLM, the first diffraction order of one VOW may overlap with an adjacent VOW. This overlap may lead to a disturbing background, which may become especially apparent if the intensity of the unwanted image exceeds about 5% of the intensity of the desired image. In that case it is desirable to compensate for or to suppress higher diffraction orders.

Figure 7:
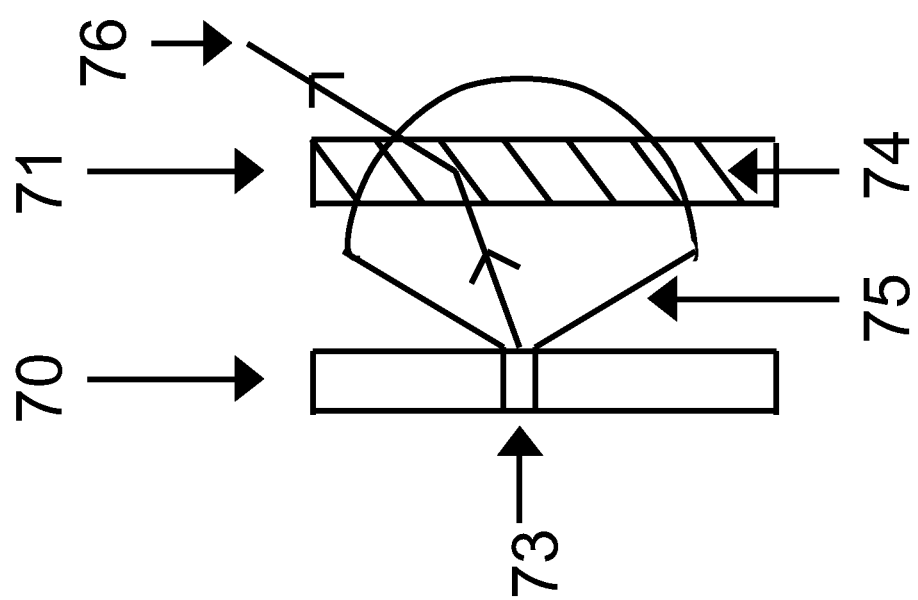
FIG. 7 is a diagram of a component of a holographic display which incorporates a Bragg filtering holographic optical element to reduce problems associated with higher diffraction orders.

A static angular filter can be used if the angle with which the SLM is illuminated remains constant. This is the case if either the holographic display has no tracking or the beam splitter element, such as a beam steering element, is located after the SLM. The static angular filter may be a Bragg filter or a Fabry Perot Etalon.

Where the SLM results in a geometric light intensity distribution containing unwanted diffraction orders, the geometric light intensity distribution may be modified through the use of a Bragg filter holographic optical element, such as described in U.S. Pat. No. 5,153,670. The Bragg filter holographic optical element results in a light intensity distribution that is different to the light intensity distribution in the absence of this element. An example of the functioning of the Bragg filter holographic optical element is shown in FIG. 7. In FIG. 7, 70 is an SLM, 71 is a holographic optical element Bragg filter which contains Bragg planes such as Bragg plane 74. A single cell 73 in SLM 70 contributes to a diffracted light intensity distribution indicated schematically as 75. A light ray 76 is indicated which is diffracted by SLM 70, undergoes scattering in holographic optical element 71, and is subsequently transmitted in a different direction to its original propagation direction between 70 and 71. If the direction of light ray 76 propagation between 70 and 71 corresponds to unwanted first order diffracted light, it is clear that Bragg filter 71 has succeeded in redirecting this light to a different direction, where it may not contribute to unwanted optical artefacts which might disturb a viewer, who typically will be located in the direction approximately normal to 70.

A tunable Fabry Perot Etalon for the suppression of diffraction orders is disclosed in patent application number DE 10 2006 030 503. What is disclosed is a LC layer between two coplanar glass sheets that are coated with a partially reflective coating. At each reflection of a light beam at the coatings the beam is partially reflected and partially transmitted. The transmitted beams interfere and the phase difference between them determines whether the interference is constructive or destructive, as in a standard Fabry Perot Etalon. For a given wavelength the interference and hence the transmission varies with the incidence angle of the beam. For a given light propagation direction, the interference can be tuned by varying the refractive index of the LC for the given light propagation direction. The refractive index is controlled by an electric field applied across the LC layer. Therefore, the angular transmission characteristics can be tuned and diffraction orders can be selected for transmission, or for reflection, as required, within the overall constraints of the Fabry Perot Etalon. For example, if the Fabry Perot Etalon is configured for optimum transmission of the zeroth order, and optimum reflection of the first order, there may still be some unwanted transmission of the second order and higher orders. This device facilitates static or sequential selection of specific diffraction orders that are transmitted, or reflected, as required, within the overall constraints of the Fabry Perot Etalon.

Spatial filters may be used to select diffraction orders. These spatial filters may be located between the SLM and the VOW and comprise transparent and opaque areas. These spatial filters may be used to transmit desired diffraction orders while blocking unwanted diffraction orders. These spatial filters may be static or configurable. For example, an EASLM placed between the SLM and the VOW may act as a configurable spatial filter.

7) Eye Tracking

In a compact combination of an EASLM and a compact light source of sufficient coherence with eye tracking, an eye position detector may detect the positions of the observer's eyes. One or several VOWs are then automatically positioned at the eye positions so that the observer can see the reconstructed object through the VOWs.

However, tracking may not always be practical, especially for portable devices, or in handheld devices, because of the constraints of the additional apparatus required and electrical power requirements for its performance. Without tracking, the observer has to manually adjust the position of the display. This is readily performed as in a preferred embodiment the compact display is a hand-held display that may be incorporated in a PDA or a mobile phone. As the user of a PDA or mobile phone usually tends to look perpendicularly on the display there is not much additional effort to align the VOWs with the eyes. It is known that a user of a hand-held device will tend automatically to orient the device in the hand so as to achieve the optimum viewing conditions, as described for example in WO01/96941 which is incorporated herein by reference. Therefore, in such devices there is no necessity for user eye tracking and for complicated and non-compact tracking optics comprising scanning mirrors, for example. But eye tracking could be implemented for such devices if the additional requirements for apparatus and electrical power do not impose an excessive burden.

Without tracking, a compact combination of an EASLM and a compact light source of sufficient coherence requires VOWs that are sufficiently large in order to simplify the adjusting of the display. Preferably the VOW size should be several times the size of the eye pupil. This can be achieved by either a single large VOW, using a SLM with a small pitch, or by the tiling of several small VOWs, using a SLM with a large pitch.

The position of the VOWs is determined by the positions of the light sources in the light source array. An eye position detector detects the positions of the eyes and sets the positions of the light sources in order to adapt the VOWs to the eye positions. This kind of tracking is described in US2006/055994 and in US2006/250671.

Alternatively, VOWs may be moved when the light sources are in fixed positions. Light source tracking requires a SLM that is relatively insensitive to the variation of the incidence angle of light from the light sources. If the light source is moved in order to move the VOW position, this may be difficult to achieve with a compact combination of a compact light source and a SLM due to the possible off-normal light propagation conditions within the compact combination that such a configuration implies. In such a case it is advantageous to have a constant optical path in the display and a beam steering element as the last optical component in the display.

Figure 20:
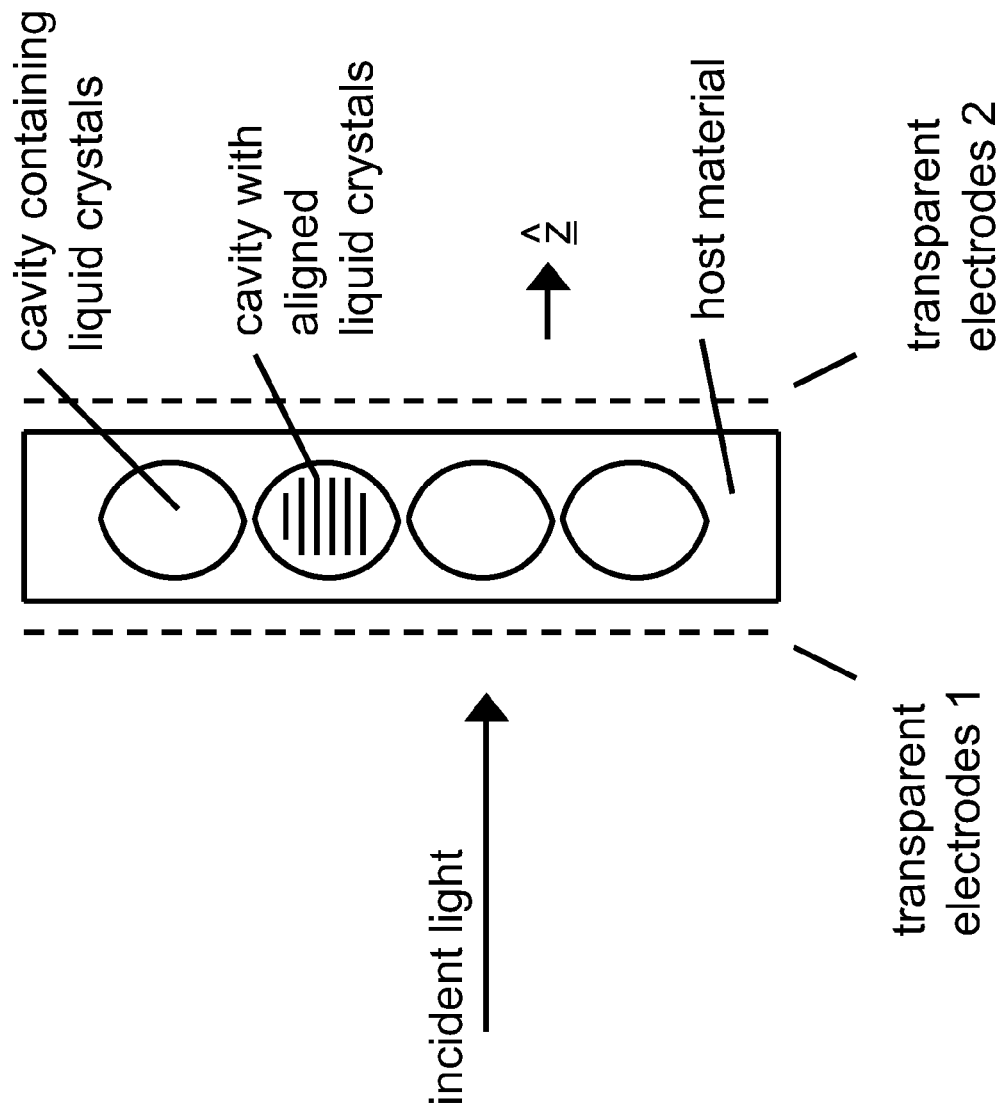
FIG. 20 is a diagram of a beam steering element.
Figure 21:
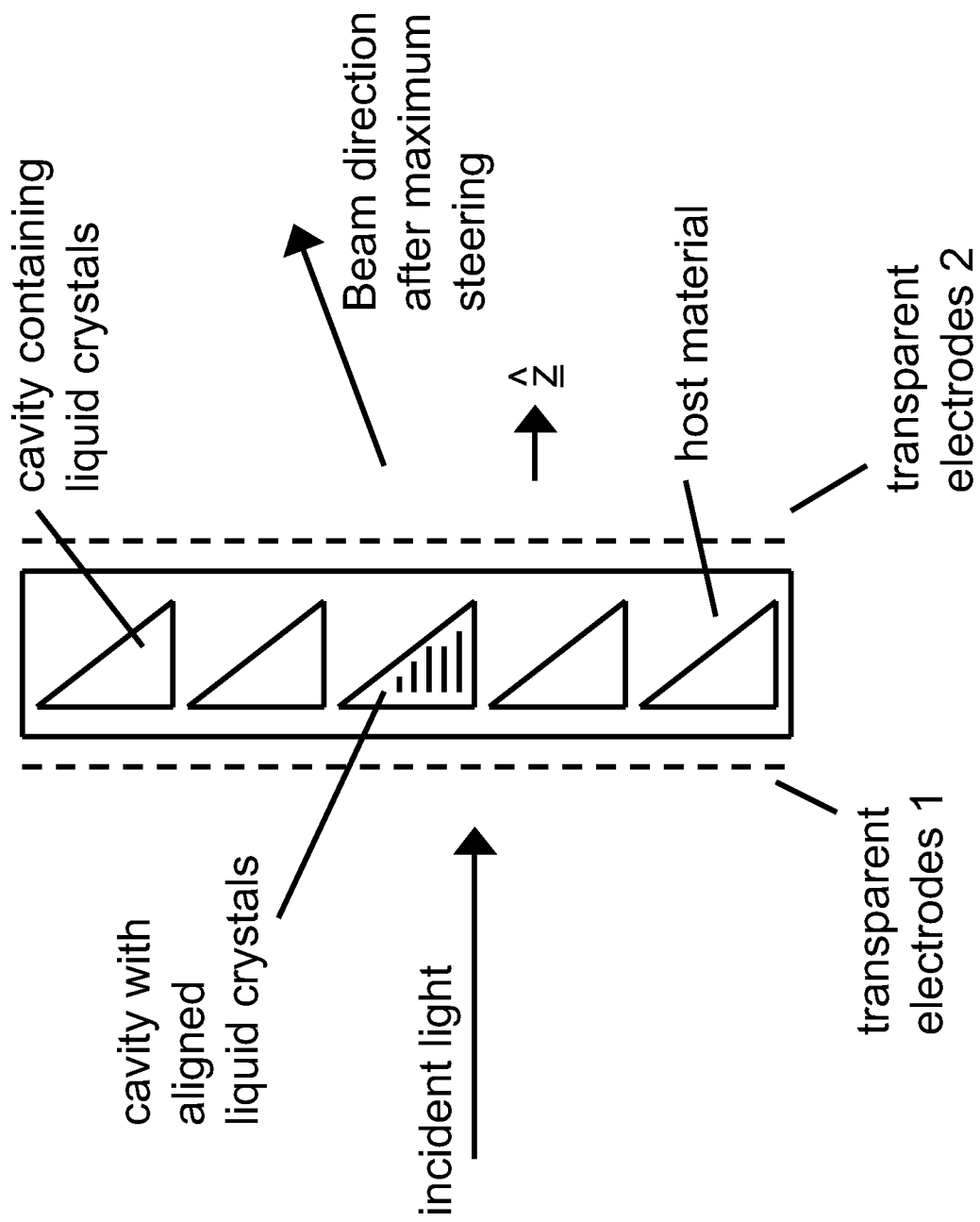
FIG. 21 is a diagram of a beam steering element.

A beam steering element which can provide these properties is shown in FIGS. 20 and 21. This beam steering element varies the angle of the light bundles at the output of the display. It may have the optical properties of a controllable prism for x- and y-tracking and/or of a controllable lens for z-tracking. For example, either of the beam steering elements of FIGS. 20 and 21, or both, may be used within a single device. The beam steering element is a controllable diffractive element or a controllable refractive element. A controllable refractive element may comprise an array of cavities filled with liquid crystals that are embedded in a matrix with an isotropic linear electric dipole susceptibility tensor. The cavity has the shape of a prism or a lens. Application of an electric field controls the effective refractive index of the liquid crystals and hence facilitates beam steering. The electric field may be varied across the element to create beam steering properties which vary across the element. The electric field is applied between the transparent electrodes shown in FIG. 20. The liquid crystal has uniaxial refractive properties, and may be selected so that the refractive index perpendicular to its optic axis is equal to the refractive index of the host material, or "matrix". Other configurations will be obvious to those skilled in the art. The host material has an isotropic refractive index. If the optic axis of the liquid crystal is aligned with the z direction shown in FIG. 20 by application of a suitable electric field, a plane wave propagating along the z direction will experience no refraction as it passes through the beam steering element, because it does not experience any refractive index variation perpendicular to its Poynting vector. However, if an electric field is applied across the electrodes such that the optic axis of the liquid crystals is perpendicular to the z direction, a plane wave propagating along the z direction which is polarized parallel to the optic axis will experience maximum refraction as it passes through the beam steering element, because it experiences the maximum possible refractive index variation along its direction of polarization that the system can provide. The degree of refraction will be tunable between these two extreme cases through selection of an appropriate electric field across the host material.

Beam steering may be accomplished if the cavities are prism-shaped, rather than lens-shaped. A suitable prism shape for beam steering is shown in FIG. 21. If the optic axis of the liquid crystal is aligned with the z direction shown in FIG. 21 through the application of a suitable electric field, a plane wave propagating along the z direction will experience no refraction as it passes through the beam steering element, because it does not experience any refractive index variation in its direction of polarization. However, if an electric field is applied across the electrodes such that the optic axis of the liquid crystals is perpendicular to the z direction, a plane wave propagating along the z direction which is polarized parallel to the optic axis will experience maximum refraction as it passes through the beam steering element, because it experiences the maximum possible refractive index variation perpendicular to its Poynting vector that the system can provide. The degree of refraction will be tunable between these two extreme cases through selection of an appropriate electric field across the host material.

8) Example

Figure 12:
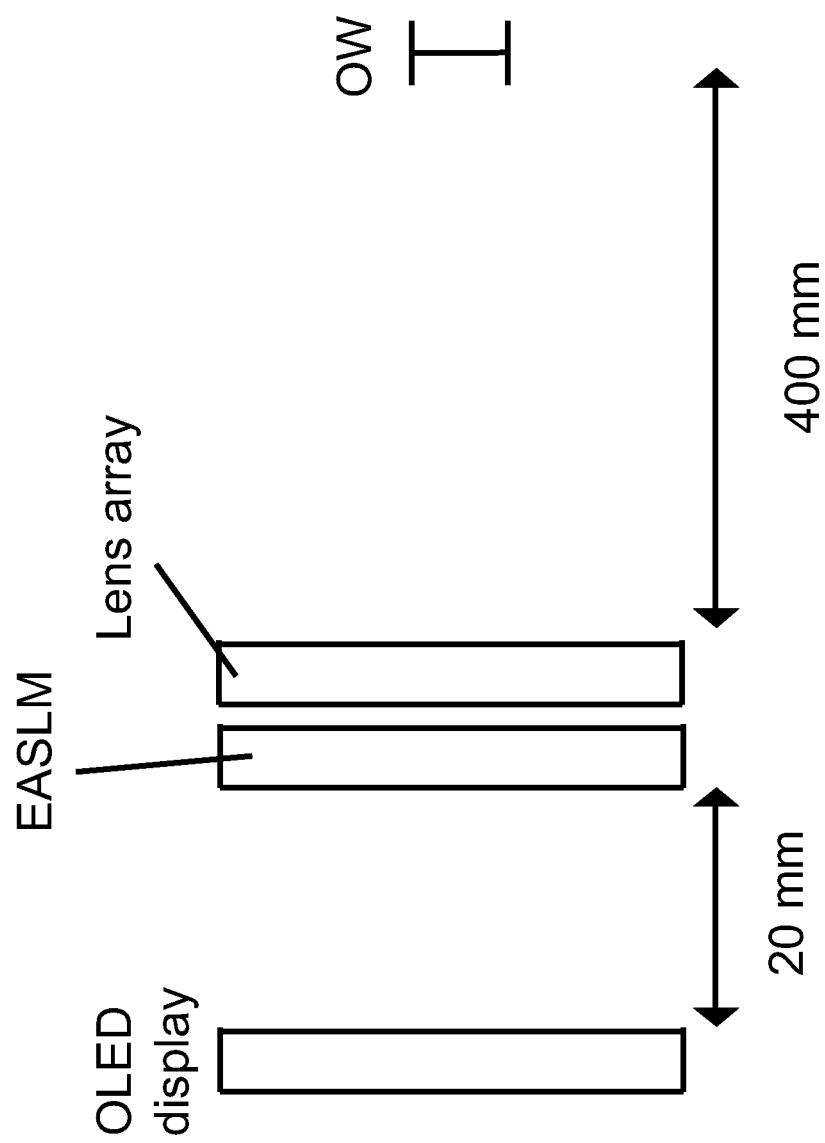
FIG. 12 is a diagram of a specific embodiment of a holographic display according an implementation.

An example will now be described of a compact combination of an EASLM and a compact light source of sufficient coherence, the combination being capable of generating a three dimensional image under suitable illumination conditions, that may be incorporated in a PDA or a mobile phone. The compact combination of an EASLM and a compact light source of sufficient coherence comprises an OLED display as the light source array, an EASLM and a lens array, as shown in FIG. 12.

Depending on the required position of the VOW (denoted OW in FIG. 12), specific pixels in the OLED display are activated. These pixels illuminate the EASLM and are imaged into the observer plane by the lens array. At least one pixel per lens of the lens array is activated in the OLED display. With the dimensions given in the drawing, the VOW can be tracked with a lateral increment of 400 µm if the pixel pitch is 20 µm. This tracking is quasi-continuous.

An OLED pixel is a light source with only partial spatial coherence. Partial coherence leads to a smeared reconstruction of the object points. With the dimensions given in the drawing, an object point at a distance of 100 mm from the display is reconstructed with a lateral smearing of 100 µm if the pixel width is 20 µm. This is sufficient for the resolution of the human vision system.

There is no significant mutual coherence between the light that passes through different lenses of the lens array. The coherence requirement is limited to each single lens of the lens array. Therefore, the resolution of a reconstructed object point is determined by the pitch of the lens array. A typical lens pitch will therefore be of the order of 1 mm to guarantee sufficient resolution for the human vision system. If the OLED pitch is 20 µm, this means that the ratio of the lens pitch to the OLED pitch is 50:1. If only a single OLED is lit per lens, this means that only one OLED in every $50^2=2,500$ OLEDs will be lit. Hence the display will be a low power display. A difference between the holographic displays herein and a conventional OLED display is that the former concentrate the light at the viewer's eyes, whereas the latter emits light into $2\pi$ steradians. Whereas a conventional OLED display achieves a luminance of about 1,000 cd/m$^2$, the inventors calculate that in this implementation, the illuminated OLED should achieve a luminance of several times 1,000 cd/m$^2$ for practical application.

The VOW is limited to one diffraction order of the Fourier spectrum of the information encoded in the SLM. At a wavelength of 500 nm the VOW has a width of 10 mm if the pixel pitch of the SLM is 10 µm and two pixels are needed to encode one complex number i.e. if 2-phase encoding on a phase-modulating EASLM is used. The VOW may be enlarged by tiling of VOWs by spatial or temporal multiplexing. In the case of spatial multiplexing additional optical elements such as beam splitters are required.

Color holographic reconstructions can be achieved by temporal multiplexing. The red, green and blue pixels of a color OLED display are sequentially activated with synchronous re-encoding of the SLM with holograms calculated for red, green and blue optical wavelengths.

The display may comprise an eye position detector that detects the positions of the observer's eyes. The eye position detector is connected with a control unit that controls the activation of pixels of the OLED display.

The calculation of the holograms that are encoded on the SLM is preferably performed in an external encoding unit as it requires high computational power. The display data are then sent to the PDA or mobile phone to enable the display of a holographically-generated three dimensional image.

As a practical example, a 2.6 inch screen diagonal XGA LCD EASLM made by Sanyo® Epson® Imaging Devices Corporation of Japan may be used. The subpixel pitch is 17 µm. If this is used in constructing an RGB holographic display, with amplitude modulation encoding of the hologram, at a distance of 0.4 m from the EASLM the viewing window is calculated to be 1.3 mm across. For the monochrome case, the viewing window is calculated to be 4 mm across. If the same configuration is used, but it is implemented using phase modulation with two-phase encoding, the viewing window is calculated to be 6 mm across. If the same configuration is used, but it is implemented using phase modulation with Kinoform encoding, the viewing window is calculated to be 12 mm across.

Other high resolution EASLM examples exist. Seiko® Epson® Corporation of Japan has released monochrome EASLMs, such as the D4:L3D13U 1.3 inch screen diagonal panel with a pixel pitch of 15 µm. The same company has released a D5: L3D09U-61G00 panel in the same panel family with a screen diagonal length of 0.9 inches and a pixel pitch of 10 µm. On Dec. 12, 2006 the same company announced the release of a L3D07U-81G00 panel in the same family with a screen diagonal length of 0.7 inches and a pixel pitch of 8.5 µm. If the D4:L3D13U 1.3 inch panel is used in constructing a monochrome holographic display, with Burckhardt amplitude modulation encoding of the hologram, at a distance of 0.4 m from the EASLM the VOW is calculated to be 5.6 mm across.

D. Compact Combination of a Pair of EASLMs

In a further implementation, a combination of two EASLMs can be used to modulate the amplitude and the phase of light in sequence and in a compact way. Thus, a complex number, which consists of an amplitude and a phase, can be encoded in the transmitted light, on a pixel by pixel basis.

This implementation comprises a compact combination of two EASLMs. The first EASLM modulates the amplitude of transmitted light and the second EASLM modulates the phase of the transmitted light. Alternatively, the first EASLM modulates the phase of transmitted light and the second EASLM modulates the amplitude of the transmitted light. Each EASLM may be as described in section C above. An overall assembly may be as described in the section C, except two EASLMs are used here. Any other combination of modulation characteristics of the two EASLMs is possible that is equivalent to facilitating independent modulation of amplitude and phase.

In a first step the first EASLM is encoded with the pattern for amplitude modulation. In a second step the second EASLM is encoded with the pattern for phase modulation. The light transmitted by the second EASLM has been modulated in its amplitude and in its phase as a result of which an observer may observe a three dimensional image when viewing the light emitted by the device in which the two EASLMs are housed.

It will be appreciated by those skilled in the art that the modulation of phase and amplitude facilitates the representation of complex numbers. Furthermore, EASLMs may have high resolution. Therefore, this implementation may be used to generate holograms such that a three dimensional image may be viewed by a viewer.

Figure 13:
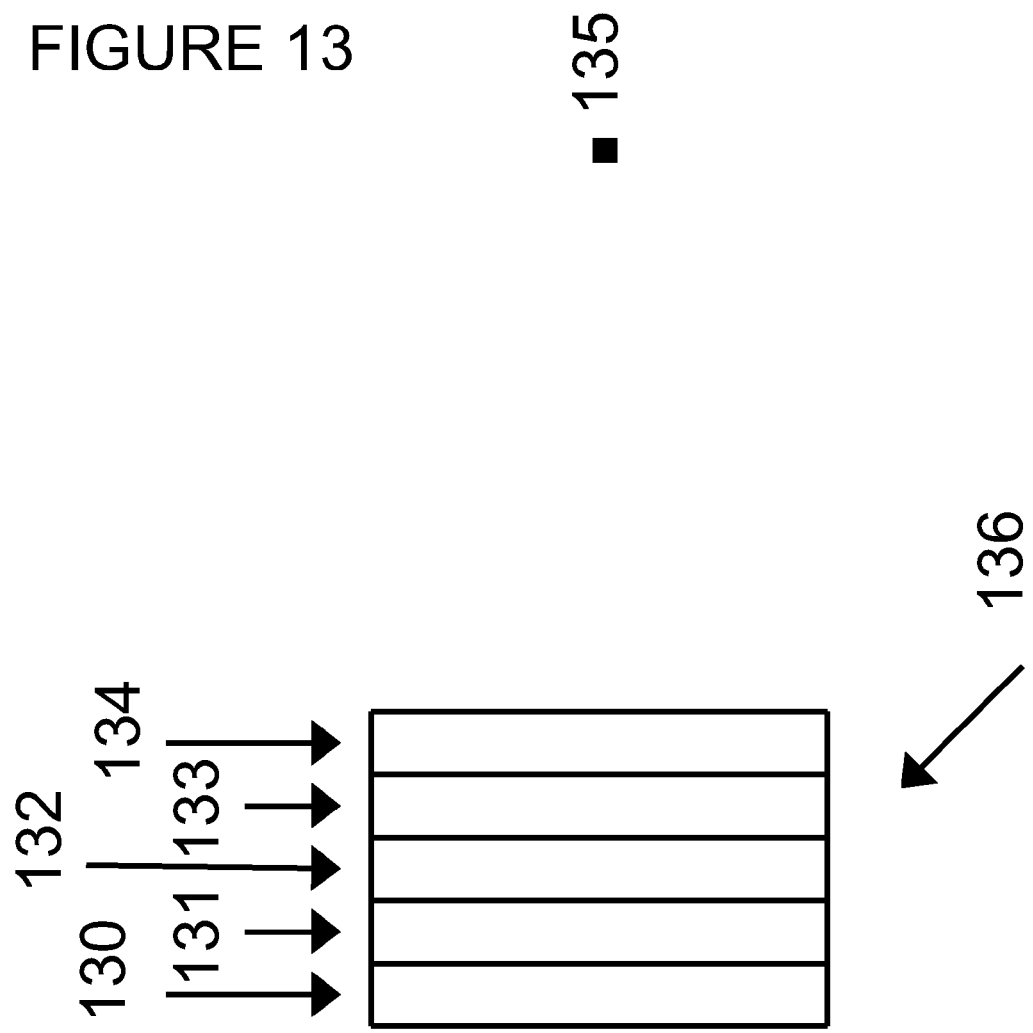
FIG. 13 is a diagram of a holographic display device which incorporates two EASLMs for encoding amplitude and phase in succession.

In FIG. 13, an example of an implementation is disclosed. 130 is an illumination apparatus for providing illumination of a plane area, where the illumination has sufficient coherence so as to be able to lead to the generation of a three dimensional image. An example of an illumination apparatus is disclosed in US 2006/250671 for the case of large area video holograms, one example of which is reproduced in FIG. 4. Such an apparatus as 130 may take the form of an array of white light sources, such as cold cathode fluorescent lamps or white light light emitting diodes which emit light which is incident on a focusing system which may be compact, such as a lenticular array or a microlens array. Alternatively, light sources for 130 may comprise of red, green and blue lasers or red, green and blue light emitting diodes which emit light of sufficient coherence. The red, green and blue light emitting diodes may be organic light emitting diodes (OLEDs). However, non-laser sources with sufficient spatial coherence (eg. light emitting diodes, OLEDs, cold cathode fluorescent lamps) are preferred to laser sources. Laser sources have disadvantages such as causing laser speckle in the holographic reconstructions, being relatively expensive, and having possible safety problems with regard to possibly damaging the eyes of holographic display viewers or of those who work in assembling the holographic display devices.

Element 130 may include one or two prismatic optical films for increasing display brightness: such films are disclosed eg. in U.S. Pat. No. 5,056,892 and in U.S. Pat. No. 5,919,551, though others are known. Element 130 may include a polarizing optical element, or a set of polarizing optical elements.

One example is a linear polarizer sheet. A further example is a reflective polarizer which transmits one linear polarization state and reflects the orthogonal linear polarization state—such a sheet is described in U.S. Pat. No. 5,828,488, for example, though others are known. A further example is a reflective polarizer which transmits one circular polarization state and reflects the orthogonal circular polarization state—such a sheet is described in U.S. Pat. No. 6,181,395, for example, though others are known. Element 130 may include a focusing system which may be compact such as a lenticular array or a microlens array. Element 130 may include other optical elements which are known in the field of backlight technology.

Element 130 may be about a few centimeters in thickness, or less. In a preferred embodiment, elements 130-134 are less than 3 cm in thickness in total, so as to provide a compact source of light of sufficient coherence. Element 131 may comprise of an array of colour filters, such that pixels of coloured light, such as red, green and blue light, are emitted towards element 132, although the colour filters may not be required if coloured sources of light are used. Element 132 is an EASLM. Element 133 is an EASLM. Element 134 is an optional beamsplitter element. With regard to the transmitted light, element 132 modulates the amplitude and element 133 modulates the phase. Alternatively, element 133 modulates the amplitude and element 132 modulates the phase. The close proximity of EASLMs 132 and 133 enables a reduction in the problems of optical losses and pixel cross-talk arising from optical beam divergence: when EASLMs 132 and 133 are in closer proximity, a better approximation to non-overlapping propagation of the beams of coloured light through the EASLMs may be achieved. A viewer located at point 135 some distance from the device which includes the compact hologram generator 136 may view a three dimensional image when viewing in the direction of 136.

Elements 130, 131, 132, 133 and 134 are arranged so that adjacent elements are in physical, e.g. fixed mechanical, contact, each forming a layer of a structure so that the whole is a single, unitary object. Physical contact may be direct. Or it may be indirect, if there is a thin, intervening layer, coating of film between adjacent layers. Physical contact may be limited to small regions that ensure correct mutual alignment or registration, or may extend to larger areas, or the entire surface of a layer. Physical contact may be achieved by layers being bonded together such as through the use of an optically transmitting adhesive, so as to form a compact hologram generator 136, or by any other suitable process (see also section below titled Outline Manufacturing Process).

Where an EASLM performs amplitude modulation, in a typical configuration the incident read optical beams will be linearly polarized by passing the beams through a linear polarizer sheet. Amplitude modulation is controlled by the rotation of the liquid crystal in an applied electric field, which influences the polarization state of the light. In such a device, the light which exits the EASLM is passed through a further linear polarizer sheet, which enables intensity reduction as a result of any change in the polarization state of the light as it passes through the EASLM.

Where an EASLM performs phase modulation, in a typical configuration the incident read optical beams will be linearly polarized by passing the beams through a linear polarizer sheet, unless they are already in a defined linear polarization state. Phase modulation is controlled by application of an electric field, which influences the phase state of the light. In one example of phase modulation implemented using a nematic phase liquid crystal, the optic axis direction is fixed in space but the birefringence is a function of the applied voltage. In one example of phase modulation implemented using a ferroelectric liquid crystal, the birefringence is fixed, but the direction of the optic axis is controlled by the applied voltage. In phase modulation implemented using either method, the output beam has a phase difference with respect to the input beam that is a function of the applied voltage. An example of a liquid crystal cell which can perform phase modulation is a Freedericksz cell arrangement in which anti-parallel aligned domains of a nematic liquid crystal with a positive dielectric anisotropy are used, as described in U.S. Pat. No. 5,973,817.

A compact assembly for use in a compact holographic display comprises two EASLMs that are joined with a small or a minimal separation. In a preferred embodiment, both SLMs have the same number of pixels. Because the two EASLMs are not equidistant from the observer, the pixel pitch of the two EASLMs may need to be slightly different (but would still be approximately the same) to compensate for the effect of being at different distances with respect to observer. The light that has passed through a pixel of the first SLM passes through the corresponding pixel of the second SLM. Therefore, the light is modulated by both SLMs, and complex modulation of amplitude and phase independently can be achieved. As an example, the first SLM is amplitude-modulating and the second SLM is phase-modulating. Also, any other combination of modulation characteristics of the two SLMs is possible that together facilitates independent modulation of amplitude and phase.

Care has to be taken that light that has passed through a pixel of the first SLM passes only through the corresponding pixel of the second SLM. Crosstalk will occur if light from a pixel of the first SLM passes through non-corresponding, neighboring pixels of the second SLM. This crosstalk may lead to a reduced image quality. Here are four possible approaches to the problem of minimizing the cross-talk between pixels. It will be apparent to those skilled in the art that these approaches may also be applied to the implementation in section B.

(1) The first and simplest approach is to directly join or glue together two SLMs, with aligned pixels. There will be diffraction at a pixel of the first SLM which causes a diverging propagation of light. The separation between the SLMs has to be thin enough such as to keep to acceptable levels the crosstalk between neighboring pixels of the second SLM. As an example, with a pixel pitch of 10 µm the separation of the two EASLMs has to be less than or equal to the order of 10-100 µm. This can hardly be achieved with conventionally manufactured SLMs, as the thickness of the cover glass is of the order of 1 mm. Rather, the sandwich is preferably manufactured in one process, with only a thin separation layer between the SLMs. Manufacturing approaches outlined in the section Outline Manufacturing Process may be applied to making a device which includes two EASLMs separated by a small or minimal distance.

Figure 14:
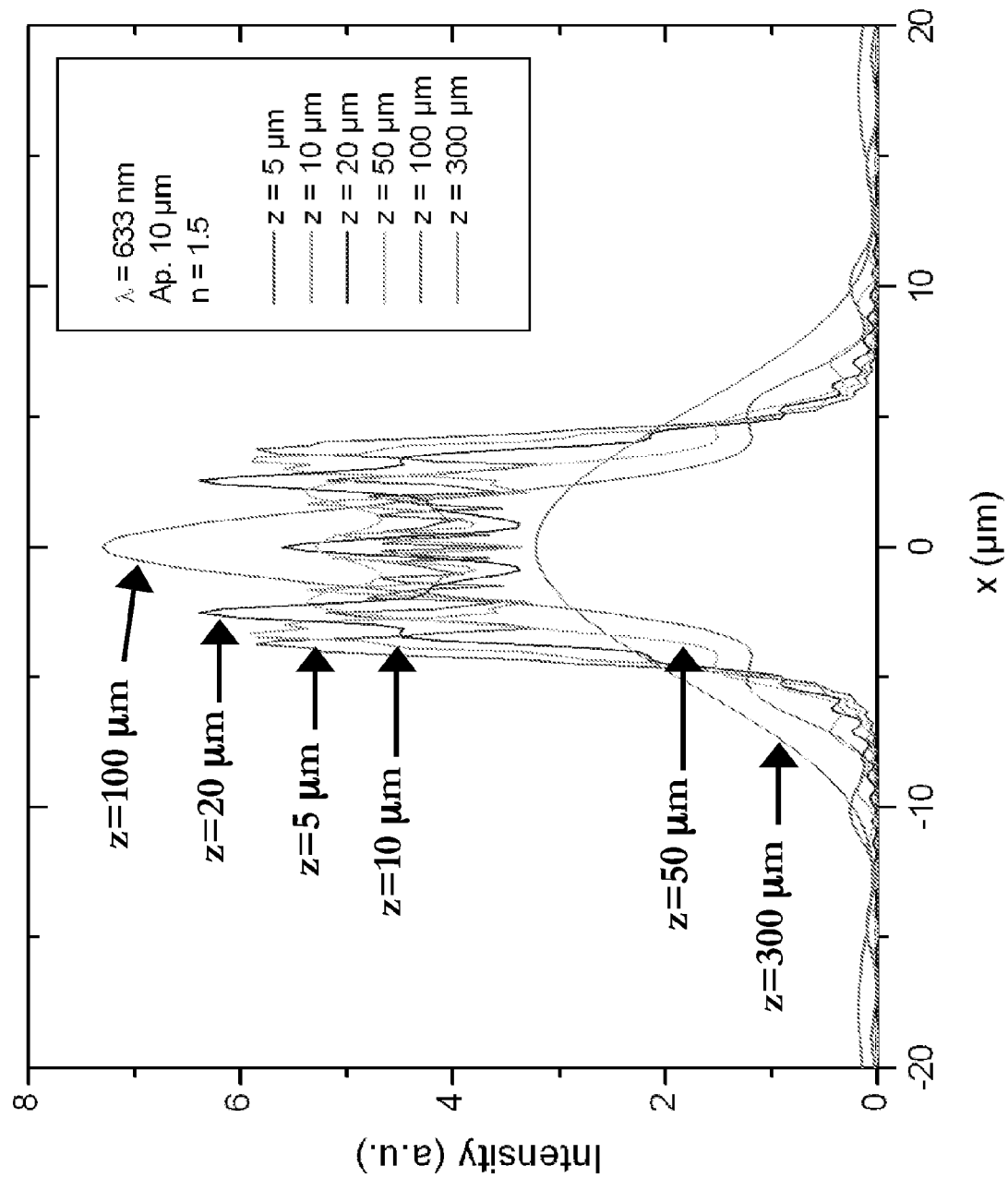
FIG. 14 is diffraction simulation results obtained using MathCad®.
Figure 15:
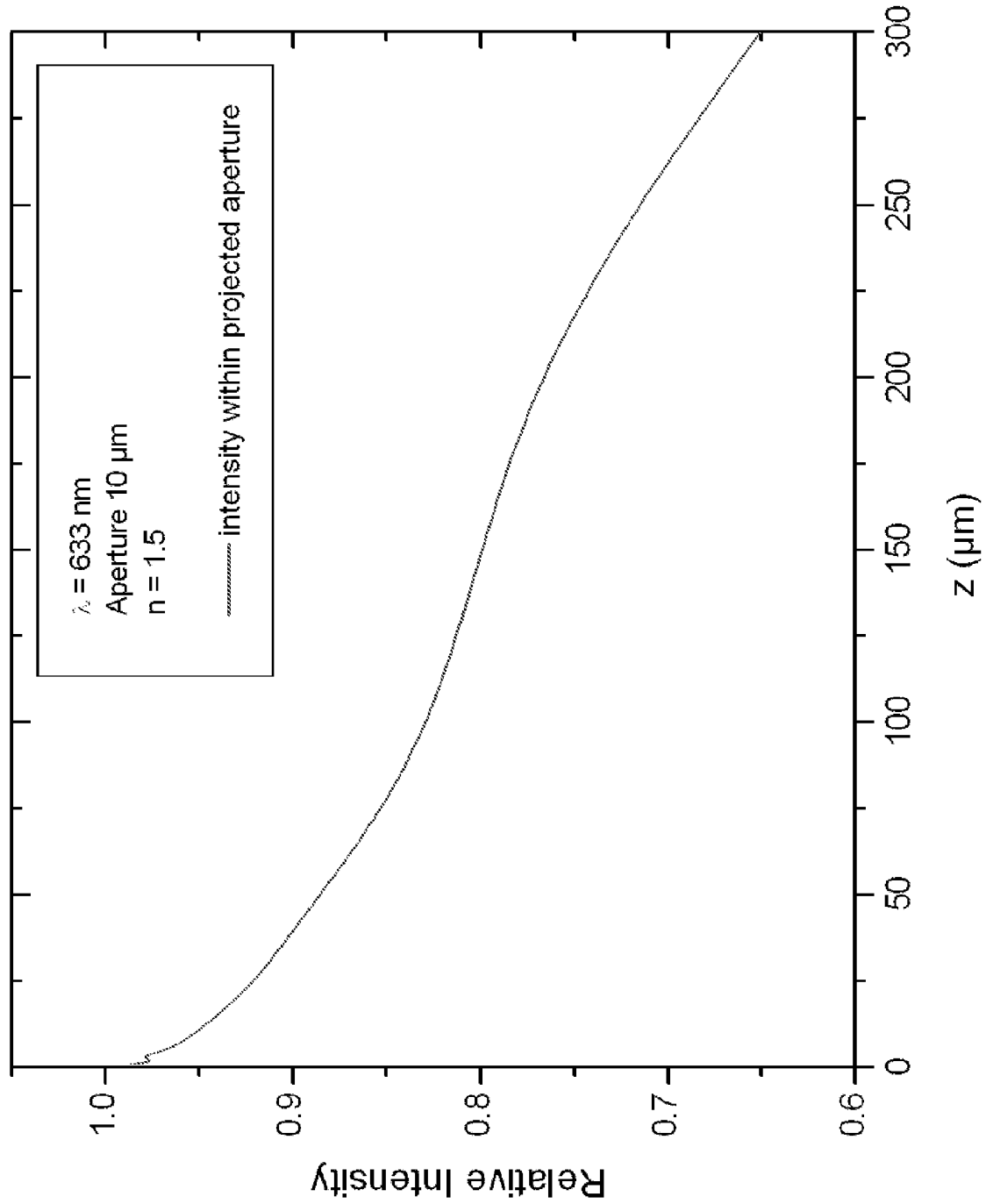
FIG. 15 is diffraction simulation results obtained using MathCad®.

FIG. 14 shows Fresnel diffraction profiles calculated for diffraction from a slit 10 µm wide, for various distances from the slit, in a two dimensional model, where the dimensions are perpendicular to the slit (z), and transverse to the slit (x). The slit of uniform illumination is located between −5 µm and +5 µm on the x axis, with z equal to zero microns. The light transmitting medium is taken to have a refractive index of 1.5, which may be representative of media which would be used in a compact device. The light was taken to be red light with a vacuum wavelength of 633 nm. Green and blue wavelengths have shorter wavelengths than red light, hence the calculations for red light represent the strongest diffraction effects for the three colours red, green and blue. Calculations were performed using MathCad® software sold by Parametric Technology® Corp., Needham, Mass., USA. FIG. 15 shows the fraction of the intensity which remains within a 10 μm width centred on the slit centre, as a function of distance from the slit. At a distance of 20 μm from the slit, FIG. 15 shows that greater than 90% of the intensity is still within the 10 μm width of the slit. Hence less than about 5% of the pixel intensity would be incident on each adjacent pixel, in this two dimensional model. This calculation is in the limiting case of zero boundary width between pixels. Real boundary widths between pixels are greater than zero, hence for a real system the cross-talk problem would be lower than calculated here. In FIG. 14 the Fresnel diffraction profiles close to the slit, such as at 50 μm from the slit, also approximate somewhat the top-hat intensity function at the slit. Hence there are not broad diffraction features close to the slit. Broad diffraction features are characteristic of the far-field diffraction function of the top-hat function, which is a sinc squared function, as known to those skilled in the art. Broad diffraction features are observed in FIG. 14 for the case of a 300 μm distance from the slit. This shows that diffraction effects can be controlled by placing the two EASLMs in close enough proximity, and that an advantage of placing the two EASLMs in close proximity is that the functional form of the diffraction profile changes from that characteristic of the far field to a functional form which is more effective at containing the light close to the axis perpendicular to the slit. This advantage is one which is counter to the mind set of those skilled in the art of holography, as those skilled in the art tend to expect strong, significant and unavoidable diffraction effects when light passes through the small apertures of an SLM. Hence one skilled in the art would not be motivated to place two SLMs close together, as one would expect this to lead to inevitable and serious problems with pixel cross-talk due to diffraction effects.

Figure 16:
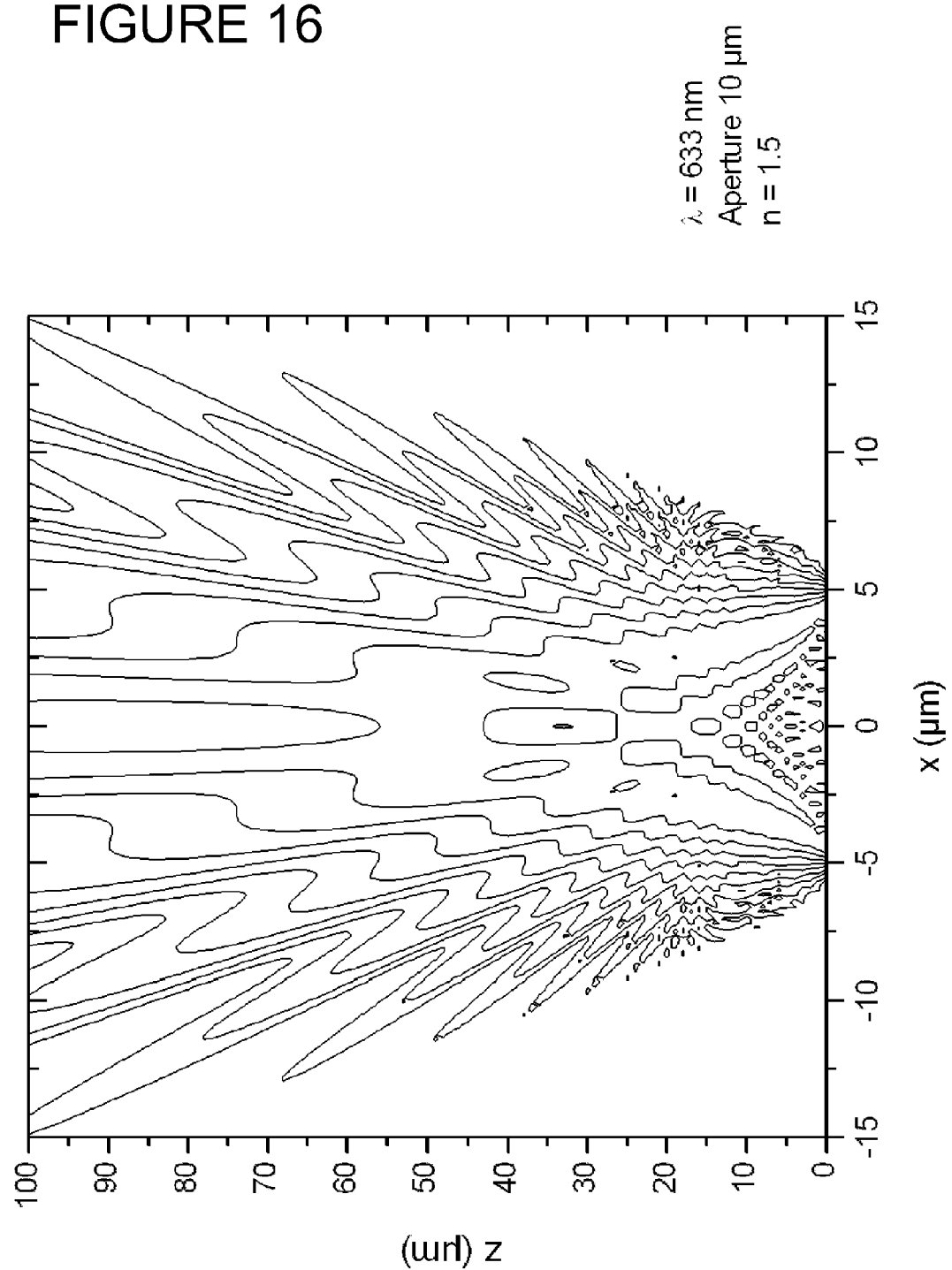
FIG. 16 is diffraction simulation results obtained using MathCad®.

FIG. 16 shows a contour plot of the intensity distribution as a function of the distance from the slit. The contour lines are plotted on a logarithmic scale, not on a linear scale. Ten contour lines are used, which cover in total an intensity factor range of 100. The large degree of confinement of the intensity distribution to the 10 μm slit width for distances within about 50 μm from the slit is clear.

In a further embodiment, the aperture area of the pixels in the first EASLM may be reduced to reduce cross-talk problems at the second EASLM.

Figure 17:
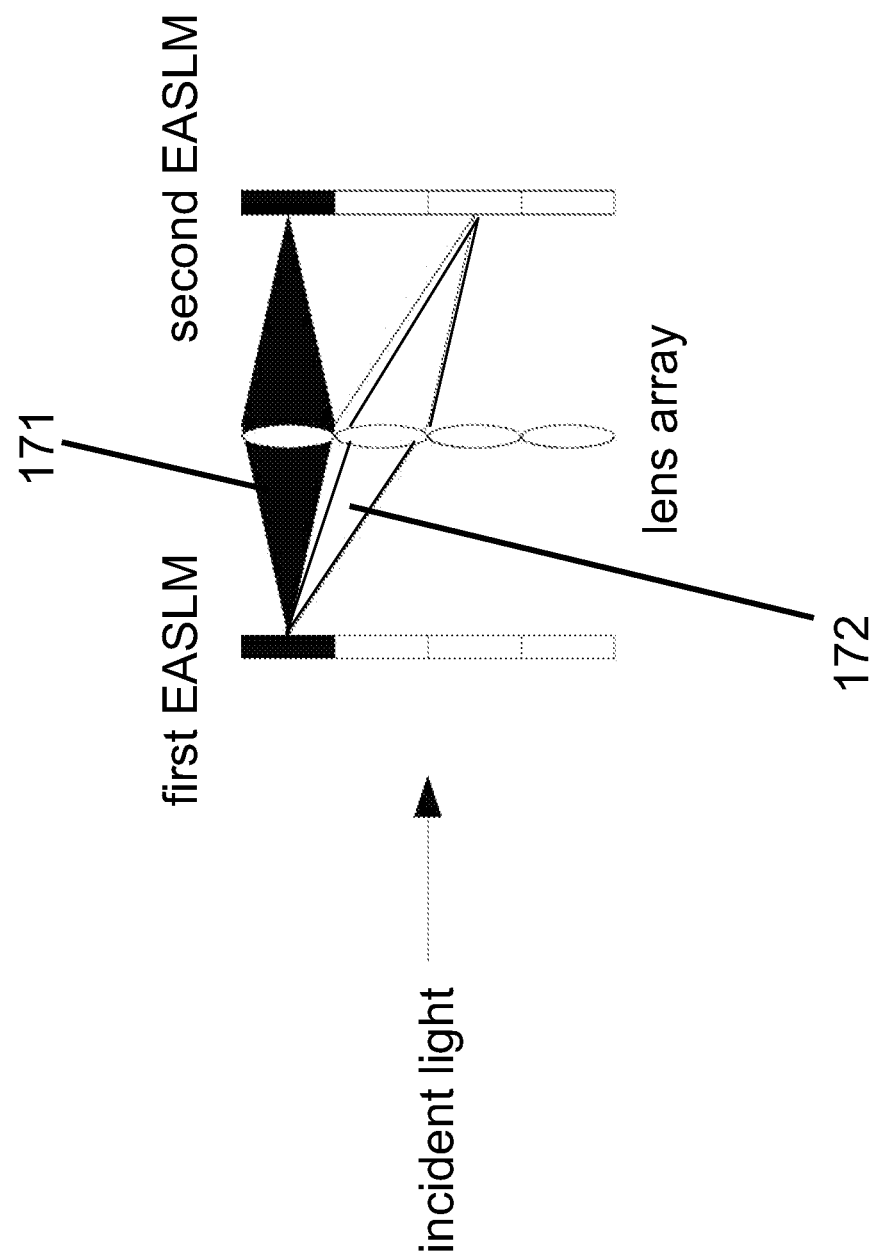
FIG. 17 is an arrangement of two EASLMS with a lens layer between, according to an implementation.

(2) A second approach uses a lens array between the two SLMs, as shown in FIG. 17. Preferably, the number of lenses is the same as the number of pixels in each SLM. The pitches of the two SLMs and of the lens array may be slightly different to compensate for the differences in the distance from the observer. Each lens images a pixel of the first SLM on the respective pixel of the second SLM, as shown by the bundle of light 171 in FIG. 17. There will also be light through the neighboring lens that may cause crosstalk, as shown by the bundle of light 172. This may be neglected if either its intensity is sufficiently low or its direction is sufficiently different so that it does not reach the VOW.

The numerical aperture (NA) of each lens has to be sufficiently large in order to image the pixel with sufficient resolution. As an example, for a resolution of 5 μm a NA 0.2 is required. This means that if geometric optics is assumed, the maximum distance between the lens array and each SLM is about 25 μm if the pitch of the SLM and the lens array is 10 μm.

It is also possible to assign several pixels of each SLM to one lens of the lens array. As an example, a group of four pixels of the first SLM may be imaged to a group of four pixels of the second SLM by a lens of the lens array. The number of lenses of such a lens array would be a fourth of the number of pixels in each SLM. This allows a higher NA of the lenses and hence higher resolution of the imaged pixels.

Figure 18:
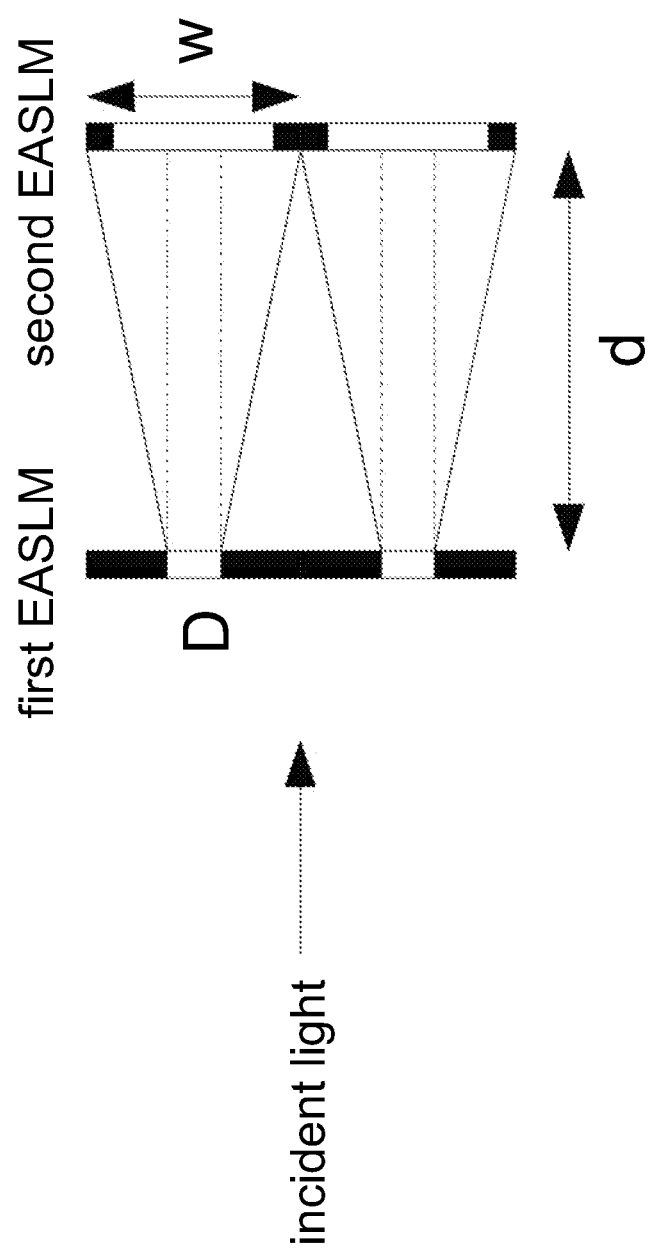
FIG. 18 is a diagram of a diffraction process which may occur as light travels from one EASLM to a second EASLM.

(3) A third approach is to reduce the aperture of the pixels of the first EASLM as much as possible. From a diffraction point of view, the area of the second SLM that is illuminated by a pixel of the first SLM is determined by the aperture width D of the pixel of the first EASLM and by the diffraction angle, as shown in FIG. 18. In FIG. 18, d is the distance between the two EASLMs, and w is the distance between the two first order diffraction minima which occur either side of the zero order maximum. This is assuming Fraunhofer diffraction, or a reasonable approximation to Fraunhofer diffraction.

Reducing the aperture width D on the one hand reduces the directly projected area in the central part of the illuminated area, as indicated by the dotted lines in FIG. 18. On the other hand, the diffraction angle is increased, as the diffraction angle is proportional to 1/D in Fraunhofer diffraction. This increases the width w of the illuminated area on the second EASLM. The illuminated area has the total width w. In a Fraunhofer diffraction regime, D may be determined such that it minimizes w at a given separation d, using the equation $w = D + 2d\lambda/D$ which is derived from the distance between the two first order minima in Fraunhofer diffraction.

For example, if λ is 0.5 μm, d is 100 μm and w is 20 μm, one obtains a minimum in D for D of 10 μm. While the Fraunhofer regime may not be a good approximation in this example, this example illustrates the principle of using the distance between the EASLMs to control the diffraction process in the Fraunhofer diffraction regime.

Figure 19:
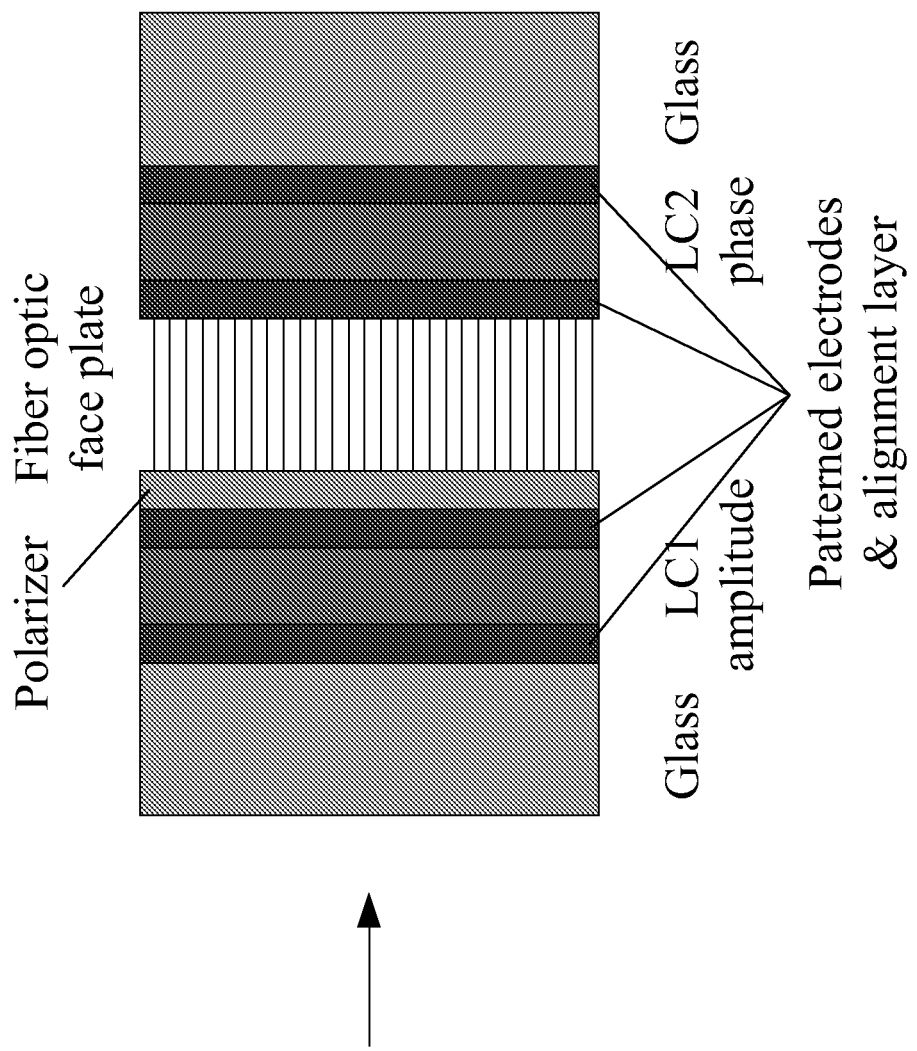
FIG. 19 is a diagram of a configuration of two EASLMS, in which a fibre optic face plate is situated between the two EASLMs.

(4) A fourth approach uses a fiber optic faceplate to image the pixels of the first SLM on the pixels of the second SLM. A fiber optic faceplate consists of a 2D arrangement of parallel optic fibers. The length of the fibers and hence the thickness of the faceplate is typically several millimeters and the length of the diagonal across the face of the plate is up to several inches. As an example, the pitch of the fibers may be 6 μm. Fibre optic faceplates with such a fibre pitch are sold by Edmund Optics Inc. of Barrington, N.J., USA. Each fiber guides light from one of its ends to the other end. Therefore, an image on one side of the faceplate is transferred to the other side, with high resolution and without focusing elements. Such a faceplate may be used as a separating layer between the two SLMs, as shown in FIG. 19. Multimode fibres are preferred over single mode fibres, because multimode fibres have better coupling efficiency than single mode fibres. Coupling efficiency is optimal when the refractive index of the core of the fibre is matched to the refractive index of the liquid crystal, as this minimizes Fresnel back reflection losses.

There are no additional cover glasses between the two SLMs. The polarizer, the electrodes and the alignment layers are directly attached to the fiber optic faceplate. Each of these layers is very thin, i.e. of the order of 1-10 μm. Therefore, the liquid crystal (LC) layers LC1 and LC2 are in close vicinity to the faceplate. The light that has passed through a pixel of the first SLM is guided to the respective pixel of the second SLM. This minimizes crosstalk to the neighboring pixels. The faceplate transfers the light distribution at the output of the first SLM to the input of the second SLM. On average there should be at least one fibre per pixel. If there is less than one fibre per pixel, on average, SLM resolution will be lost, which will reduce the quality of the image shown in an application in a holographic display.

In FIG. 19, the first SLM modulates the amplitude and the second SLM modulates the phase. Other modulation characteristics are possible for the two EASLMs that in combination facilitate a full complex modulation.

Figure 10:
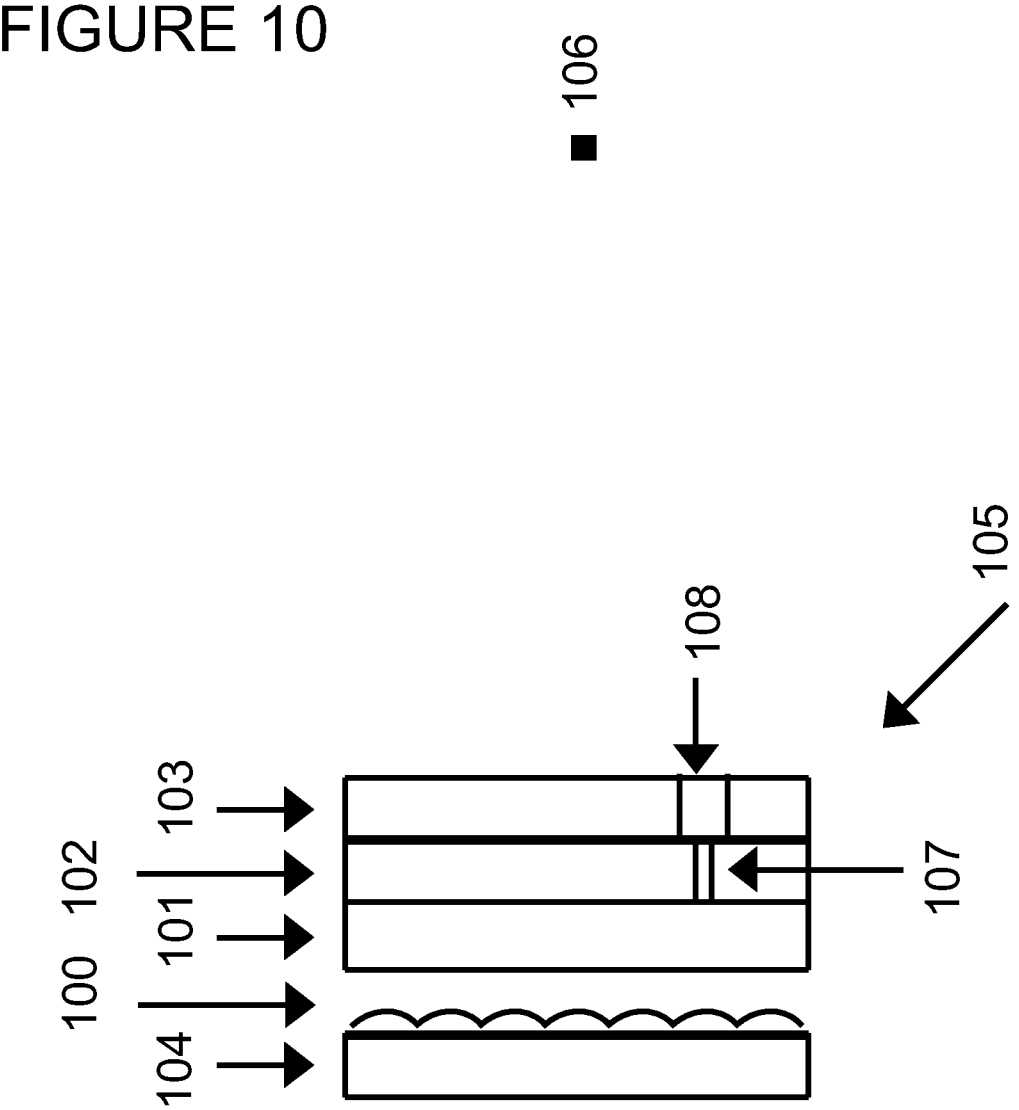
FIG. 10 is a diagram of a holographic display device which incorporates two EASLMs for encoding amplitude and phase in succession.

An example of a compact arrangement for encoding amplitude and phase information in a hologram is disclosed in FIG. 10. 104 is an illumination apparatus for providing illumination of a plane area, where the illumination has sufficient coherence so as to be able to lead to the generation of a three dimensional image. An example of an illumination apparatus is disclosed in US 2006/250671 for the case of large area video holograms. Such an apparatus as 104 may take the form of an array of a white light sources, such as cold cathode fluorescent lamps or white light light emitting diodes which emit light which is incident on a focusing system which may be compact such as a lenticular array or a microlens array 100. Alternatively, light sources for 104 may comprise of red, green and blue lasers or red, green and blue light emitting diodes which emit light of sufficient coherence. However, non-laser sources with sufficient spatial coherence (eg. light emitting diodes, OLEDs, cold cathode fluorescent lamps) are preferred to laser sources. Laser sources have disadvantages such as causing laser speckle in the holographic reconstructions, being relatively expensive, and having possible safety problems with regard to possibly damaging the eyes of holographic display viewers or of those who work in assembling the holographic display devices.

Element 104 may include one or two prismatic optical films for increasing display brightness: such films are disclosed eg. in U.S. Pat. No. 5,056,892 and in U.S. Pat. No. 5,919,551, though others are known. Element 104 may include a polarizing optical element, or a set of polarizing optical elements. One example is a linear polarizer sheet. A further example is a reflective polarizer which transmits one linear polarization state and reflects the orthogonal linear polarization state—such a sheet is described in U.S. Pat. No. 5,828,488, for example, though others are known. A further example is a reflective polarizer which transmits one circular polarization state and reflects the orthogonal circular polarization state—such a sheet is described in U.S. Pat. No. 6,181,395, for example, though others are known. Element 104 may include other optical elements which are known in the field of backlight technology.

Elements 104, 100-103 may be about a few centimeters in thickness, or less, in total. Element 101 may comprise of an array of colour filters, such that pixels of colour light, such as red, green and blue light, are emitted towards element 102, although the colour filters may not be required if coloured sources of light are used. Element 102 is an EASLM which encodes phase information, such as a Freedericksz cell. Element 103 is an EASLM which encodes amplitude information, such as in a conventional commercially available liquid crystal display device. Each cell in element 102, represented here by 107, is aligned with a corresponding cell in element 103, represented here by 108. However, although the cells in elements 102 and 103 have the same lateral spacing, or pitch, the cells in element 102 are smaller than or the same size as the cells in element 103, because light exiting cell 107 may typically undergo some diffraction before entering cell 108 in element 103. The order in which amplitude and phase are encoded may be reversed from that shown in FIG. 10.

A viewer located at point 106 some distance from the device which includes the compact hologram generator 105 may view a three dimensional image when viewing in the direction of 105. Elements 104, 100, 101, 102 and 103 are arranged so as to be in physical contact as described above, so as to form a compact hologram generator 105.

Figure 24:
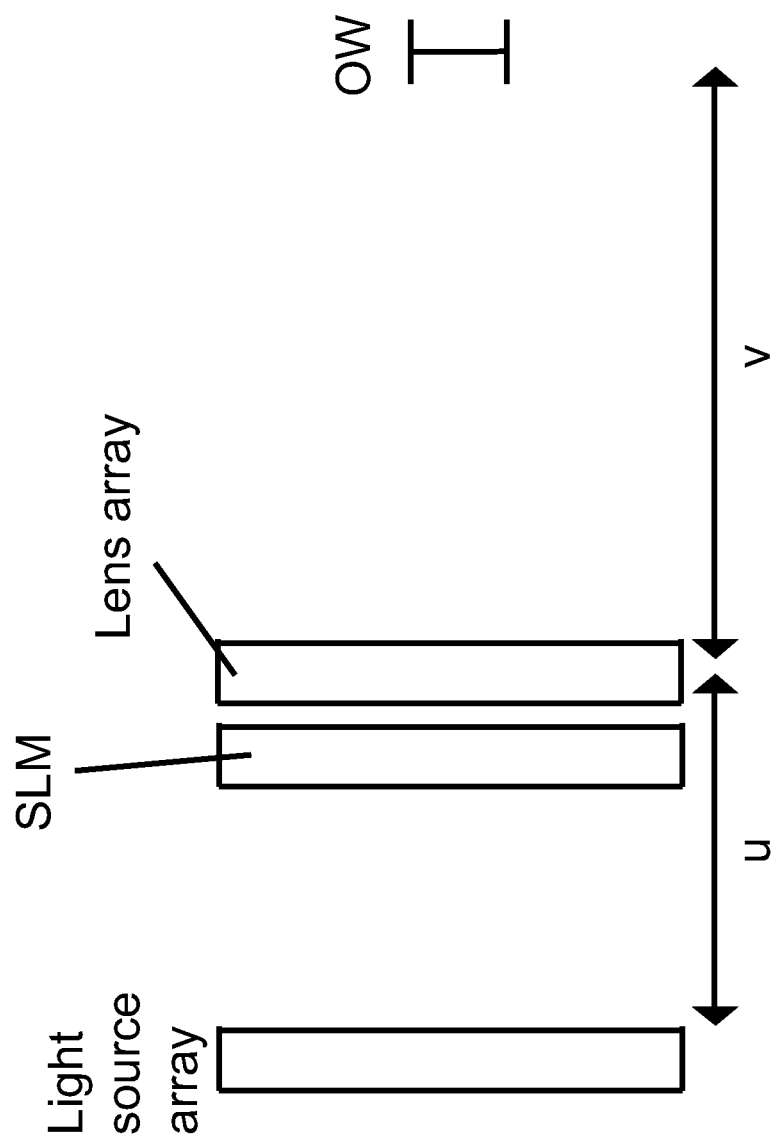
FIG. 24 is a diagram of an embodiment of a holographic display component according to an implementation.

E. Large Magnification Three Dimensional Image Display Device Component Incorporating the Compact Combination of One or Two Pairs of OLED and OASLM Combinations, or One or Two EASLMs, with Holographic Reconstruction of the Object A large magnification three dimensional image display device component incorporating the compact combination of one or two pairs of OLED and OASLM combinations, or one or two EASLMs, with holographic reconstruction of the object, is shown in FIG. 24. The device component includes a compact combination of an SLM and a compact light source of sufficient coherence (such as those described in sections A, B, C and D above), the combination being capable of generating a three dimensional image viewable in a VOW (denoted OW in FIG. 24) under suitable illumination conditions, where the device component may be incorporated in a PDA or in a mobile phone, for example. The compact combination of an SLM and a compact light source of sufficient coherence comprises an array of light sources, an SLM and a lens array, as shown in FIG. 24. The SLM in FIG. 24 incorporates the compact combination of one or two pairs of OLED and OASLM combinations, or one or two EASLMs, or one combination pair of an OLED and an OASLM, and one EASLM.

In a simple example, an array of light sources may be formed as follows. A single light source such as a monochromatic LED is placed next to an array of apertures such that the apertures are illuminated. If the apertures are a one dimensional array of slits, the light transmitted by the slits forms a one dimensional array of light sources. If the apertures are a two dimensional array of circles, the illuminated set of circles forms a two dimensional array of light sources. A typical aperture width will be about 20 µm. Such an array of light sources is suitable for contributing to the generation of a VW for one eye.

In FIG. 24, the array of light sources is situated at a distance u from the lens array. The array of light sources may be the light sources of element 10 of FIG. 1, and may optionally incorporate element 11 of FIG. 1. To be precise, each source of light in the light source array is situated at a distance u from its corresponding lens in the lens array. The planes of the light source array and of the lens array are parallel in a preferred embodiment. The SLM may be located at either side of the lens array. The VOW is at a distance u from the lens array. The lenses in the lens array are converging lenses with a focal length f given by $f=1/[1/u+1/v]$. In a preferred embodiment, v is in the range of 300 mm to 600 mm. In a particularly preferred embodiment v is about 400 mm. In a preferred embodiment u is in the range of 10 mm to 30 mm. In a particularly preferred embodiment u is about 20 mm. The magnification factor M is given by v/u. M is the factor by which the light sources, which have been modulated by the SLM, are magnified at the VOW. In a preferred embodiment, M is in the range of 10 to 60. In a particularly preferred embodiment, M is about 20. To achieve such magnification factors with good holographic image quality requires accurate alignment of the light source array and the lens array. Significant mechanical stability of the device component is required, in order to maintain this accurate alignment, and to maintain the same distance between the light source array and the lens array, over the operating lifetime of the component.

The VOW may be trackable or non-trackable. If the VOW is trackable, then depending on the required position of the VOW, specific light sources in the array of light sources are activated. The activated light sources illuminate the SLM and are imaged into the observer plane by the lens array. At least one light source per lens of the lens array is activated in the light source array. The tracking is quasi-continuous. If u is 20 mm and v is 400 mm, the VOW can be tracked with a lateral increment of 400 µm if the pixel pitch is 20 µm. This tracking is quasi-continuous. If u is 20 mm and v is 400 mm, f is approximately 19 mm.

The light sources in the light source array may have only partial spatial coherence. Partial coherence leads to a smeared reconstruction of the object points. If u is 20 mm and v is 400 mm, an object point at a distance of 100 mm from the display is reconstructed with a lateral smearing of 100 µm if the light source width is 20 µm. This is sufficient for the resolution of the human vision system.

There does not have to be any significant mutual coherence between the light that passes through different lenses of the lens array. The coherence requirement is limited to each single lens of the lens array. Therefore, the resolution of a reconstructed object point is determined by the pitch of the lens array. A typical lens pitch will be of the order of 1 mm to guarantee sufficient resolution for the human vision system.

The VOW is limited to one diffraction order of the Fourier spectrum of the information encoded in the SLM. At a wavelength of 500 nm the VOW has a width of 10 mm if the pixel pitch of the SLM is 10 µm and two pixels are needed to encode one complex number i.e. if 2-phase encoding on a phase-modulating EASLM is used. The VOW may be enlarged by tiling of VOWs by spatial or temporal multiplexing. In the case of spatial multiplexing additional optical elements such as beam splitters are required. Some approaches to multiplexing which may also be employed in this implementation are described in section C above.

Color holographic reconstructions can be achieved by temporal multiplexing. The red, green and blue pixels of a color OLED display are sequentially activated with synchronous re-encoding of the SLM with holograms calculated for red, green and blue optical wavelengths.

The display of which the device component forms a part may comprise an eye position detector that detects the positions of the observer's eyes. The eye position detector is connected with a control unit that controls the activation of the light sources within the array of light sources.

The calculation of the holograms that are encoded on the SLM is preferably performed in an external encoding unit as it requires high computational power. The display data are then sent to the PDA or mobile phone to enable the display of a holographically-generated three dimensional image.

As a practical example, a 2.6 inch screen diagonal XGA LCD EASLM made by Sanyo® Epson® Imaging Devices Corporation of Japan may be used. The subpixel pitch is 17 µm. If this is used in constructing an RGB holographic display, with amplitude modulation encoding of the hologram, at a distance of 0.4 m from the EASLM the viewing window is calculated to be 1.3 mm across. For the monochrome case, the viewing window is calculated to be 4 mm across. If the same configuration is used, but it is implemented using phase modulation with two-phase encoding, the viewing window is calculated to be 6 mm across. If the same configuration is used, but it is implemented using phase modulation with Kinoform encoding, the viewing window is calculated to be 12 mm across.

Other high resolution EASLM examples exist. Seiko® Epson® Corporation of Japan has released monochrome EASLMs, such as the D4:L3D13U 1.3 inch screen diagonal panel with a pixel pitch of 15 µm. The same company has released a D5: L3D09U-61G00 panel in the same panel family with a screen diagonal length of 0.9 inches and a pixel pitch of 10 µm. On Dec. 12, 2006 the same company announced the release of a L3D07U-81G00 panel in the same family with a screen diagonal length of 0.7 inches and a pixel pitch of 8.5 µm. If the D4:L3D13U 1.3 inch panel is used in constructing a monochrome holographic display, with Burckhardt amplitude modulation encoding of the hologram, at a distance of 0.4 m from the EASLM the VW is calculated to be 5.6 mm across.

F. Three Dimensional Image Display Device Incorporating the Compact Combination of One or Two Pairs of OLED and OASLM Combinations, or One or Two EASLMs, with Holographic Reconstruction of the Object The compact combination of one or two pairs of OLED and OASLM combinations, or one or two EASLMs, preferably can be used in a hand-held three dimensional display device, or in a larger three dimensional display device, as the combination can be very compact. The combination may be integrated in a mobile phone, a satellite navigation device, an automotive display, a computer game device, a personal digital assistant (PDA), a laptop computer display, a desktop computer monitor, or a slim television display, for example. Such a three dimensional display is preferably for a single user only. The user is located at a position generally perpendicular to the device's light emitting surface and at a distance from the device from which optimal viewing is achieved such as a distance of approximately 500 mm. It is known that a user of a hand-held device will tend automatically to orient the device in the hand so as to achieve the optimum viewing conditions, as described for example in WO01/96941. Therefore, in such devices there is no necessity for user eye tracking and for complicated and non-compact tracking optics comprising scanning mirrors, for example. But eye tracking could be implemented for such devices if the additional requirements for apparatus and electrical power do not impose an excessive burden.

The benefits of a satellite navigation three dimensional image display device incorporating the compact combination of one or two pairs of OLED and OASLM combinations, or one or two EASLMs, with holographic reconstruction of the object include the following. The driver may find a three dimensional image of route information, such as the maneuver to be made at the next intersection, preferable to two dimensional image information, as three dimensional image information corresponds more closely to what the driver perceives while driving. Other information on the display, such as menu icons, may be displayed three dimensionally. Some or all information on the display may be displayed three dimensionally.

The benefits of an automotive three dimensional image display device incorporating the compact combination of one or two pairs of OLED and OASLM combinations, or one or two EASLMs, with holographic reconstruction of the object, include the following. The device may be able to display three dimensional information directly, such as a three dimensional image of the car's bumper (fender) in proximity to an object near to the vehicle, such as a wall, during a reversing maneuver, or while attempting to drive through an opening not much wider than the vehicle, or narrower than the vehicle. Where the opening is narrower than the vehicle, the three dimensional image display device may help the driver to realize that the vehicle wilt not go through the opening. The three dimensional image could be constructed using information from sensors mounted within or on the vehicle. Other vehicle information could be displayed three dimensionally on the display, such as speed, temperature, engine revolutions per minute, or other information known to be displayed within vehicles. Satellite navigation information may be displayed three dimensionally on the display. Some or all information on the display may be displayed three dimensionally.

The size of the output window is limited by the periodicity interval of the diffraction pattern in the Fourier plane. If the pixel pitch in the OLED-display, or in the EASLM, is approximately 10 μm then for visible light of wavelength 500 nm the virtual observer window (VOW) width is approximately 10 mm to 25 mm at distance of 500 mm, depending on the encoding used in the SLM for the hologram. This is sufficient width for one eye. A second VOW for the other eye may be created by spatial or time multiplexing of the content of the spatial light modulators. In the absence of tracking, in order to see the optimum three dimensional image, the observer has to orient and to move the device and/or himself so that his eyes are in the VOWs and at the optimum distance from the device.

The process of adjusting the position and orientation of the display device can be made easier by tiling several VOWs. Two or three VOWs may be juxtaposed in the x- and y-directions so that a larger area may be covered by the VOWs. Tiling can be performed by spatial or time multiplexing, or by a combination of spatial and time multiplexing.

In time multiplexing, the light is projected time-sequentially into the VOWs. The spatial light modulators have to be re-encoded if the VOWs have differing content. In spatial multiplexing, the content for the different VOWs are encoded in the spatial light modulators at the same time, but in different areas of the spatial light modulators. A beam splitter may split the light from the different areas of the spatial light modulators to different VOWs. A combination of spatial and time multiplexing can be used.

The typical screen diagonal size of the hand-held three dimensional display for use in a mobile phone or a PDA is in the range from one inch to several inches. A holographic sub-display could have a screen diagonal as small as one cm.

The three dimensional image display may be switched to display two dimensional images, such as by displaying identical images to each eye of a viewer's two eyes.

Figure 3:
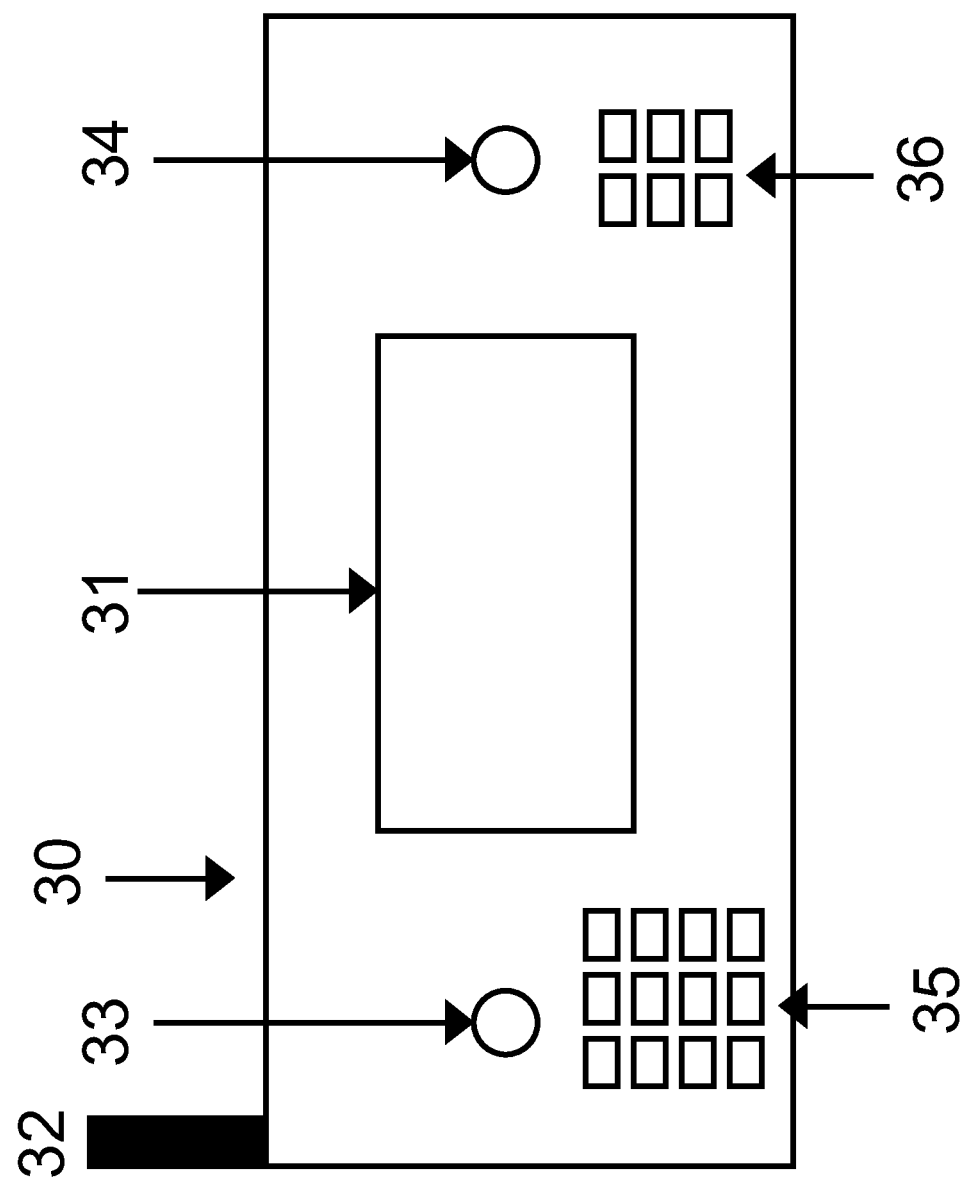
FIG. 3 is a diagram of a mobile three dimensional display device.

An implementation of the three dimensional image display device incorporating the compact combination of one or two pairs of OLED and OASLM combinations, or one or two EASLMs, is shown in FIG. 3. The device in FIG. 3 is a mobile phone 30 on which one may make a telephone call during which a three dimensional video image of the other party, suitably equipped with a similar device, is displayed in the screen region 31. The mobile phone is equipped with an antenna 32 for mobile communication. In other embodiments, the antenna may be within the body of the mobile phone 30. The mobile phone 30 is equipped with two cameras 33 and 34 which record right eye and left eye views of the user, respectively. The right eye and left eye views comprise stereoscopic image data. The mobile phone 30 is equipped with keys 35 for numerals and for the "*" and "#" symbols, and keys 36 for other functions such as moving within on-screen menus, backspacing or turning the unit on or off. Labels present on the keys such as "ON" "OFF" or "2" are such that they prevent the unit from being used upside down, which prevents both parties in the three dimensional video telephone call from viewing the other party upside down. In use, preferably the two viewer's eyes and the two cameras 33 and 34 are coplanar, and the user's face is located approximately perpendicular to the screen region 31. This ensures that the two cameras 33 and 34 record parallax in the plane which contains the viewer's eyes. The optimum viewing position for the viewer's head with respect to the display is pre-determined such that the two cameras 33 and 34 obtain optimum image quality of the viewer's head in this position. The same being true of the counterparty in a three dimensional video telephone call, the two parties may engage in a two-way three dimensional video telephone call with optimum image quality. To ensure that each viewer points the cameras 33 and 34 at their own face accurately, it may be desirable to ensure that the virtual observer windows for each eye are not much bigger than each eye, as this will limit the viewer's scope for positional and orientational error of their camera directions. By pointing the device at an object to be photographed, the device may take three dimensional photographs of an object. Alternatively, the user could be guided to achieve the optimum orientation of the device through the use of small icons on the device screen. The device may also implement eye tracking. The device format and usage described here may be used for a device which generates three dimensional images holographically, autostereoscopically or by any other approaches.

During a two-way three dimensional video telephone call, the cameras 33 and 34 record right eye and left eye views of a user, respectively. The data obtained from these views is used to construct the three dimensional video image on the corresponding device held by the counterparty in the three dimensional video telephone call. If the three dimensional image is generated autostereoscopically, the views from the cameras 33 and 34 may be used directly in generating the two eye images in the autostereoscopic display. If the three dimensional image is generated holographically, the data comprising the views from the cameras 33 and 34 should be processed such as to permit suitable encoding of the holographic data onto one or two SLMs, such as by utilizing a computer generated hologram. When the three dimensional image is generated holographically, the three dimensional display is a holographic display. A holographic display provides full depth information, i.e. accomodation (eye focusing) and parallax, in contrast to an autostereoscopic display. A holographic display gives a holographic reconstruction of an object, i.e. holographic reconstruction of all object points at the correct depth.

An application of the hand held three dimensional display described here includes holding a two-way three dimensional video telephone call. A further application includes being shown a three dimensional view of an object or a scene by the counterparty in the telephone call, eg. to view an item prior to purchase, or to inspect an object for damage. A further application includes confirming the identity of an individual, which may be facilitated by a three dimensional view. The ability to distinguish between individuals very similar in appearance, such as twins, or a person in disguise, may be facilitated by a three dimensional view. A further application includes viewing an individual with a view to making further contact, such as within a dating service, where the decision may be facilitated by a three dimensional view. A further application includes the activity of viewing adult content with a three dimensional view, where a viewer may prefer a three dimensional view to a two dimensional view.

Different individuals have different distances between their eyes. In one implementation, the three dimensional display device with holographic reconstruction of the object has a menu option which enables the user of the display to vary the distance between the projected left eye and right eye virtual observer windows. On selection of the menu option, the user presses keys on the device key pad to either increase, or to decrease, the separation between the virtual observer windows. If this is done while looking at the display and seeking to view a three dimensional image, the separation between the virtual observer windows may be selected which gives the viewer the best three dimensional image that they can perceive. The selected distance may then be saved as a user preference. Multiple user preferences may be saved on the device, if the device is to be used by more than one individual. Such a menu option may be implemented even if the device has the capability to track the positions of the observer's eyes independently, as a user may be better than the tracking software at selecting the precise distance they prefer between the virtual observer windows. Once such a selection has been made, this may speed up tracking, as a less accurate position determination may be required for the observer's eyes after the distance between the eyes becomes a fixed parameter. Being able to select a preferred distance between the two virtual observer windows also offers an advantage over autostereoscopic systems, in which the distance between the left eye and right eye views tends to be fixed by the device hardware.

G. 2D-Projector which Incorporates the Compact Combination of One or Two Pairs of OLED and OASLM Combinations, or One or Two EASLMs Instead of projecting the light into a number of VOWs, as in section F above, the light from the device may also be projected onto a screen or a wall or some other surface. Thus the three dimensional display device in a mobile phone or PDA or in some other device can also be used as a pocket projector.

An improved quality of holographic projection may be obtained by using a SLM that modulates the amplitude and the phase of the incident light. Thus a complex-valued hologram can be encoded on the SLM, which may result in a better quality of the image reconstructed on the screen or wall.

The compact combination of one or two pairs of OLED and OASLM combinations, or one or two EASLMs, described in the previous sections, can be used as a SLM in a projector. Due to the compact size of the combination, the projector will also be compact. The projector can even be the same device as the mobile phone or the PDA or some other device: it may be switched between the modes "three dimensional display" and "projector".

Compared to conventional 2D projectors, a holographic 2D projector has the advantage that no projection lenses are needed and that the projected image is focused at all distances in the optical far field. Prior art holographic 2D projectors, such as disclosed in WO2005/059881, use a single SLM that is therefore not capable of complex modulation. The holographic 2D projector disclosed here would be capable of complex modulation and would therefore have superior image quality.

H. Autostereoscopic or Holographic Display Using One or Two Compact Combinations of an Infra Red OLED Display and OASLM The compact combination of an infra red OLED display and OASLM (eg. described in section A above) can also be used in an autostereoscopic display (ASD), preferably a hand-held ASD in a mobile phone or a PDA. Whereas for a typical viewer an ASD may not be as comfortable to view as a holographic display, as ASD may be cheaper or easier to fabricate or to supply image data to than a holographic display in some circumstances. An ASD provides several viewing zones, whereby each viewing zone shows a different perspective view of the 3D-scene. The observer sees a stereoscopic image if his eyes are in different viewing zones. Note the difference between ASD and holography: ASD provides two flat images whereas holography also provides the z-information of each object point in the 3D-scene.

Usually an ASD is based on spatial multiplexing of the viewing zones on the display and using beam splitter elements, e.g. lenticulars, barrier masks or prism masks. The barrier masks may also be referred to as "parallax barriers." As a disadvantage, for an ASD the resolution in each viewing zone typically is reduced in inverse proportion to the number of viewing zones. But this disadvantage may be offset by the advantages that an ASD may possess, as described above.

The compact combination of an infra red OLED display and an amplitude-modulating OASLM (eg. described in section A above) can be used as an amplitude-modulating display with high resolution. A high-resolution ASD can be constructed if the compact combination of an infra red OLED display and an amplitude-modulating OASLM is combined with beam splitter elements. The high-resolution of the compact combination may offset the loss of resolution due to spatial multiplexing.

An advantage of using the compact combination of one or more OLED arrays and one or more OASLMs (eg. described in sections A and B above) for an ASD, which necessitates one or more additional OASLM components, is the non-patterned OASLM. An ASD comprising a beam splitter and an OLED array may have artefacts due to the patterned OLED, e.g. Moiré effects between the period of the beam splitter and the period of the OLED. In contrast thereto, the information on the OASLM of the compact combination is continuous: there is only the period of the beamsplitter, and the period-based artefacts do not occur.

The ASD light source may be one or more light sources, such as LEDs, lasers, OLEDs or CCFLs. The light sources need not be coherent. If white light sources are used, a layer of colour filters, such as red, green and blue filters, will be required between the light source and the compact combination of a light emitting display and an amplitude-modulating OASLM, if the ASD is to display colour images.

The compact combination of an infra red OLED display and OASLM (eg. described in section A above) can also be used in a holographic display, preferably a hand-held display in a mobile phone or a PDA. Here the holographic display is based on spatial multiplexing of the viewing zones on the display and using beam splitter elements, e.g. lenticulars, barrier masks or prism masks. The barrier masks may also be referred to as "parallax barriers." The compact combination of an infra red OLED display and an OASLM (eg. described in section A above), can be used as a holographic display with high resolution. A high-resolution holographic display can be constructed if the compact combination of an infra red OLED display and an amplitude-modulating OASLM is combined with beam splitter elements. The high-resolution of the compact combination may offset the loss of resolution due to spatial multiplexing. In a further implementation, a combination of two pairs of a compact combination of an OLED array and an OASLM can be used to modulate the amplitude and the phase of light in sequence and in a compact way, as described in section B. Thus, a complex number, which consists of an amplitude and a phase, can be encoded in the transmitted light, on a pixel by pixel basis. A high-resolution holographic display can be constructed if the compact combination of two pairs of an infra red OLED display and an amplitude-modulating OASLM is combined with beam splitter elements. The high-resolution of the compact combination may offset the loss of resolution due to spatial multiplexing. A holographic display with beam splitter elements may provide several viewing zones, whereby each viewing zone shows a different perspective view of the 3D-scene. The observer sees a holographic image if his eyes are in different viewing zones.

I. Data Processing System Required in Three Dimensional Communication

Figure 22:
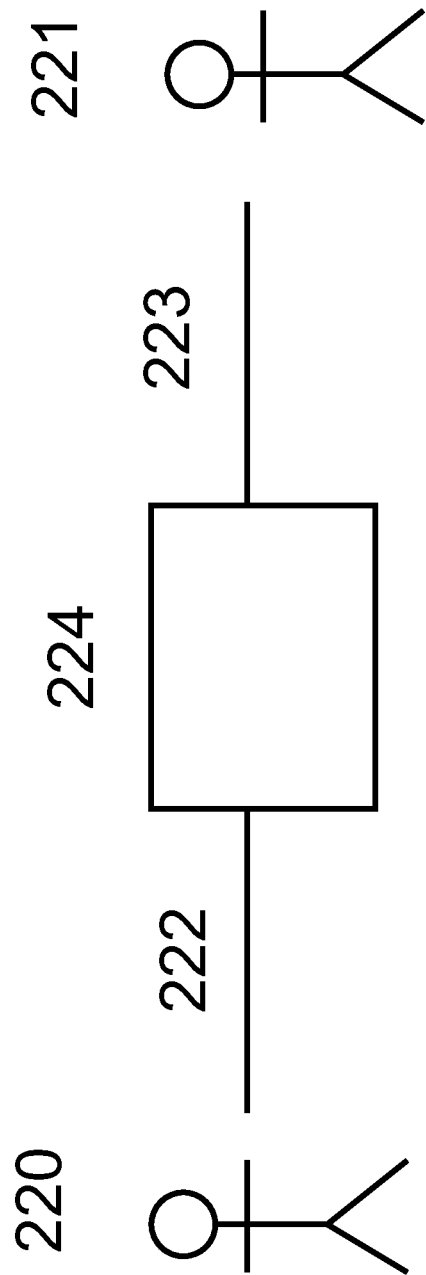
FIG. 22 is a diagram of a system which enables visual communication in three dimensions.

The data processing system required in three dimensional communication is shown schematically in FIG. 22. In FIG. 22, a party 220 is in three dimensional communication with another party 221. Camera data for use in constructing an image may be collected using a mobile phone device 30 shown in FIG. 3, or by some device with a similar function. Data processing for three dimensional image display may be performed in the device of party 220 which may be a mobile phone 30 or an equivalent device, or it may be performed in the device of the other party 221, but preferably it is performed at an intermediate system 224 located on the transmission network between the two mobile phones. The transmission network comprises a first link 222, an intermediate system 224, and a second link 223. The two links 222 and 223 may be wireless links or non-wireless links. The intermediate system 224 may include a computer for performing calculations to enable the display of three dimensional images, such as computer generated holograms, or autostereoscopic images. The use of a computer in the transmission network between the two mobile phones to perform the calculations is preferable, as the computation will not use up mobile phone battery power, but may instead use mains electricity power. The computer located on the transmission network may be used to perform the image processing for a large number of three dimensional video telephone calls simultaneously, which may permit more efficient use of computation resources, such as by reducing the amount of unused computational processing power. The weight of the mobile phone or equivalent device will be reduced if its requirements for computational processing power are reduced, because it will require less computer circuitry and memory and because the computationally demanding calculations will be performed by a computer located on the transmission network. Finally, the software which performs the calculations will only need to be installed on the computer located on the transmission network and not on the mobile phone or equivalent device. This will reduce the mobile phone memory requirements, the scope for software piracy and it will improve the protection of any industrial secrets present in the software code. While the bulk of the calculations required for three dimensional image display may be performed by the intermediate system 224, it is possible that some image calculations may be performed by the user device prior to data transmission. If the two camera images are quite similar, data transmission may be facilitated if the two images are sent as a first image and as a difference image, where the difference image is the difference between the two images, as the difference image may lend itself more readily to data compression techniques which facilitate data transmission, for example. Likewise, the three dimensional image display device may perform some image calculations, such as decompressing compressed image data.

In one example of the system of FIG. 22, a first image and a second image which form a pair of stereoscopic images, are sent by the device of user 220 via link 222 to the intermediary device 224. The second transmitted image may be the difference image between the two stereoscopic images, as a difference image will typically require less data than a complete image. If a three dimensional telephone conversation is in progress, the first image may itself be expressed as the difference between the present image and the image from one timestep earlier. Similarly the second image may be expressed as the difference between the present image and the image from one timestep earlier. The intermediary device 224 may then calculate a two dimensional (2D) image, with its corresponding depth map, from the data received, using calculation procedures for converting between 2D and three dimensional (3D) images known in the art. In the case of a colour image, three component 2D images in the three primary colours are required, together with their corresponding depth maps. The data corresponding to the 2D images and depth maps may then be transmitted to the device of user 221 via link 223. The device of user 221 encodes the holograms in its compact three dimensional display device based on the 2D images and depth maps received. To make efficient use of transmission bandwidth, the data transmitted within this system may be subjected to known compression procedures, with corresponding decompression being performed by the receiving device. The most efficient amount of data compression to be used balances the power required from the battery of the mobile device in performing data compression or decompression against the cost of the bandwidth required if less data compression is used.

The intermediary device 224 may have access to a library containing a set of known 3D shapes, to which it may try to match its calculated 3D data, or it may have access to a library containing a set of known 2D profiles to which it may try to match incoming 2D image data. If a good match can be found with respect to a known shape, this may speed up calculation processes, as 2D or 3D images may then be expressed relative to a known shape. Libraries of 3D shapes may be provided such as the face or body shapes of a set of sports stars such as leading tennis players or soccer players, and the shapes of all or parts of leading sports venues such as famous tennis courts or famous soccer grounds. For example, a 3D image of a person's face may be expressed as being one to which intermediary device 224 has access, plus a change to the facial expression which may be a smile or a frown for example, plus some change in the hair length as the hair may have grown or been cut since the stored data was obtained, for example. The data to which the intermediary device 224 has access may be updated by intermediary device 224 if a persistent set of differences emerges such that it is clear that the data to which the intermediary device 224 has access has become out of date, eg. the person's hair length has been changed significantly and on a long term basis. If the intermediary device 224 encounters a 2D or 3D image to which no good match can be found in the records to which it has access, it may add the new shape to the set of records.

J. System for Boosting 2D Image Content to 3D Image Content

One difficulty in securing widespread adoption of three dimensional display technology is the fact that historically very little content has been generated in a three dimensional format, and at present most content continues to be generated in two dimensional format. This is partly because most image recording apparatus in use at present continues to record two dimensional images and not data which can be used in three dimensional image display. In addition, there are currently limited opportunities for a viewer to demand 3D content or to obtain 3D content which has been generated from 2D content.

Figure 23:
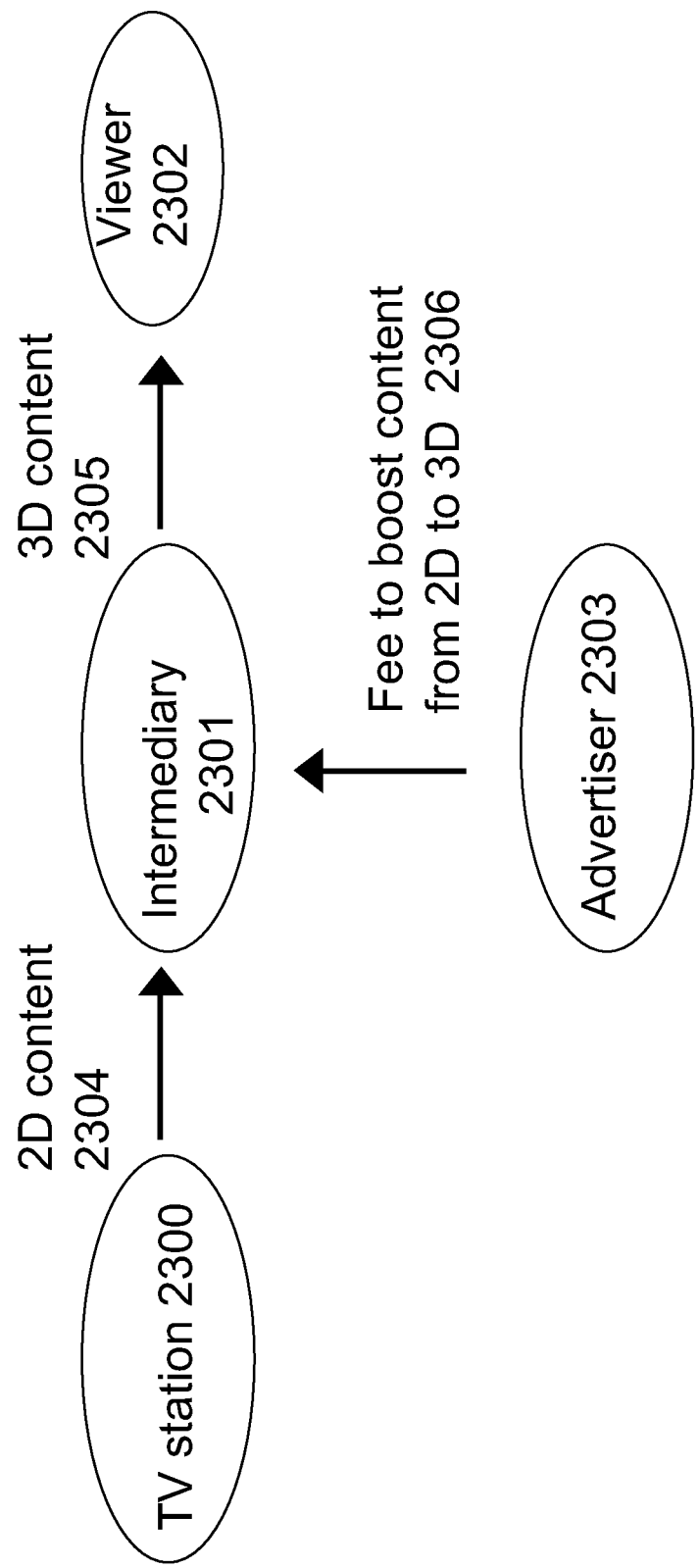
FIG. 23 is a diagram of a method for converting 2D image content to 3D image content.

There is clearly a need for a system which supports the generation of three dimensional content from two dimensional content. One system is given in FIG. 23, but others will be obvious to those skilled in the art. In FIG. 23, a TV broadcasting company 2300 continues to broadcast two dimensional TV images 2304, even though three dimensional display apparatus is present in the home of the viewer 2302. In this system, an intermediary system 2301 is present which has the capability of converting 2D content to 3D content 2305. This conversion process may be supported by fees paid by the viewer, or it may be supported by fees by other parties, such as advertiser 2303. In FIG. 23, when the advertisement of advertiser 2303 is broadcast by TV company 2300, advertiser 2303 pays a fee 2306 to intermediary system 2301 to convert the 2D content to 3D content using known processes for converting 2D content to 3D content. The advertiser benefits through a 3D TV advertisement being shown to a viewer 2302, which may be more eye-catching than a 2D TV advertisement. Alternatively, the viewer 2302 may pay a fee to intermediary 2301 to convert some or all of the TV broadcasts he receives to 3D format. The intermediary system ensures that the 3D content is provided in a properly synchronized format, such as ensuring that for example if a 2D image is supplied with its corresponding depth map, the two data sets are provided in a synchronized fashion i.e. that the 3D display device uses the depth map for the corresponding 2D image and not for a non-corresponding 2D image. The 3D display device may be a holographic display device, an autostereoscopic display device, or any known 3D display device. The data provided to the 3D display device should be appropriate for that type of 3D display device. A similar system to the above may also be applied to content provided by a provider other than a TV broadcasting company, such as a supplier of films (movies), videos or the like.

In an alternative system, the viewer may supply 2D content to the intermediary system, pay a fee, and receive in return a 3D version of the 2D content supplied. The 2D content supplied could be a MP3 file of a home movie, for example, or other video content or image content such as photographs or pictures.

The intermediary system may include a computer for performing calculations to enable the display of three dimensional images, such as computer generated holograms, or autostereoscopic images. The use of a computer in the transmission network between the 2D content supplier and the viewer who wishes to view 3D content to perform the calculations is preferable, as it may be more efficient than performing such processes in the location of the viewer. The computer located on the transmission network may be used to perform the image processing for a large number of 2D to 3D content conversions simultaneously, which may permit more efficient use of computation resources, such as by reducing the amount of unused computational processing power. The cost of the viewer's 3D display device will be reduced if its requirements for computational processing power are reduced, because it will require less computer circuitry and memory and because the computationally demanding calculations will be performed by a computer located on the transmission network. Finally, the software which performs the calculations will only need to be installed on the computer located on the transmission network and not on the viewer's 3D display device. This will reduce the viewer's 3D display device memory requirements, the scope for software piracy and it will improve the protection of any industrial secrets present in the software code. While the bulk of the calculations required for three dimensional image display may be performed by the intermediate system, it is possible that some image calculations may be performed by the viewer's 3D display device. The three dimensional image display device may perform some image calculations, such as decompressing compressed image data, or generating holographic encoding of spatial light modulators from a 2D image and its corresponding depth map.

In one example, the intermediary may calculate a depth map which corresponds to a given 2D image, from the 2D image data received, using calculation procedures for converting between 2D and 3D images known in the art. In the case of a colour image, three component 2D images in the three primary colours are required, together with their corresponding depth maps. The data corresponding to the 2D images and depth maps may then be transmitted to the viewer's 3D display device. The viewer's 3D display device encodes the holograms in its spatial light modulators based on the 2D images and depth maps received. To make efficient use of transmission bandwidth, the data transmitted within this system may be subjected to known compression procedures, with corresponding decompression being performed by the receiving device. The most efficient amount of data compression to be used balances the cost of providing data decompression functionality to the 3D display device against the cost of the bandwidth required if less data compression is used.

The intermediary may have access to data about a set of known 3D shapes, to which it may try to match its calculated 3D data, or it may have access to a set of known 2D profiles to which it may try to match incoming 2D image data. If a good match can be found with respect to a known shape, this may speed up calculation processes, as 2D or 3D images may then be expressed relative to a known shape. Libraries of 3D shapes may be provided such as the face or body shapes of a set or sports stars such as leading tennis players or soccer players, and the shapes of all or parts of leading sports venues such as famous tennis courts or famous soccer grounds. For example, a 3D image of a person's face may be expressed as being one to which the intermediary has access, plus a change to the facial expression which may be a smile or a frown for example, plus some change in the hair length as the hair may have grown or been cut since the stored data was obtained, for example. The data to which the intermediary has access may be updated by the intermediary if a persistent set of differences emerges such that it is clear that the data to which the intermediary has access has become out of date, eg. the person's hair length has been changed significantly and on a long term basis. If the intermediary encounters a 2D image to which no good match can be found in the records to which it has access, it may add the new calculated 3D shape to the set of records.

K. Spatial Multiplexing of Observer Windows and 2D-Encoding

This implementation relates to spatial multiplexing of virtual observer windows (VOWs) of a holographic display combined with using 2D-encoding. Otherwise, the holographic display may be as described in sections A, B, C or D, or it may be any known holographic display.

It is known that several VOWs, e.g. one VOW for the left eye and one VOW for the right eye, can be generated by spatial or temporal multiplexing. For spatial multiplexing, both VOWs are generated at the same time and are separated by a beam splitter, similar to an autostereoscopic display, as described in WO 2006/027228, which is incorporated herein by reference. For temporal multiplexing, the VOWs are generated time sequentially.

However, known holographic display systems suffer some disadvantages. For spatial multiplexing an illumination system has been used that is spatially incoherent in the horizontal direction and which is based on horizontal line light sources and a lenticular array, as shown for example in prior art FIG. 4, which is taken from WO 2006/027228. This has the advantage that the techniques known from autostereoscopic displays can be used. However, there is the disadvantage that a holographic reconstruction in the horizontal direction is not possible. Instead, a so-called 1D-encoding is used that leads to holographic reconstruction and motion parallax only in the vertical direction. Hence, the vertical focal point is in the plane of the reconstructed object, whereas the horizontal focal point is in the plane of the SLM. This astigmatism reduces the quality of spatial vision i.e. it reduces the quality of the holographic reconstruction which is perceived by a viewer. Similarly, temporal multiplexing systems suffer a disadvantage in that they require fast SLMs which are not yet available in all display sizes, and which even if available may be prohibitively expensive.

Only 2D-encoding provides holographic reconstruction simultaneously in the horizontal and the vertical directions and hence 2D-encoding produces no astigmatism, where astigmatism leads to a reduced quality of spatial vision i.e. to a reduced quality of the holographic reconstruction which is perceived by a viewer. It is therefore an object of this implementation to achieve spatial multiplexing of VOWs in combination with 2D-encoding.

In this implementation, illumination with horizontal and vertical local spatial coherence is combined with a beam splitter that separates the light into bundles of rays for the left eye VOW and for the right eye VOW. Thereby the diffraction at the beam splitter is taken into account. The beam splitter may be a prism array, a second lens array (eg. a static array, or a variable array eg. one as shown in FIG. 20) or a barrier mask.

Figure 25:
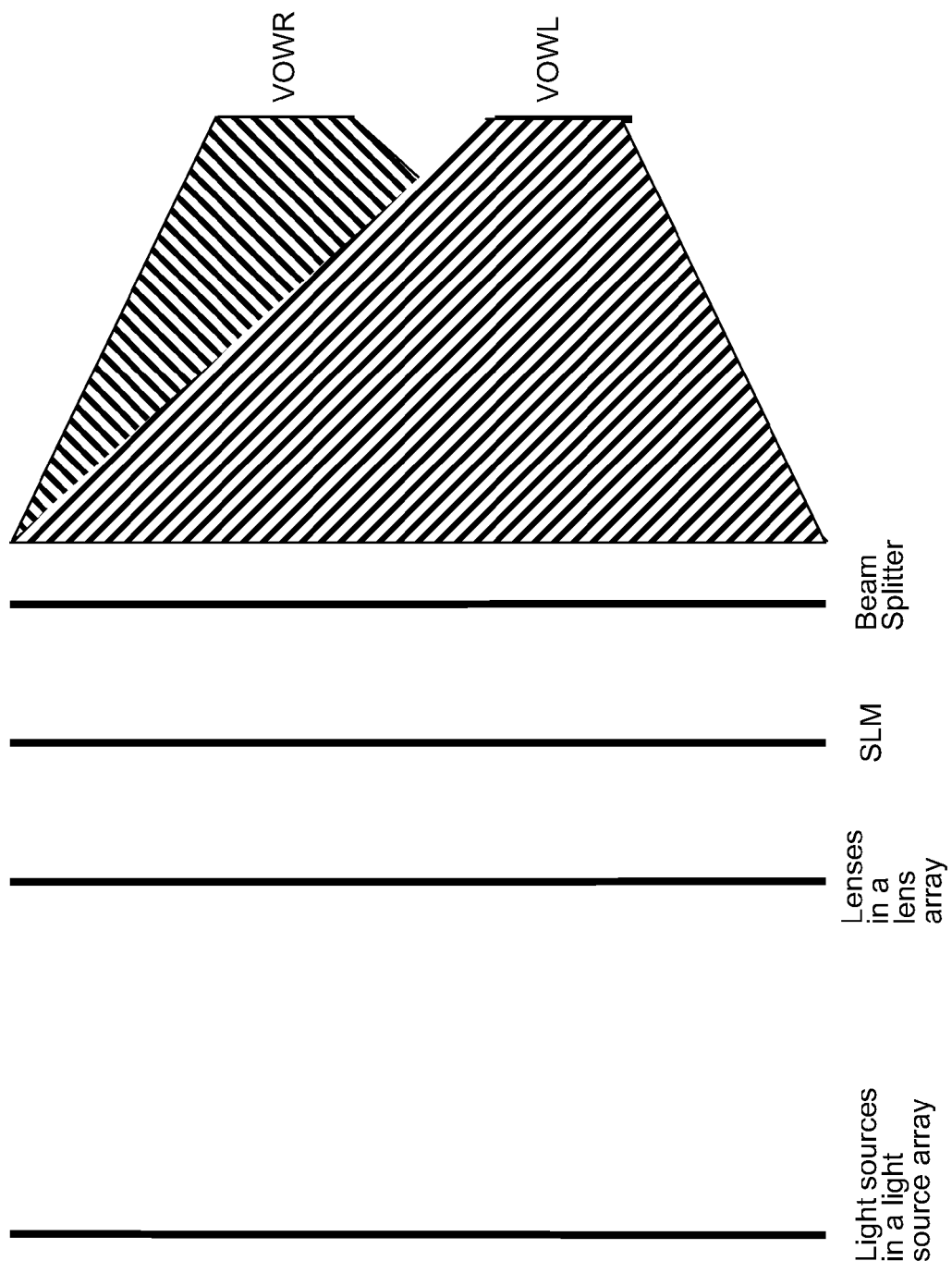
FIG. 25 is a schematic drawing of a holographic display comprising light sources in a 2D light source array, lenses in a 2D lens array, a SLM and a beamsplitter. The beamsplitter splits the rays leaving the SLM into two bundles each of which illuminates the virtual observer window for the left eye (VOWL) and the virtual observer window for the right eye (VOWR), respectively.

An example of this implementation is shown in FIG. 25. FIG. 25 is a schematic drawing of a holographic display comprising light sources in a 2D light source array, lenses in a 2D lens array, a SLM and a beamsplitter. The beamsplitter splits the rays leaving the SLM into two bundles each of which illuminates the virtual observer window for the left eye (VOWL) and the virtual observer window for the right eye (VOWR), respectively. In this example, the number of light sources is one or more; the number of lenses equals the number of light sources.

In this example the beamsplitter is after the SLM. The positions of beamsplitter and SLM may also be swapped.

Figure 26:
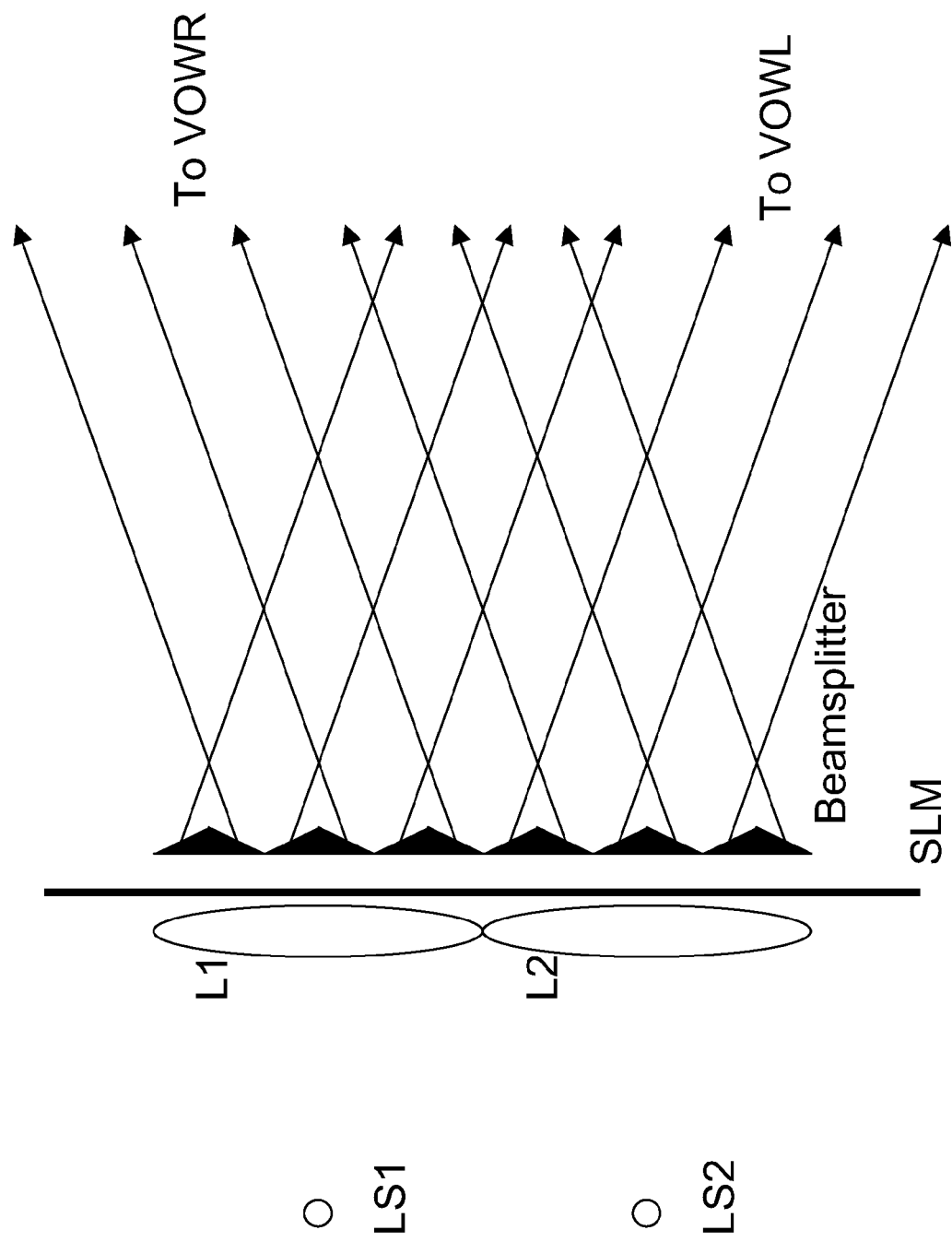
FIG. 26 is a schematic drawing of a holographic display comprising two light sources of a light source array, and two lenses of a lens array, a SLM and a beamsplitter. The beamsplitter splits the rays leaving the SLM into two bundles each of which illuminates the virtual observer window for the left eye (VOWL) and the virtual observer window for the right eye (VOWR), respectively.

An example of this implementation is shown in FIG. 26, in plan view, in which a prism array is used as a beam splitter. The illumination comprises an n element 2D light-source array (LS1, LS2, . . . LSn) and an n element 2D lens array (L1, L2, . . . Ln), of which only two light sources and two lenses are shown in FIG. 26. Each light source is imaged to the observer plane by its associated lens. The pitch of the light source array and the pitch of the lens array are such that all light-source images coincide in the observer plane i.e. the plane which contains the two VOWs. In FIG. 26, the left eye VOW (VOWL) and the right eye VOW (VOWR) are not shown in the Figure, because they are located outside the Figure, to the right of the Figure. An additional field lens may be added. The pitch of the lens array is similar to the typical size of a sub-hologram in order to provide sufficient spatial coherence, i.e. the order of from one to several millimeters. The illumination is horizontally and vertically spatially coherent within each lens, as the light sources are small or point light sources and as a 2D lens array is used. The lens array may be refractive, diffractive or holographic.

In this example, the beamsplitter is a 1D array of vertical prisms. The light incident on one slope of a prism is deflected to the left eye VOW (to VOWL), the light incident on the other slope of the prism is deflected to the right eye VOW (to VOWR). The rays that originate from the same LS and the same lens are also mutually coherent after passing through the beamsplitter. Hence, a 2D-encoding with vertical and horizontal focusing and vertical and horizontal motion parallax is possible.

The hologram is encoded on the SLM with 2D-encoding. The holograms for the left and the right eye are interlaced column by column, i.e. there are alternating columns encoded with left eye and right eye hologram information. Preferably, under each prism there is column with a left eye hologram information and a column with a right eye hologram information. As an alternative, there may also be two or more columns of a hologram under each slope of the prism, e.g. three columns for VOWL followed by three columns for VOWR, in succession. The pitch of the beam splitter may be the same as, or an integer (such as two or three) multiple of, the pitch of the SLM, or the pitch of the beam splitter may be slightly smaller than, or slightly smaller than an integer (such as two or three) multiple of, the pitch of the SLM in order to accommodate perspective shortening.

Light from the columns with the left eye hologram reconstructs the object for the left eye and illuminates the left eye VOW (VOWL); the light from the columns with the right eye hologram reconstructs the object for the right eye and illuminates the right eye VOW (VOWR). Thus each eye perceives the appropriate reconstruction. If the pitch of the prism array is sufficiently small, the eye cannot resolve the prism structure and the prism structure does not disturb the reconstructed image. Each eye sees a reconstruction with full focusing and full motion parallax, and there is no astigmatism.

There will be diffraction at the beamsplitter as the beamsplitter is illuminated with coherent light. The beamsplitter may be regarded as a diffraction grating that generates multiple diffraction orders. The slanted prism slopes have the effect of a blazed grating. At a blazed grating, the maximum of the intensity is directed to a specific diffraction order. At a prism array, one maximum of the intensity is directed from one slope of the prisms to a diffraction order at the position of VOWL, and another maximum of intensity is directed from the other slope of the prisms to another diffraction order at the position of VOWR. To be more precise, the maxima in the intensities of the enveloping sinc-squared functions are shifted to these positions, whereas the diffraction orders are at fixed positions. The prism array generates one intensity enveloping sinc-squared function maximum at the position of VOWL and another intensity enveloping sinc-squared function maximum at the position of VOWR. The intensity of other diffraction orders will be small (i.e. the sinc squared intensity function maximum is narrow) and will not lead to a disturbing crosstalk as the fill factor of the prism array is large, e.g. close to 100%.

As will be obvious to one skilled in the art, by using a more complex array of prisms (eg. two types of prism with the same apex angles but different degrees of asymmetry, disposed adjacent each other, in succession) one may generate more VOWs, in order to provide VOWs for two observers, or for more than two observers. However, the observers cannot be tracked individually with a static array of prisms.

In a further example, one may use more than one light source per lens. Additional light sources per lens can be used to generate additional VOWs for additional observers. This is described in WO 2004/044659 (US2006/0055994), for the case of one lens and m light sources for m observers. In this further example, m light sources per lens and twofold spatial multiplexing are used to generate m left VOWs and m right VOWs for m observers. The m light sources per lens are in m-to-one correspondence with each lens, where m is a whole number.

Here is an example of this implementation. A 20 inch screen diagonal is used, with the following parameters: observer distance 2 m, pixel pitch 69 µm in the vertical by 207 µm in the horizontal, Burckhardt encoding is used, and the optical wavelength is 633 nm. The Burckhardt encoding is in the vertical direction with a subpixel pitch of 69 µm and a VOW height of 6 mm (vertical period). Neglecting the perspective shortening, the pitch of the array of vertical prisms is 414 µm, i.e. there are two columns of the SLM under each full prism. The horizontal period in the observer plane is therefore 3 mm. This is also the width of the VOW. This width is smaller than optimal for an eye pupil of ca. 4 mm in diameter. In a further but similar example, if the SLM has a smaller pitch of 50 µm the VOW would have a width of 25 mm.

If a human adult has an eye separation of 65 mm (as is typical), the prisms have to deflect the light by ±32.5 mm where the light intersects the plane containing the VOWs. To be more precise, the intensity enveloping sinc-squared function maxima have to be deflected by ±32.5 mm. This corresponds to an angle of ±0.93° for 2 m observer distance. The appropriate prism angle is ±1.86° for a prism refractive index n=1.5. The prism angle is defined as the angle between the substrate and the sloping side of a prism.

For a horizontal period in the observer plane of 3 mm, the other eye is at a distance of about 21 diffraction orders (i.e. 65 mm divided by 3 mm). The crosstalk in VOWL and in VOWR caused by higher diffraction orders related to the other VOW is therefore negligible.

In order to implement tracking, a simple way of tracking is light-source tracking, i.e. adapting the light-source position. If SLM and prism array are not in the same plane, there will be a disturbing relative lateral offset between the SLM pixels and the prisms, caused by the parallax. This may lead to disturbing crosstalk. The pixels of the 20 inch screen diagonal example above may have a fill factor of 70% in the direction perpendicular to the axes described by the peak of each of the prisms, i.e. the pixel dimensions are 145 µm active area and 31 µm inactive margin on each side. If the structured area of the prism array is directed towards the SLM, the separation between prism array and SLM may be ca. 1 mm. The horizontal tracking range without crosstalk would be ±31 µm/1 mm*2 m=±62 mm. The tracking range would be larger if a small crosstalk were tolerated. This tracking range is not large but it is sufficient to permit some tracking to take place, so that the viewer will be less constrained as to where to position his/her eyes.

The parallax between SLM and prism array can be avoided, preferably by integration of the prism array in or directly on the SLM (as a refractive, diffractive, or holographic prism array). This would be a specialized component for a product. An alternative is lateral mechanical movement of the prism array, though this is not preferred as moving mechanical parts would complicate the apparatus.

Another critical issue is the fixed separation of the VOWs which is given by the prism angle. This may lead to complications for observers with non-standard eye separation or for z-tracking. As a solution, an assembly including encapsulated liquid-crystal domains may be used, such as that shown in FIG. 21. An electric field may then control the refractive index and hence the deflection angle. This solution may be incorporated with a prism array, so as to give a variable deflection and a fixed deflection, respectively, in succession. In an alternative solution, the structured side of the prism array might be covered by a liquid-crystal layer. An electric field might then control the refractive index and hence the deflection angle. A variable deflection assembly is not necessary if the VOWs have such a large width that there is sufficient tolerance for observers with different eye separations and for z-tracking.

Figure 27:
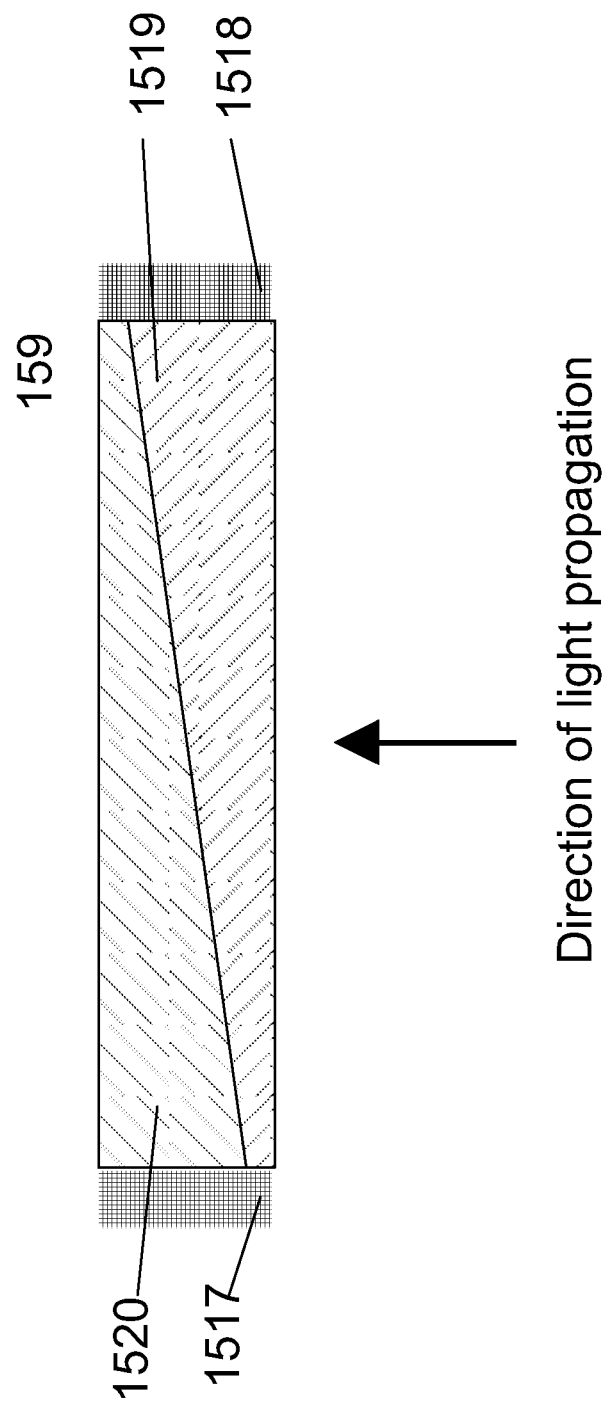
FIG. 27 is a cross-sectional diagram of a prismatic beam steering element.

A more complex solution would be to use controllable prism arrays, e.g. e-wetting prism arrays (as shown in FIG. 27) or prisms filled with liquid crystals (as shown in FIG. 21). In FIG. 27, the layer with the prism element 159 comprises electrodes 1517, 1518 and a cavity filled with two separate liquids 1519, 1520. Each liquid fills a prism-shaped part of the cavity. As an example, the liquids may be oil and water. The slope of the interface between the liquids 1519, 1520 depends on the voltage applied to the electrodes 1517, 1518. If the liquids have different refractive indices the light beam will experience a deviation that depends on the voltage applied to the electrodes 1517, 1518. Hence the prism element 159 acts as a controllable beam steering element. This is an important feature for the applicant's approach to electro-holography for implementations which require tracking of VOWs to the observers' eyes. Patent applications DE 102007024237.0, DE 102007024236.2 filed by the applicant, which are incorporated herein by reference, describe tracking of VOWs to the observers' eyes with prism elements.

Here is an example of the implementation for use in a compact hand-held display. Seiko® Epson® Corporation of Japan has released monochrome EASLMs, such as the D4:L3D13U 1.3 inch screen diagonal panel. An example is described using the D4:L3D13U LCD panel as the SLM. It has HDTV resolution (1920 by 1080 pixels), 15 µm pixel pitch and a panel area of 28.8 mm by 16.2 mm. This panel is usually used for 2D image projection displays.

The example is calculated for a wavelength of 633 nm and an observer distance of 50 cm. Detour-phase encoding (Burckhardt encoding) is used for this amplitude-modulating SLM: three pixels are needed to encode one complex number. These three associated pixels are vertically arranged. If the prism-array beamsplitter is integrated in the SLM, the pitch of the prism array is 30 µm. If there is a separation between SLM and prism array, the pitch of the prism array is slightly different to account for the perspective shortening.

The height of a VOW is determined by the pitch of 3*15 µm=45 µm to encode one complex number and is 7.0 mm. The width of the VOW is determined by the 30 µm pitch of the prism array and is 10.6 mm. Both values are larger than the eye pupil. Therefore, each eye can see a holographic reconstruction if the VOWs are located at the eyes. The holographic reconstructions are from 2D-encoded holograms and hence are without the astigmatism inherent in 1D-encoding, described above. This ensures high quality of spatial vision and high quality of depth impression.

As the eye separation is 65 mm, the prisms have to deflect the light by ±32.5 mm. To be more precise, the intensity maxima of the enveloping sinc-squared intensity functions have to be deflected by ±32.5 mm. This corresponds to an angle of ±3.72° for 0.5 m observer distance. The appropriate prism angle is ±7.440 for a refractive index n=1.5. The prism angle is defined as the angle between substrate and the sloping side of a prism.

For a horizontal period in the observer plane of 10.6 mm the other eye is at a distance of ca. 6 diffraction orders (i.e. 65 mm divided by 10.6 mm). The crosstalk caused by higher diffraction orders is therefore negligible as the prism array has a high fill factor i.e. close to 100%.

Here is an example of the implementation for use in a large display. A holographic display may be designed using a phase-modulating SLM with a pixel pitch of 50 µm and a screen diagonal of 20 inches. For application as a TV the diagonal might rather be approximately 40 inches. The observer distance for this design is 2 m and the wavelength is 633 nm.

Two phase-modulating pixels of the SLM are used to encode one complex number. These two associated pixels are vertically arranged and the corresponding vertical pitch is 2*50 µm=100 µm. With a prism array integrated in the SLM, the horizontal pitch of the prism array is also 2*50 µm=100 µm as each prism comprises two slopes and each slope is for one column of the SLM. The resulting width and height of a VOW of 12.7 mm is larger than the eye pupil. Therefore, each eye can see a holographic reconstruction if the VOWs are located at the eyes. The holographic reconstructions are from 2D-encoded holograms and hence are without the astigmatism inherent in 1D-encoding. This ensures high quality of spatial vision and high quality of depth impression.

As the eye separation is 65 mm, the prisms have to deflect the light by ±32.5 mm. To be more precise, the maxima in the intensity enveloping sinc-squared functions have to be deflected by ±32.5 mm. This corresponds to an angle of ±0.93° for 2 m observer distance. The appropriate prism angle is ±1.86° for a refractive index n=1.5. The prism angle is defined as the angle between the substrate and the sloping side of a prism.

The above examples are for distances of the observer from the SLM of 50 cm and 2 m. More generally, the implementation may be applied for distances of the observer from the SLM of between 20 cm and 4 m. The screen diagonal may be between 1 cm (such as for a mobile phone sub-display) and 50 inches (such as for a large size television).

Laser Light Sources

RGB solid state laser light sources, e.g. based on GaInAs or GaInAsN materials, may be suitable light sources for the compact holographic display because of their compactness and their high degree of light directionality. Such sources include the RGB vertical cavity surface emitting lasers (VC-SEL) manufactured by Novalux® Inc., CA, USA. Such sources may be supplied as single lasers or as arrays of lasers, although each source can be used to generate multiple beams through the use of diffractive optical elements. The beams may be passed down multimode optical fibres as this may reduce the coherence level if the coherence is too high for use in compact holographic displays without leading to unwanted artefacts such as laser speckle patterns. Arrays of laser sources may be one dimensional or two dimensional.

OLED Materials

Infra red emitting OLED materials have been demonstrated. For example, Del Caño et al. have demonstrated electroluminescence from OLED materials based on perylenediimide-doped tris(8-quinolinolato) aluminium, as reported in Applied Physics Letters vol. 88, 071117 (2006). An electroluminescence wavelength of 805 nm was demonstrated. Near infra red emitting OLED materials were reported by Domercq et al. in J Phys Chem B vol. 108, 8647-8651 (2004).

The preparation of OLED materials on transparent substrates has been demonstrated. For example, in U.S. Pat. No. 7,098,591 OLED materials are prepared on transparent indium tin oxide electrodes. The electrodes are prepared on a transparent substrate, which may be borosilicate glass. These components may be incorporated into an OLED device which has a transparent substrate. The indium tin oxide layer may be sputtered onto the substrate using a radio frequency magnetron sputtering tool. The indium tin oxide may be sputtered using a target comprising indium oxide and tin oxide. The indium tin oxide layer may have an optical transmission of about 85% in the visible range. The indium tin oxide may be smooth so as to avoid the creation of locally enhanced electric fields that may degrade the performance of the OLED material. A root mean square roughness of less than about 2 nm may be preferable. A functional organic layer or layers may be deposited on the patterned electrode surface. The thickness of the organic layers is typically between 2 nm and 200 nm. A conductive layer may be patterned onto the organic layers, so as to form an anode and a cathode either side of the organic layer. The device may be sealed with a glass layer, to protect the active layers from the environment.

Outline Manufacturing Process

The following describes the outline of a process for manufacturing the device of FIG. 2, but many variations of this process will be obvious to those skilled in the art.

In a process for manufacturing the device of FIG. 2, a transparent substrate is selected. Such a substrate may be a rigid substrate such as a sheet of borosilicate glass which is about 200 μm thick, or it may be a flexible substrate such as a polymer substrate, such as a polycarbonate, acrylic, polypropylene, polyurethane, polystyrene, polyvinyl chloride or the like substrate. Transparent electrodes are prepared on the glass, as described in the previous section. An infra red emitting OLED material is deposited on the glass, and electrical contacts are fabricated on the opposite side to the transparent electrodes, as described in the previous section, such that pixellated OLED infra red light emission is possible. The glass substrate may have indentations for the OLED pixel material. The IR-OLED material may be printed, sprayed or solution-processed onto the substrate. An encapsulation layer, also an electrical isolation layer, is then deposited on the OLED pixel layer. Such an encapsulation layer may be an inorganic insulator layer such as silicon dioxide, silicon nitride, or silicon carbide, or it may be a polymerizable layer such as an epoxy. Deposition could be performed by sputtering or by chemical vapour deposition in the case of the inorganic insulator layer, or it could be by printing or coating in the case of a polymerizable layer. The encapsulation layer, also an electrical isolation layer, may have a thickness of several micrometers, or less than ten micrometers. The encapsulation layer is then covered by the photosensitive layer of the OASLM. The photosensor layer is sensitive in the infra red, transparent in the visible, and may have a thickness of several micrometers. Such optical properties may be provided by a dye that is absorbing in the infra red. The OASLM is then completed by depositing a liquid crystal layer which is housed between two electrically conducting layers. The liquid crystal layer may be configured for amplitude modulation or for phase modulation, and typically has a thickness of several micrometers. An infra red filter layer is then deposited on the device. This may be of the form of a polymer film with infra red absorbing pigments within it, or it may be an inorganic layer such as a sputtered or chemical vapour deposition grown silicon dioxide film with infra red absorbing components within it.

It may be necessary for the layers between the two OASLM devices to be sufficiently thick so as to ensure that the electric fields present in one OASLM do not affect the performance of the other OASLM. The infra red filter layer may be thick enough to achieve this objective. However, if the infra red filter layer is of insufficient thickness, the layer thickness may be increased such as by bonding the OASLM device using an optical adhesive to a sheet of glass of sufficient thickness, or by depositing a further optically transparent layer such as an inorganic layer or a polymer layer as described above. The OASLM devices must however not be too far apart so that optical diffraction effects lead detrimentally to pixel cross talk. For example, if the pixel width is 10 micrometers it is preferable that the OASLM layers should be less than 100 micrometers apart. The LC layer in one OASLM is configured to perform amplitude modulation; the LC layer in the other OASLM is configured to perform phase modulation.

The remainder of the device may be prepared in manner outlined above for each of the OASLM and OLED layers. Alternatively, the remainder of the device may be prepared as a single unit which is then bonded onto the first part of the device, using for example a glass layer which is present for example to ensure sufficient separation between the OASLM layers that the electric fields present in each OASLM do not influence the operation of the other OASLM. Where the remainder of the device is prepared by depositing further material on the first part of the device, this may have the advantage that precision alignment of the pixels of the second OLED layer with the pixels of the first OLED layer is facilitated.

Instead of having a separation layer with sufficient thickness next to the OASLM it is also possible to use a thin separation layer that is coated with a conducting transparent electrode, e.g. indium tin oxide. This electrode acts as a common electrode of the two liquid crystal layers. Furthermore, as a conducting electrode it is an equipotential surface. Therefore, it shields electric fields and prevents leakage of electric fields from one OASLM to the other OASLM.

Figure 9:
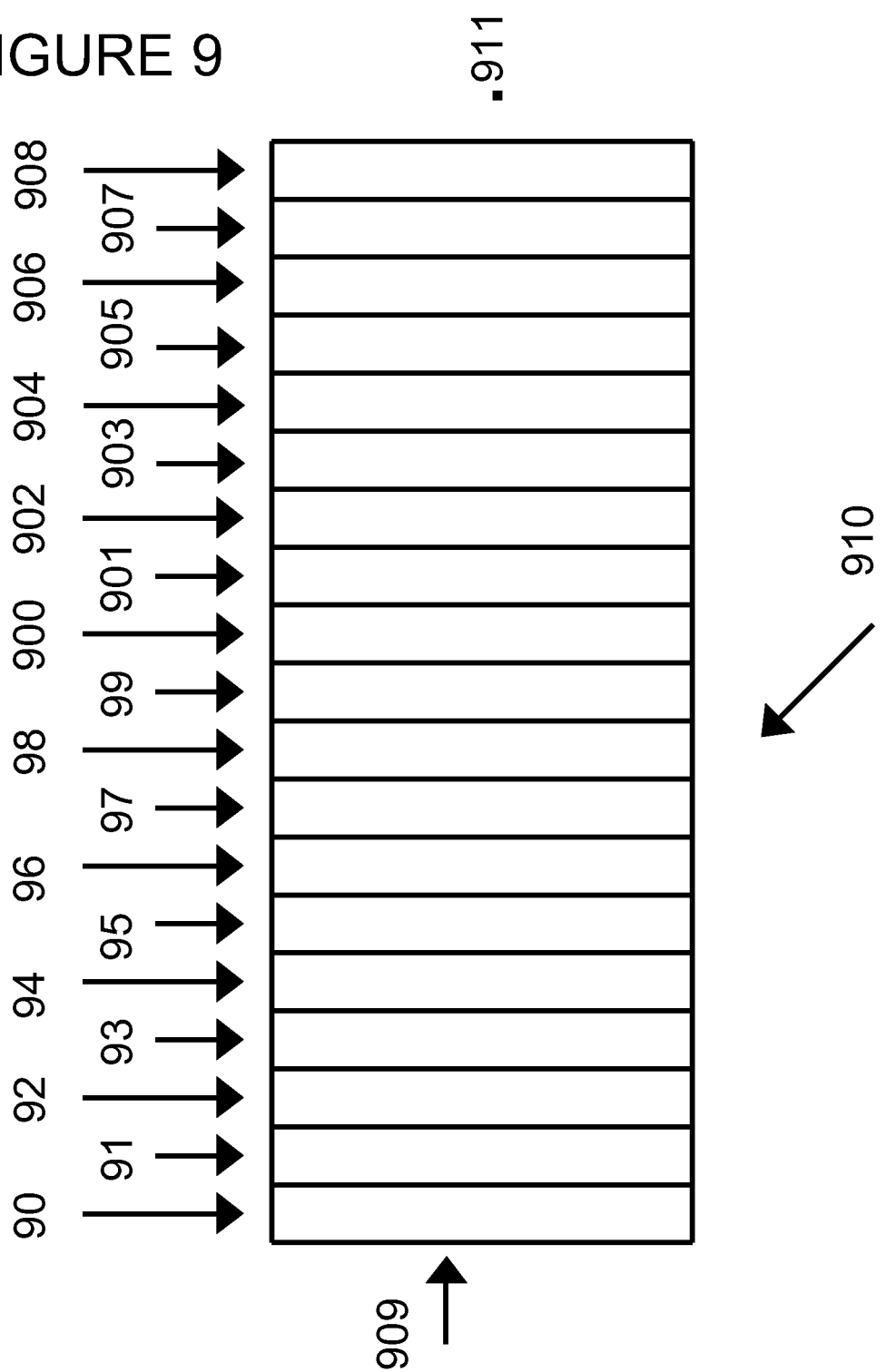
FIG. 9 is a diagram of a holographic display device.

An example of a device structure which may be fabricated using the above procedures, or similar procedures, is given in FIG. 9. In use, the device structure 910 in FIG. 9 is illuminated by sufficiently coherent visible radiation from the face 909 so that a viewer at point 911, which is not shown at a distance from the device which is to scale with respect to the device, may view a three dimensional image. The layers in the device from 90 through to 908 are not necessarily to scale with respect to each other. Layer 90 is a substrate layer, such as a glass layer. Layer 91 is an OLED backplane layer, which provides electrical power to the OLEDs, and may be wholly or partially transparent. Layer 92 is an array of infra red emitting OLEDs. Layer 93 is a Bragg filter holographic element for at least partial infra red light collimation. Layer 93 may be omitted in some implementations. Layer 94 is an electrical isolation layer. Layer 95 is an OASLM photosensor and electrode layer. Layer 96 is a liquid crystal layer for amplitude modulation of the visible light beams. Layer 97 is a separation layer, especially a thin separation layer. Layer 98 is a transparent electrode layer. Layer 99 is a linear polarizer layer. Layer 900 is an infra red filter layer which transmits visible light but which blocks infra red light from the OLED arrays 92 and 906. Layer 901 is a liquid crystal layer for phase modulation of the visible light beams. Layer 902 is a separation layer, especially a thin separation layer. Layer 903 is an OASLM photosensor and electrode layer. Layer 904 is an electrical isolation layer. Layer 905 is a Bragg filter holographic element for at least partial infra red light collimation. Layer 905 may be omitted in some implementations. Layer 906 is an array of infra red emitting OLEDs. Layer 907 is an OLED backplane layer, which provides electrical power to the OLEDs, and may be wholly or partially transparent. Layer 908 is a plane of covering material, such as glass. In manufacture, the device 910 may be fabricated by starting with substrate layer 90 and depositing each layer in turn until the final layer 908 is added. Such a procedure has the advantage of facilitating that the layers of the structure may be aligned in fabrication to high accuracy. Alternatively, the layers may be fabricated in two or more parts and bonded together with a sufficient degree of alignment.

For the fabrication of devices, it is very important that unwanted birefringence, such as unwanted stress-induced birefringence, be kept to a minimum. Stress-induced birefringence causes linear or circular polarization states of light to change into elliptical polarization states of light. The presence of elliptical polarization states of light in the device where ideally linear or circular polarization states of light would be present will reduce contrast and colour fidelity, and will therefore degrade device performance.

Implementations

It will be appreciated by those skilled in the art that for the OASLMs in the embodiments above, a photosensitive layer which is transparent in the visible range, but which absorbs in the infra red, is required. In an alternative implementation, the photosensitive layer could be patterned so as to have transparent gaps which transmit visible light such as the red, green and blue beams, and non-transparent areas which are sensitive to light from OLEDs. In this case, the photosensitive material need not be transparent to visible light. In addition, the write beams need not be infra red light. In one implementation, the write beams could be generated by a non-primary display colour such as by yellow light emitting OLEDs. The filter in between the two OASLMs would therefore need to have strong optical absorption in the yellow, so as to block yellow light, but still to have sufficient transmission at other optical wavelengths for the purpose of producing a functioning optical display. In another implementation, the write beams could be generated by ultra violet emitting OLEDs. The filter in between the two OASLMs would therefore need to have strong optical absorption in the ultra violet, so as to block ultra violet light, but still to have sufficient transmission at visible optical wavelengths for the purpose of producing a functioning optical display. Ultra violet emitting OLED materials have been reported by Qiu et al. Applied Physics Letters 79, 2276 (2001), and by Wong et al. Org. Lett. 7 (23), 5131 (2005). In addition, while the use of OLED materials has been emphasized, the use of other light emitting diode materials, or other display technologies such as Surface-conduction Electron-emitter Display (SED) technology is possible.

While the implementations disclosed herein have emphasized the successive encoding of amplitude and phase in the spatial light modulators, it will be appreciated by those skilled in the art that any successive weighted encoding of two non-identical combinations of amplitude and phase, that is two combinations which are not related by being equal through multiplication by any real number, but not by any complex number (excluding the real numbers), may be used in principle to encode a hologram pixel. The reason is that the vector space of the possible holographic encodings of a pixel is spanned in the vector space sense by any two non-identical combinations of amplitude and phase, that is any two combinations which are not related by being equal through multiplication by any real number, but not by any complex number (excluding the real numbers).

In the Figures herein, the relative dimensions shown are not necessarily to scale.

Various modifications and alterations of this invention will become apparent to those skilled in the art without departing from the scope of this invention, and it should be understood that this invention is not to be unduly limited to the illustrative embodiments and implementations set forth herein.

APPENDIX I

Technical Primer

The following section is meant as a primer to several key techniques used in some of the systems that implement the present invention.

In conventional holography, the observer can see a holographic reconstruction of an object (which could be a changing scene); his distance from the hologram is not however relevant. The reconstruction is, in one typical optical arrangement, at or near the image plane of the light source illuminating the hologram and hence is at the Fourier plane of the hologram. Therefore, the reconstruction has the same far-field light distribution of the real world object that is reconstructed.

One early system (described in WO 2004/044659 and US 2006/0055994) defines a very different arrangement in which the reconstructed object is not at or near the Fourier plane of the hologram at all. Instead, a virtual observer window zone is at the Fourier plane of the hologram; the observer positions his eyes at this location and only then can a correct reconstruction be seen. The hologram is encoded on a LCD (or other kind of spatial light modulator) and illuminated so that the virtual observer window becomes the Fourier transform of the hologram (hence it is a Fourier transform that is imaged directly onto the eyes); the reconstructed object is then the Fresnel transform of the hologram since it is not in the focus plane of the lens. It is instead defined by a near-field light distribution (modelled using spherical wavefronts, as opposed to the planar wavefronts of a far field distribution). This reconstruction can appear anywhere between the virtual observer window (which is, as noted above, in the Fourier plane of the hologram) and the LCD or even behind the LCD as a virtual object.

There are several consequences to this approach. First, the fundamental limitation facing designers of holographic video systems is the pixel pitch of the LCD (or other kind of light modulator). The goal is to enable large holographic reconstructions using LCDs with pixel pitches that are commercially available at reasonable cost. But in the past this has been impossible for the following reason. The periodicity interval between adjacent diffraction orders in the Fourier plane is given by $\lambda D/p$, where $\lambda$ is the wavelength of the illuminating light, D is the distance from the hologram to the Fourier plane and p is the pixel pitch of the LCD. But in conventional holographic displays, the reconstructed object is in the Fourier plane. Hence, a reconstructed object has to be kept smaller than the periodicity interval; if it were larger, then its edges would blur into a reconstruction from an adjacent diffraction order. This leads to very small reconstructed objects—typically just a few cm across, even with costly, specialised small pitch displays. But with the present approach, the virtual observer window (which is, as noted above, positioned to be in the Fourier plane of the hologram) need only be as large as the eye pupil. As a consequence, even LCDs with a moderate pitch size can be used. And because the reconstructed object can entirely fill the frustum between the virtual observer window and the hologram, it can be very large indeed, i.e. much larger than the periodicity interval. Further, where an OASLM is used, then there is no pixelation, and hence no periodicity, so that the constraint of keeping the virtual observer window smaller than a periodicity interval no longer applies.

There is another advantage as well, deployed in one variant. When computing a hologram, one starts with one's knowledge of the reconstructed object—e.g. you might have a 3D image file of a racing car. That file will describe how the object should be seen from a number of different viewing positions. In conventional holography, the hologram needed to generate a reconstruction of the racing car is derived directly from the 3D image file in a computationally intensive process. But the virtual observer window approach enables a different and more computationally efficient technique. Starting with one plane of the reconstructed object, we can compute the virtual observer window as this is the Fresnel transform of the object. We then perform this for all object planes, summing the results to produce a cumulative Fresnel transform; this defines the wave field across the virtual observer window. We then compute the hologram as the Fourier transform of this virtual observer window. As the virtual observer window contains all the information of the object, only the single-plane virtual observer window has to be transformed to the hologram and not the multi-plane object. This is particularly advantageous if there is not a single transformation step from the virtual observer window to the hologram but an iterative transformation like the Iterative Fourier Transformation Algorithm. Each iteration step comprises only a single Fourier transformation of the virtual observer window instead of one for each object plane, resulting in significantly reduced computation effort.

Another interesting consequence of the virtual observer window approach is that all the information needed to reconstruct a given object point is contained within a relatively small section of the hologram; this contrasts with conventional holograms in which information to reconstruct a given object point is distributed across the entire hologram. Because we need encode information into a substantially smaller section of the hologram, that means that the amount of information we need to process and encode is far lower than for a conventional hologram. That in turn means that conventional computational devices (e.g. a conventional digital signal processor (DSP) with cost and performance suitable for a mass market device) can be used even for real time video holography.

There are some less than desirable consequences however. First, the viewing distance from the hologram is important—the hologram is encoded and illuminated in such a way that only when the eyes are positioned at the Fourier plane of the hologram is the optimal reconstruction seen; whereas in normal holograms, the viewing distance is not important. There are however various techniques for reducing this Z sensitivity or designing around it, and in practice the Z sensitivity of the holographic reconstruction is usually not extreme.

Also, because the hologram is encoded and illuminated in such a way that optimal holographic reconstructions can only be seen from a precise and small viewing position (i.e. precisely defined Z, as noted above, but also X and Y co-ordinates), eye tracking may be needed. As with Z sensitivity, various techniques for reducing the X, Y sensitivity or designing around it exist. For example, as pixel pitch decreases (as it will with LCD manufacturing advances), the virtual observer window size will increase. Furthermore, more efficient encoding techniques (like Kinoform encoding) facilitate the use of a larger part of the periodicity interval as virtual observer window and hence the increase of the virtual observer window.

The above description has assumed that we are dealing with Fourier holograms. The virtual observer window is in the Fourier plane of the hologram, i.e. in the image plane of the light source. As an advantage, the undiffracted light is focused in the so-called DC-spot. The technique can also be used for Fresnel holograms where the virtual observer window is not in the image plane of the light source. However, care must be taken that the undiffracted light is not visible as a disturbing background. Another point to note is that the term transform should be construed to include any mathematical or computational technique that is equivalent to or approximates to a transform that describes the propagation of light. Transforms are merely approximations to physical processes more accurately defined by Maxwellian wave propagation equations; Fresnel and Fourier transforms are second order approximations, but have the advantages that (a) because they are algebraic as opposed to differential, they can be handled in a computationally efficient manner and (ii) can be accurately implemented in optical systems.

Further details are given in US patent application 2006-0138711, US 2006-0139710 and US 2006-0250671, the contents of which are incorporated by reference.

APPENDIX II

Glossary of Terms Used in the Description

Computer Generated Hologram

A computer generated video hologram CGH is a hologram that is calculated from a scene. The CGH may comprise complex-valued numbers representing the amplitude and phase of light waves that are needed to reconstruct the scene. The CGH may be calculated e.g. by coherent ray tracing, by simulating the interference between the scene and a reference wave, or by Fourier or Fresnel transform.

Encoding

Encoding is the procedure in which a spatial light modulator (e.g. its constituent cells, or contiguous regions for a continuous SLM like an OASLM) are supplied with control values of the video hologram. In general, a hologram comprises of complex-valued numbers representing amplitude and phase.

Encoded Area

The encoded area is typically a spatially limited area of the video hologram where the hologram information of a single scene point is encoded. The spatial limitation may either be realized by an abrupt truncation or by a smooth transition achieved by Fourier transform of a virtual observer window to the video hologram.

Fourier Transform

The Fourier transform is used to calculate the propagation of light in the far field of the spatial light modulator. The wave front is described by plane waves.

Fourier Plane

The Fourier plane contains the Fourier transform of the light distribution at the spatial light modulator. Without any focusing lens the Fourier plane is at infinity. The Fourier plane is equal to the plane containing the image of the light source if a focusing lens is in the light path close to the spatial light modulator.

Fresnel Transform

The Fresnel transform is used to calculate the propagation of light in the near field of the spatial light modulator. The wave front is described by spherical waves. The phase factor of the light wave comprises a term that depends quadratically on the lateral coordinate.

Frustum

A virtual frustum is constructed between a virtual observer window and the SLM and is extended behind the SLM. The scene is reconstructed inside this frustum. The size of the reconstructed scene is limited by this frustum and not by the periodicity interval of the SLM.

Imaging Optics

Imaging optics are one or more optical components such as a lens, a lenticular array, or a microlens array used to form an image of a light source (or light sources). References herein to an absence of imaging optics imply that no imaging optics are used to form an image of the one or two SLMs as described herein at a plane situated between the Fourier plane and the one or two SLMs, in constructing the holographic reconstruction.

Light System

The light system may include either of a coherent light source like a laser or a partially coherent light source like a LED. The temporal and spatial coherence of the partially coherent light source has to be sufficient to facilitate a good scene reconstruction, i.e. the spectral line width and the lateral extension of the emitting surface have to be sufficiently small.

Virtual Observer Window (VOW)

The virtual observer window is a virtual window in the observer plane through which the reconstructed 3D object can be seen. The VOW is the Fourier transform of the hologram and is positioned within one periodicity interval in order to avoid multiple reconstructions of the object being visible. The size of the VOW has to be at least the size of an eye pupil. The VOW may be much smaller than the lateral range of observer movement if at least one VOW is positioned at the observer's eyes with an observer tracking system. This facilitates the use of a SLM with moderate resolution and hence small periodicity interval. The VOW can be imagined as a keyhole through which the reconstructed 3D object can be seen, either one VOW for each eye or one VOW for both eyes together.

Periodicity Interval

The CGH is sampled if it is displayed on a SLM composed of individually addressable cells. This sampling leads to a periodic repetition of the diffraction pattern. The periodicity interval is $\lambda D/p$, where $\lambda$ is the wavelength, D the distance from the hologram to the Fourier plane, and p the pitch of the SLM cells. OASLMs however have no sampling and hence there is no periodic repetition of the diffraction pattern; the repetitions are in effect suppressed.

Reconstruction

The illuminated spatial light modulator encoded with the hologram reconstructs the original light distribution. This light distribution was used to calculate the hologram. Ideally, the observer would not be able to distinguish the reconstructed light distribution from the original light distribution. In most holographic displays the light distribution of the scene is reconstructed. In our display, rather the light distribution in the virtual observer window is reconstructed.

Scene

The scene that is to be reconstructed is a real or computer generated three-dimensional light distribution. As a special case, it may also be a two-dimensional light distribution. A scene can constitute different fixed or moving objects arranged in a space.

Spatial Light Modulator (SLM)

A SLM is used to modulate the wave front of the incoming light. An ideal SLM would be capable of representing arbitrary complex-valued numbers, i.e. of separately controlling the amplitude and the phase of a light wave. However, a typical conventional SLM controls only one property, either amplitude or phase, with the undesirable side effect of also affecting the other property.

The invention claimed is:

1. A mobile telephony system comprising a calling party mobile telephone with an imaging system and a display, the imaging system operable to capture an image of the calling party, in which the calling party mobile telephone sends an image of the calling party to a called party mobile telephone over a wireless link, and the called party mobile telephone locally generates a holographic reconstruction of the calling party using a holographic display that is encoded with a computer generated hologram, wherein data processing for three dimensional image display is performed at an intermediate system located on a transmission network between the calling party and called party mobile telephones, the intermediate system including a computer for performing calculations to enable the display of three dimensional computer generated holograms.

2. The mobile telephony system of claim 1 in which the holographic display includes one organic light emitting diode array (OLED) array writing onto one optically addressable spatial light modulator (OASLM) forming adjacent layers.

3. The mobile telephony system of claim 2 in which the holographic display includes one electrically addressed spatial light modulator (EASLM) or in which the holographic display includes two EASLMs.

4. The mobile telephony system of claim 1 in which the holographic display includes two OLED array and OASLM pairs, each pair consisting of one OLED array writing onto one OASLM forming adjacent layers.

5. The mobile telephony system of claim 1 in which the holographic display includes one electrically addressed spatial light modulator (EASLM) or in which the holographic display includes two EASLMs.

6. The mobile telephony system of claim 1, in which a remote server or intermediary adds a depth map and sends the image of the calling party, plus depth map, to the called party mobile telephone or in which the remote server is programmed with data defining a 3D physical map of the face of the calling party.

7. The mobile telephony system of claim 6, in which the called party mobile telephone includes a synchroniser that compensates for the latency introduced by the remote server.

8. The mobile telephony system of claim 1, in which the called party mobile telephone includes a freeze frame function that generates a static holographic reconstruction or in which the called party mobile telephone includes a zoom function that enables a user to enlarge a portion of the holographic reconstruction.

9. The mobile telephony system of claim 1, in which the called party mobile telephone and/or the calling party mobile telephone include stereo cameras or a single camera and software that generates a depth map using the data from the single camera.

10. The mobile telephony system of claim 1, in which the called party mobile telephone and/or calling party mobile telephone display on-screen indications to guide the user to optimally position or orient the camera for optimal image capture and/or holographic reconstruction.

11. The mobile telephony system of claim 1, in which the called party mobile telephone and/or calling party mobile telephone is a display device which generates a holographic reconstruction which is visible correctly when the user is at a predefined distance from the display.

12. The mobile telephony system of claim 1, in which the called party mobile telephone and/or calling party mobile telephone is a display device which can be switched from holographic reconstruction mode to conventional 2D display mode or in which the called party mobile telephone and/or calling party mobile telephone is a hand-held portable device.

13. The mobile telephony system of claim 1, in which the called party mobile telephone and/or calling party mobile telephone is a personal digital assistant (PDA) or a game playing device.

14. The mobile telephony system of claim 1 in which the holographic display generates a 2D image that is in focus on a screen independent of the distance of the screen from the device in the optical far field without the need for any projection lenses.

15. The mobile telephony system of claim 1 in which spatial light modulators (SLMs) of the holographic display are positioned within 30 mm of a light source and housed within a portable casing.

16. The mobile telephony system of claim 1 in which a beam steering element is present in the holographic display for tracking virtual observer windows (VOWs), the beam steering element comprising liquid crystal domains inside an isotropic host material, where the interfaces between the domains and the matrix are prism-shaped, or the shape of sections of a sphere, or the shape of sections of a cylinder, and the orientation of the liquid crystals are controlled using externally applied electric fields so as to vary the local refractive or diffractive properties of the beam steering element.

17. A communication method comprising the step of using the mobile telephony system of claim 1.

18. The device of claim 1 in which a beam steering element is present for tracking virtual observer windows (VOWs), the beam steering element comprising controllable prism arrays with prism elements, the prism array being in the form of an electro-wetting prism array, a prism element comprising electrodes and a cavity filled with two separate liquids and an interface between the liquids, the slope of the interface between the liquids being electrically controllable by applying voltage to the electrodes.

19. A method of providing telecommunications services in which a network operator provides calling party and/or called party mobile telephones, a wireless link and a remote server and where the calling party mobile telephone is provided with an imaging system and a display, the imaging system operable to capture an image of the calling party, in which the calling party mobile telephone sends an image of the calling party to a called party mobile telephone over the wireless link, and the called party mobile telephone locally generates a holographic reconstruction of the calling party using a holographic display that is encoded with a computer generated hologram, wherein data processing for three dimensional image display is performed at the remote server located on a transmission network between the calling party and called party mobile telephones, the remote server including a computer for performing calculations to enable the display of three dimensional computer generated holograms.

20. A method of making a video call from a calling party mobile telephone with an imaging system and a display, the imaging system operable to capture an image of a calling party, in which the calling party mobile telephone sends an image of the calling party to a called party mobile telephone, which locally generates a holographic reconstruction of the calling party using a holographic display that is encoded with a computer generated hologram, wherein data processing for three dimensional image display is performed at an intermediate system located on a transmission network between the calling party and called party mobile telephones, the intermediate system including a computer for performing calculations to enable the display of three dimensional computer generated holograms.

* * * * *